(12) United States Patent
Becker et al.

(10) Patent No.: US 10,693,966 B2
(45) Date of Patent: Jun. 23, 2020

(54) SYSTEM FOR DISTRIBUTED INTELLIGENT REMOTE SENSING SYSTEMS

(71) Applicant: fybr, Chesterfield, MO (US)

(72) Inventors: Paul Becker, Eureka, MO (US);
Linnell Gorden, Jr., Black Jack, MO (US); Bret Beringer, Chesterfield, MO (US); James Crain, Wildwood, MO (US); Mrinal Wadhwa, Chesterfield, MO (US); Richard E. Goodwin, St. Louis, MO (US)

(73) Assignee: FYBR, Chesterfield, MO (US)

( * ) Notice: Subject to any disclaimer, the term of this patent is extended or adjusted under 35 U.S.C. 154(b) by 94 days.

(21) Appl. No.: 15/683,477

(22) Filed: Aug. 22, 2017

(65) Prior Publication Data
US 2018/0054490 A1    Feb. 22, 2018

Related U.S. Application Data

(60) Provisional application No. 62/377,975, filed on Aug. 22, 2016.

(51) Int. Cl.
*G06F 7/04* (2006.01)
*H04L 29/08* (2006.01)
(Continued)

(52) U.S. Cl.
CPC .......... *H04L 67/125* (2013.01); *G01S 5/0263* (2013.01); *G01S 13/91* (2013.01); *G06F 9/445* (2013.01); *G06F 9/45558* (2013.01); *G06F 21/53* (2013.01); *G06K 9/00771* (2013.01); *G08G 1/0116* (2013.01); *G08G 1/0129* (2013.01); *G08G 1/0133* (2013.01); *G08G 1/0141* (2013.01); *G08G 1/04* (2013.01); *H04L 63/0428* (2013.01); *H04L 63/06* (2013.01);
(Continued)

(58) Field of Classification Search
None
See application file for complete search history.

(56) References Cited

U.S. PATENT DOCUMENTS 7,768,426 B2    8/2010   Groft
8,274,403 B2    9/2012   Groft
(Continued)

OTHER PUBLICATIONS

International Search Report, International Application No. PCT/US2017/048029, dated Nov. 3, 2017.

*Primary Examiner* — Brandon S Hoffman
(74) *Attorney, Agent, or Firm* — Perman & Green, LLP

(57) ABSTRACT

An Internet of things (IoT) system, including a distributed system of virtual machines, includes at least one IoT platform system control engine, that includes a platform system control engine secure system space and a IoT platform system control engine user defined space, at least one network node device that includes a network node device secure system space and an IoT network node device user defined space, and at least one edge device that includes an edge device secure system space and an edge device user defined space, where the secure system space of the control engine, the network node device, and the edge device are each configured to be secured to prevent unauthorized access, and the user defined spaces of the platform system control engine, the network node device and the edge device each define a respective virtual machine.

25 Claims, 32 Drawing Sheets

(51) Int. Cl.
*G01S 13/91* (2006.01)
*G01S 5/02* (2010.01)
*G08G 1/04* (2006.01)
*G08G 1/01* (2006.01)
*G06K 9/00* (2006.01)
*G06F 21/53* (2013.01)
*G06F 9/455* (2018.01)
*G06F 9/445* (2018.01)
*H04L 29/06* (2006.01)
*G06Q 30/02* (2012.01)
*G06F 8/65* (2018.01)
*G01S 13/931* (2020.01)
*G08G 1/14* (2006.01)

(52) U.S. Cl.
CPC .......... *H04L 63/0823* (2013.01); *H04L 67/10* (2013.01); *G01S 2013/9314* (2013.01); *G06F 8/65* (2013.01); *G06F 2009/45579* (2013.01); *G06Q 30/0284* (2013.01); *G08G 1/142* (2013.01); *G08G 1/147* (2013.01); *G08G 1/148* (2013.01); *H04L 67/18* (2013.01); *H04L 2463/061* (2013.01)

(56) References Cited

U.S. PATENT DOCUMENTS

| | | |
|---|---|---|
| 9,497,572 B2 | 11/2016 | Britt et al. |
| 9,652,987 B2 | 5/2017 | Becker et al. |
| 2013/0211870 A1 | 8/2013 | Lawson et al. |
| 2014/0340243 A1 | 11/2014 | Becker et al. |
| 2014/0343891 A1 | 11/2014 | Becker et al. |
| 2014/0359552 A1 | 12/2014 | Misra et al. |
| 2015/0019714 A1 | 1/2015 | Shaashua et al. |
| 2015/0326528 A1 | 11/2015 | Murthy et al. |
| 2016/0087933 A1* | 3/2016 | Johnson .......... H04W 4/70 709/245 |
| 2016/0182459 A1 | 6/2016 | Britt et al. |
| 2016/0212116 A1 | 7/2016 | Becker et al. |
| 2017/0149614 A1* | 5/2017 | Zheng .......... H04L 41/12 |

* cited by examiner

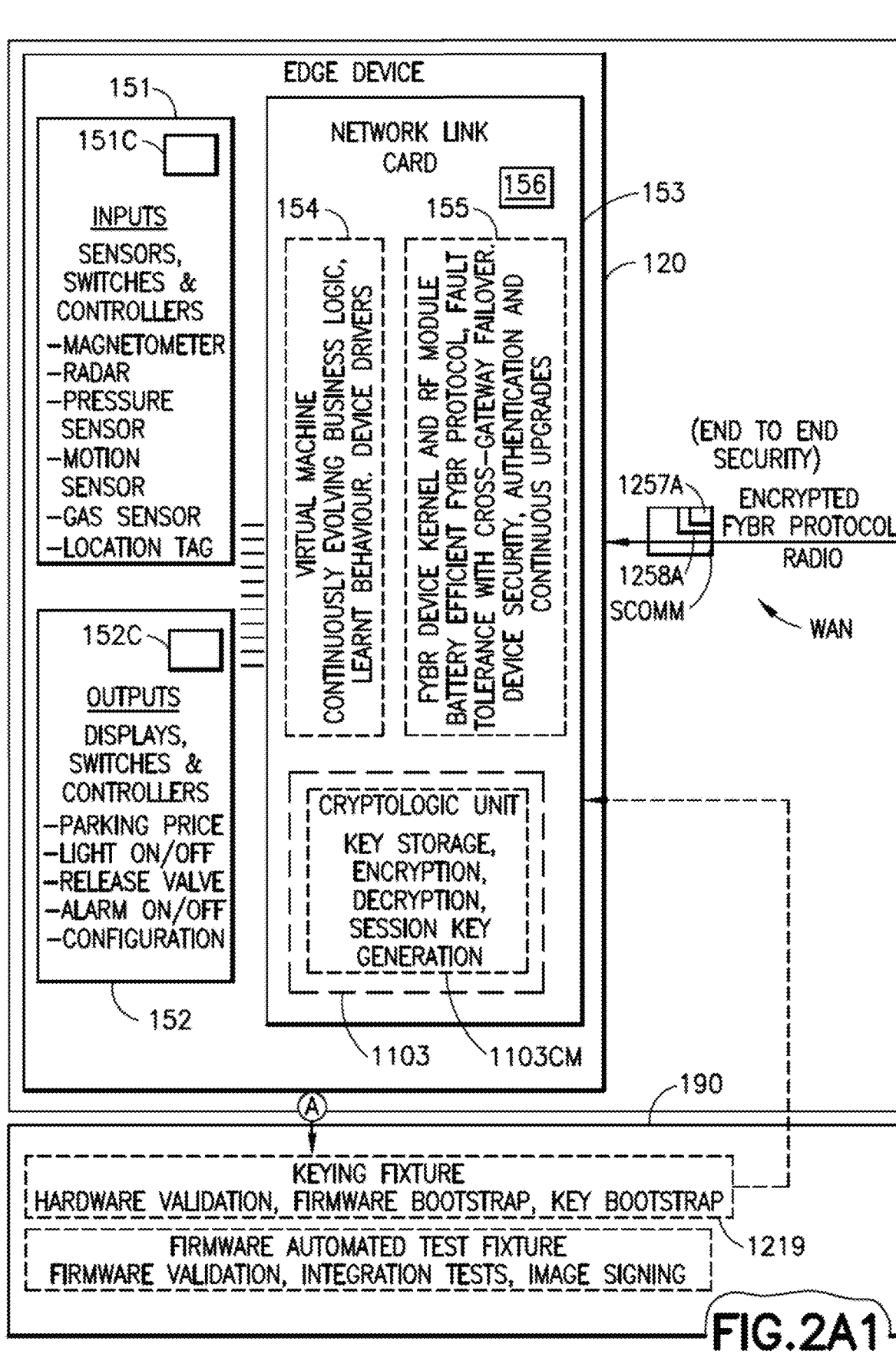

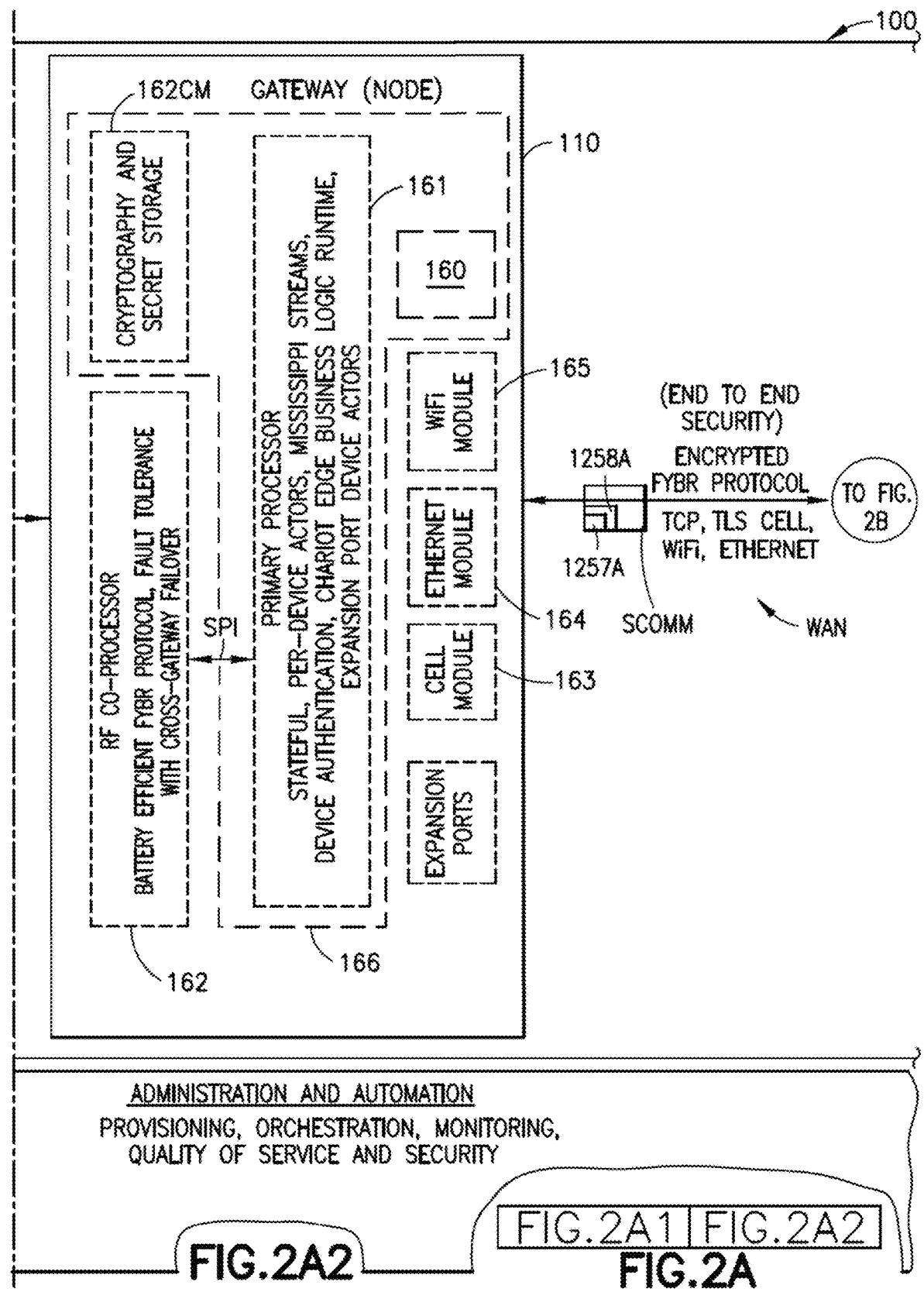

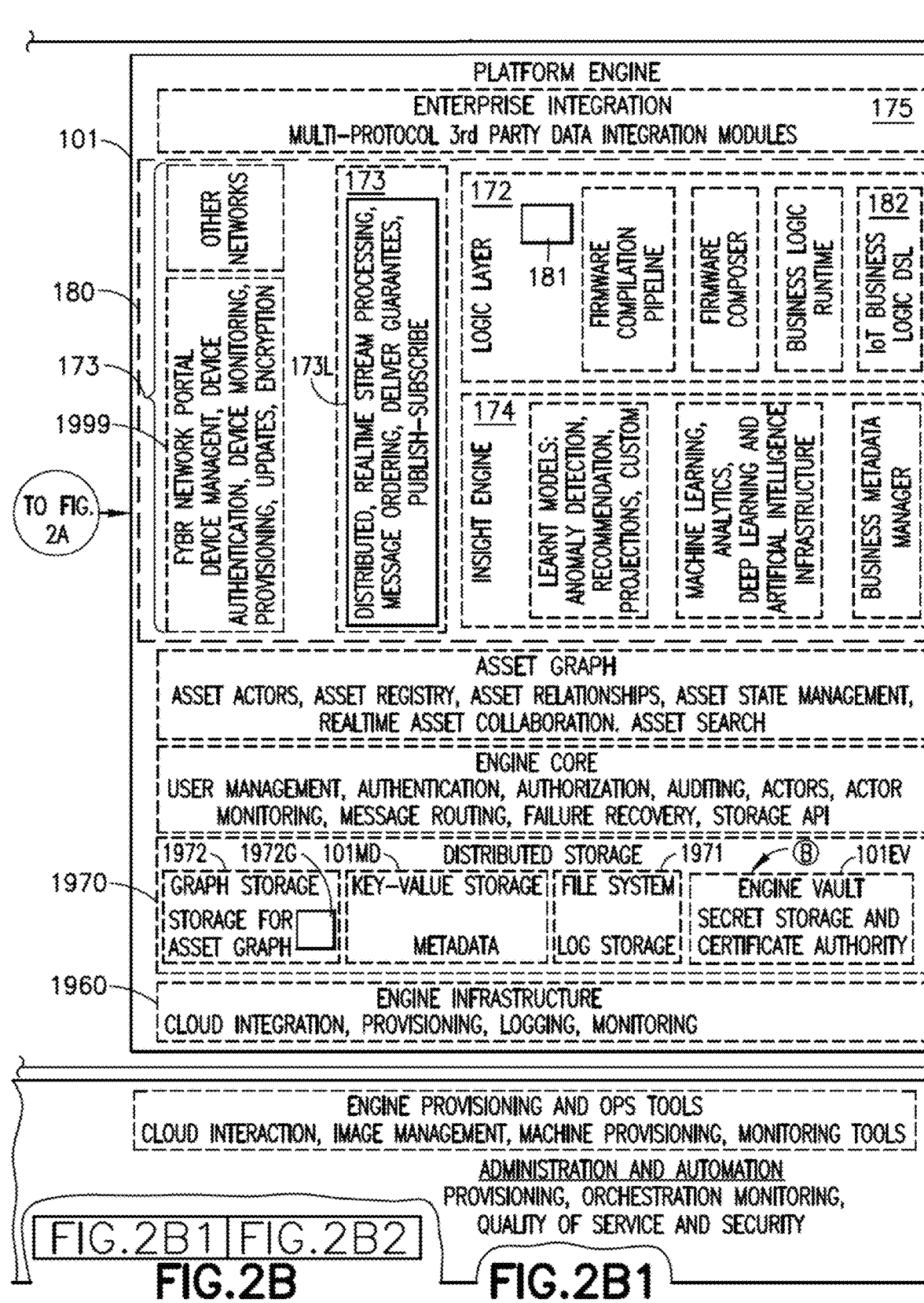

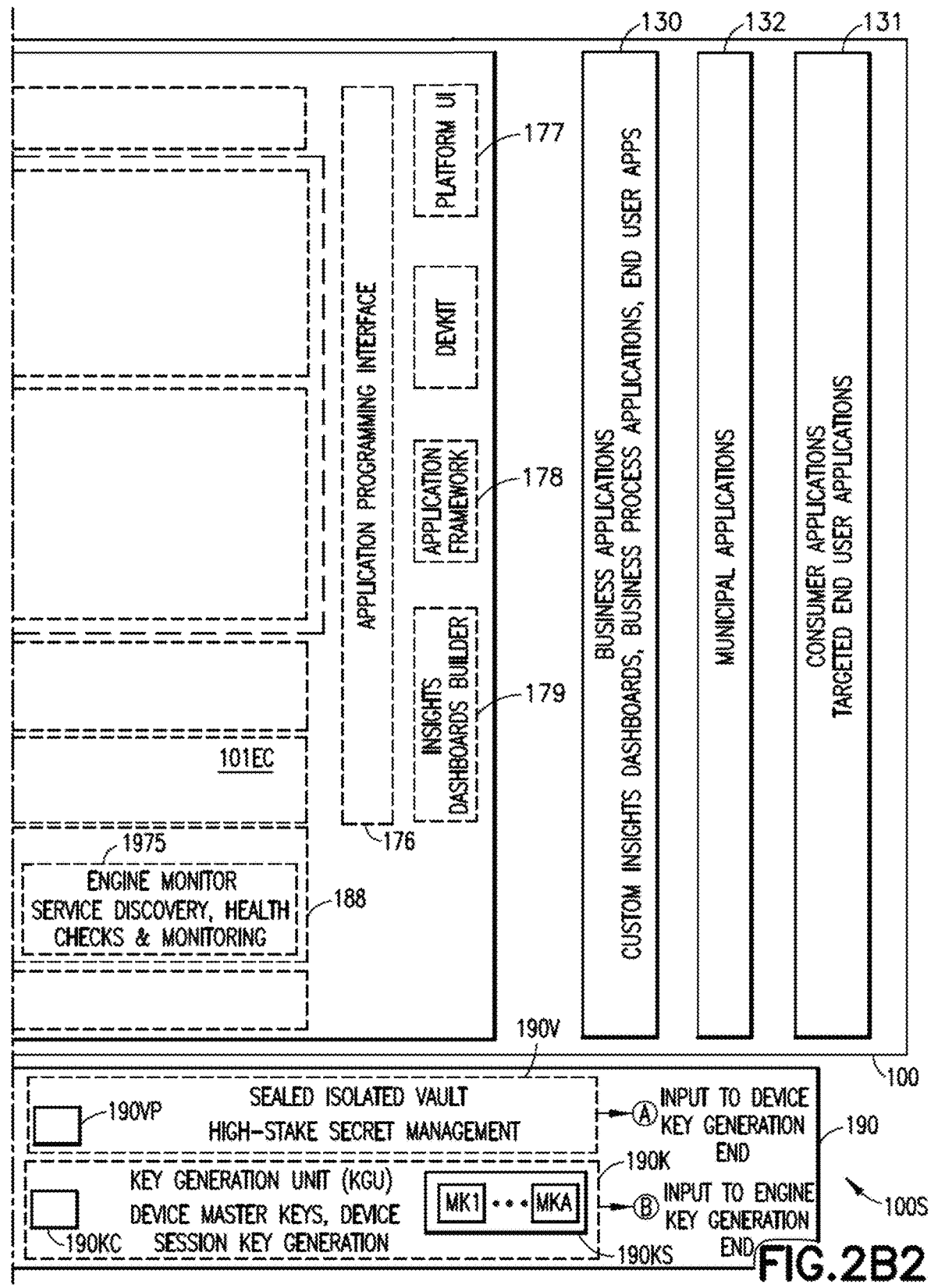
FIG.2B2

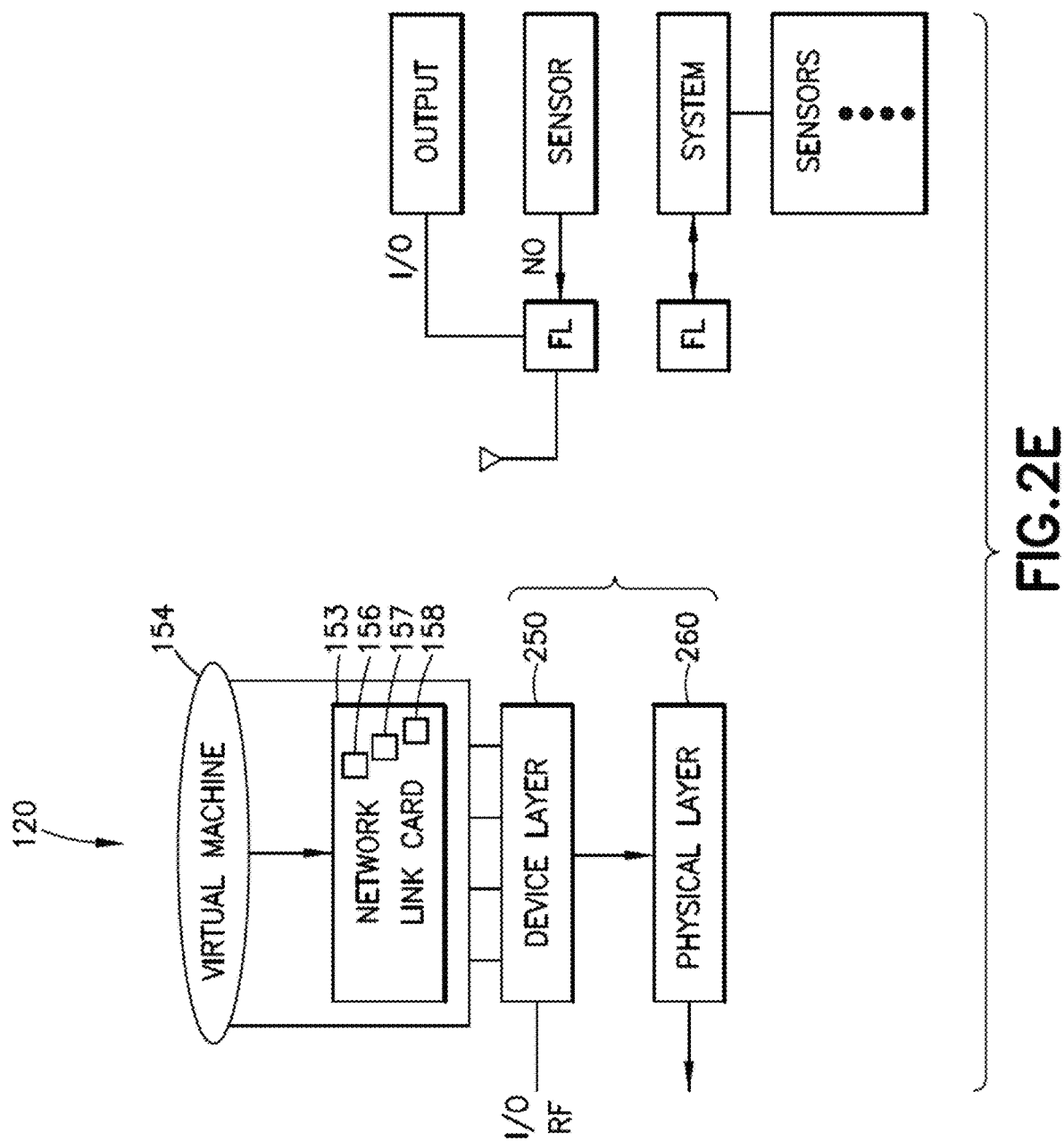

|  | STATE/METADATA | EVENTS | GRAPH DATA | TIME SERIES DATA | SECRETS |  |
|---|---|---|---|---|---|---|
| APPLICATION DATA | APPLICATION STATE | APPLICATION EVENTS | LAMBDAS/TYPES | APPLICATION LOGS | API KEYS | |
| BUSINESS DATA | BUSINESS CONTEXT | BUSINESS EVENTS | BUSINESS INTEREST | AUDIT LOGS | IDENTITIES | |
| ASSET DATA | ASSET METADATA | ASSET EVENTS | ASSET RELATIONS | ASSET HISTORY | ACLs | |
| DEVICE DATA | DEVICE METADATA | DEVICE EVENTS | DEVICE RELATIONS | DEVICE HISTORY | DEVICE KEYS | |
| USER DATA | USER PROFILES | USER ACTIONS | USER INTEREST | USAGE HISTORY | PASSWORDS/TOKENS | |
| SYSTEM DATA | METRICS | OPERATIONAL EVENTS | TOPOLOGY | SYSTEM LOGS | SSH KEYS | 1970 |

SYSTEM FOR DISTRIBUTED INTELLIGENT REMOTE SENSING SYSTEMS

CROSS-REFERENCE TO RELATED APPLICATIONS

This application is a non-provisional of and claims the benefit of U.S. provisional patent application No. 62/377,975 filed on Aug. 22, 2016, the disclosure of which is incorporated herein by reference in its entirety.

BACKGROUND

1. Field

The exemplary embodiments generally relate to distributed intelligent remote sensing systems and, more particularly, to distributed intelligent remote sensing systems for city or community management.

2. Brief Description of Related Developments

Conventional city, town or municipal infrastructure management and monitoring systems typically involve significant fragmentation in the monitoring and management system used. For example, a city may have a traffic system that is separate and distinct from a water quality system which monitors or manages water quality and yet other systems which monitor or manage other environmental or infrastructure conditions. There is typically no holistic arrangement and integration of information streams which improve the quality of living and improve efficiencies within a municipal environment. Typically, conventional systems typically involve a significant number of municipal employees who are tasked with monitoring or managing each conventional and monitoring system separately, which results in significant redundancy and lack of interoperability.

It would be advantageous to have a distributed intelligent remote sensing system that addresses management of city, town or municipal infrastructure and monitoring systems in a holistic manner.

BRIEF DESCRIPTION OF THE DRAWINGS

The foregoing aspects and other features of the present disclosure are explained in the following description, taken in connection with the accompanying drawings, wherein:

FIGS. 2A-2E are schematic illustrations of an Internet of things (IoT) network system in accordance with aspects of the present disclosure;

FIG. 22 is an exemplary illustration of a distributed storage in accordance with aspects of the present disclosure;

DETAILED DESCRIPTION

Figure 1:
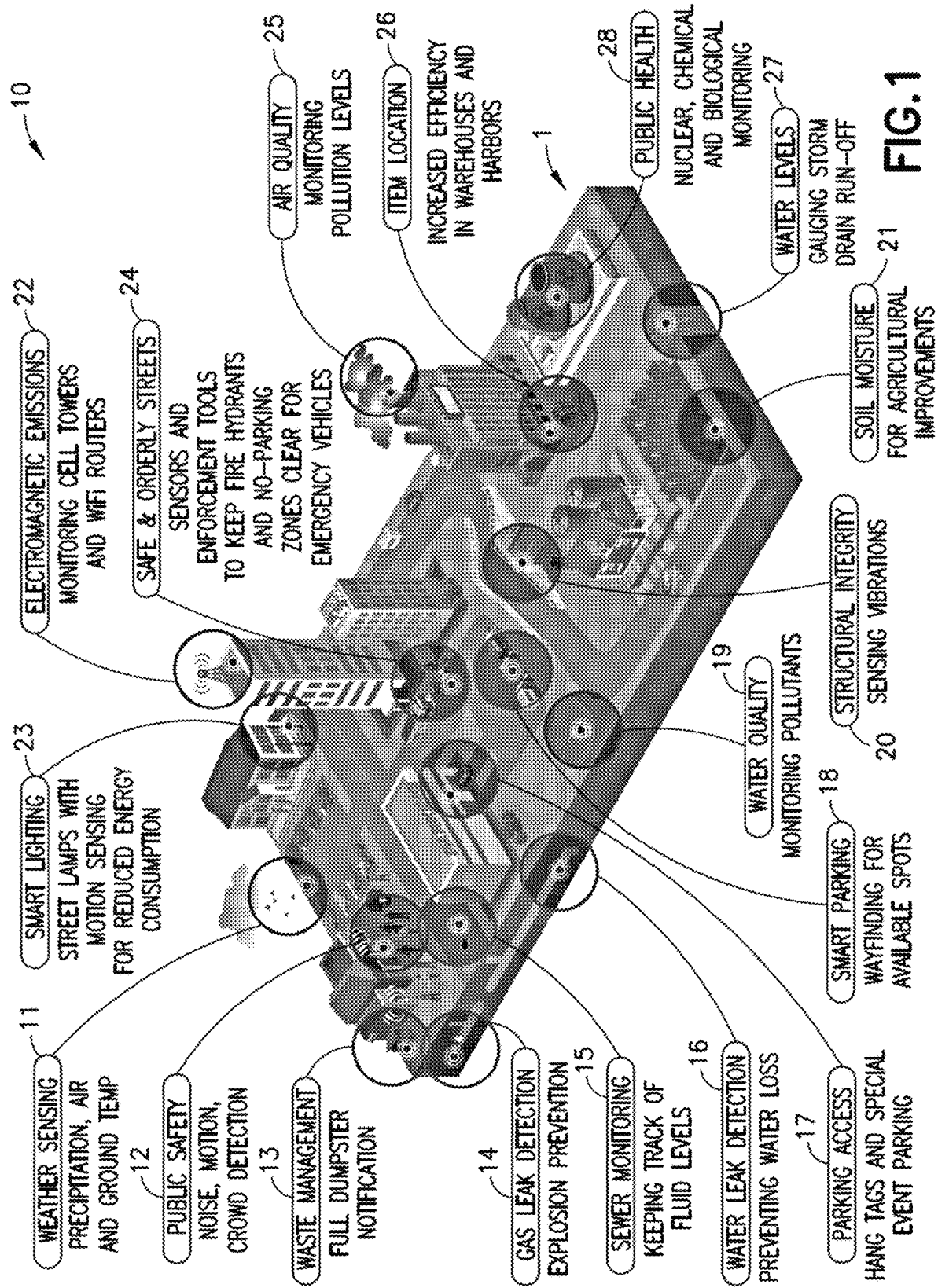
FIG. 1 is a schematic illustration of a sensory environment in accordance with aspects of the present disclosure.

FIG. 1 is an exemplary illustration of a sensory environment 10 within a smart city environment complex 1 in accordance with aspects of the present disclosure. In one aspect, the sensory environment 10 provides for intelligent habitation, whether in urban (e.g. cityscapes), suburban or rural environments, in which edge device information streams are arranged in a holistic manner to improve the quality of living and improve efficiencies in operation of the smart city environment complex 1. For example, the sensory environment 10 can be employed to reduce expenditures for a city by reducing costs associated with time and manpower necessary for managing and monitoring conditions or infrastructure within the smart city environment complex 1. In one aspect, the sensory environment 10 also reduces costs associated with energy use, reduced need for maintenance and better monitoring for replacement. The sensory environment 10 of the smart city environment complex 1 can, in one aspect, improve efficiency to both inhabitants (e.g. visitors and residents) as well as improve the maintenance, operation and administration of the smart city environment complex 1. Further, in one aspect, the sensory environment 10 of the smart city environment complex 1 provides for vertical solutions for parking management, street light management, public safety management, utility management, environmental monitoring and sewage monitoring.

In one aspect, as shown in FIG. 1, the sensory environment 10 includes diverse types of sensors 11-28 distributed within the smart city environment complex 1. In one aspect, each of the multiple types of sensors 11-28 has a different sensor capability configured to defect a different sense characteristic. For example, in one aspect, the types of diverse sensors 11-28 can include, for example, weather sensors 11 (configured to detect precipitation, air and ground temperatures), public safety sensors 12 (configured to detect noise, motion or crowd detection), waste management sensors 13 (configured to detect the dumpster status), gas leak sensors 14, sewer monitoring sensors 15 (configured to track sewer fluid levels), water leak sensors 16 (configured to monitor water mains), parking access sensors 17, smart parking sensors 18 (e.g. to detect available parking spots), water quality sensors 19, structural integrity sensors 20 (configured to detect vibrations of buildings, bridges or roads), and soil moisture sensors 21 (configured for agricultural, horticultural or grounds keeping purposes). In other aspects, the types of sensors 11-28 can also include, for example, electronic emission sensors 22 (configured to monitor cell tower and wireless communication), smart lighting sensors 23 (for example, street lights with motion sensors or ambient lighting sensors to reduce energy consumption), street safety sensors 24 (for example, configured to detect obstruction near fire hydrants or no-parking zones so that those zones are clear for emergency vehicles), air quality sensors 25 (e.g. configured to detect, for example, pollution, ozone or pollen), item location sensors 26 (for example, configured to track municipal assets, tools, vehicles or inventory), water level sensors 27 (for example, configured to detect storm drain run-off or water reservoir/water tower levels), or public health sensors 28 (for example, configured to detect nuclear, biological or chemical contaminants). In yet other aspects, the types of diverse sensors 11-28 can include any suitable sensor having any sensor characteristic configured to detect any environmental or infrastructure condition.

In one aspect, the sensory environment 10 within a smart city environment complex 1 includes thousands of sensors 11-28 distributed throughout the smart city environment complex 1. Generally, the diverse sensor data from the multiple sensors 11-28 are organized, analyzed, resolved and integrated by the system (described in greater detail below) for a holistic solution and dissemination. Without organization, analysis and integration of diverse sensor data from multiple sensors 11-28, there would be substantially chaos and sensory noise. In one aspect, the sensory environment 10 also includes distinct logic modules or logic layers distributed throughout the system at multiple levels (e.g. at the edge device level, gateway level, and platform engine level, as described in greater detail below) so that analysis and solution/resolution of relevant sensory data and information is optimized. The distributed logic modules provides for real-time or exigent information to be handled at the optimal level and have the capability to provide optimal resolution of diverse sensory data from the sensors 11-28.

Figure 1A:
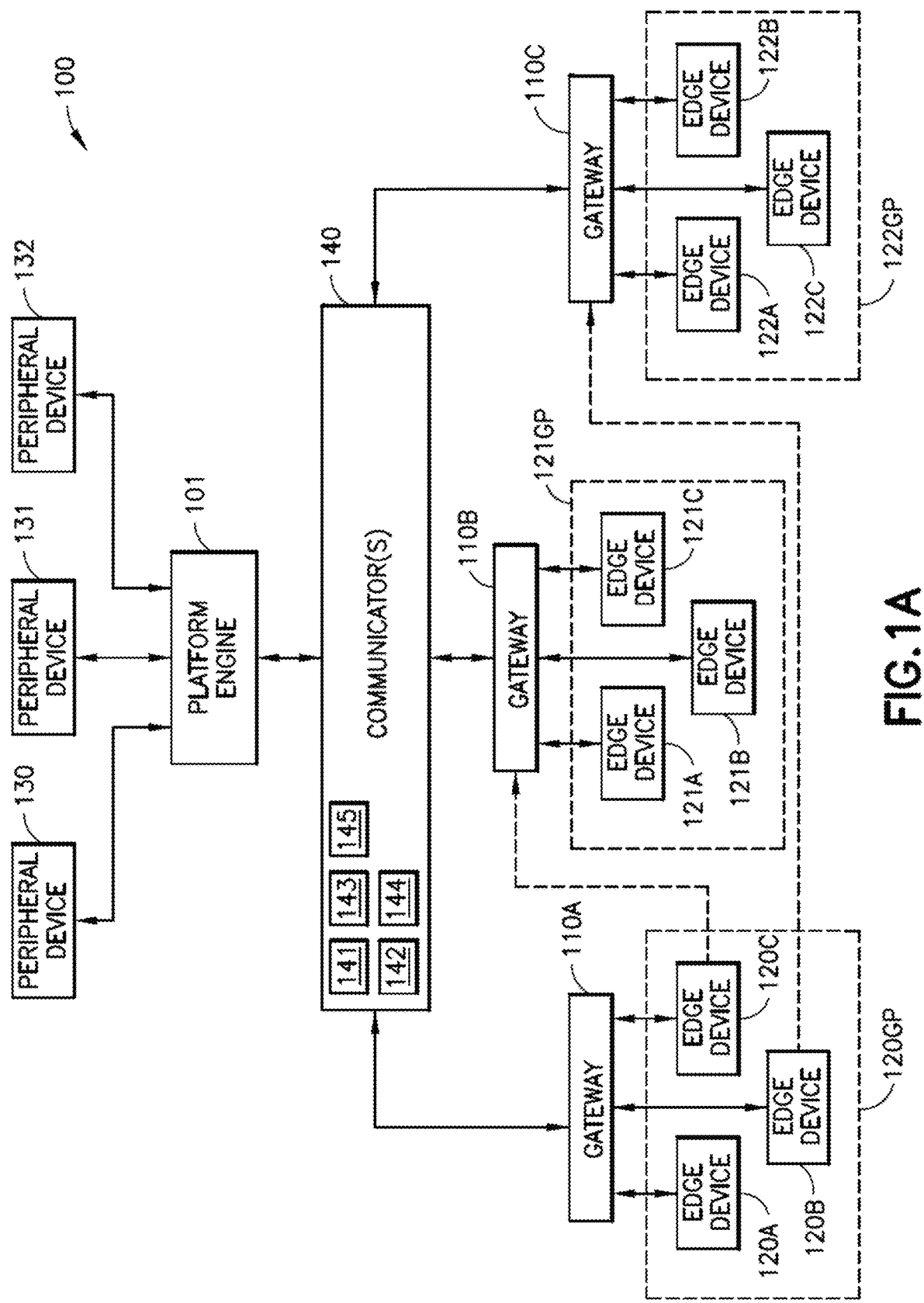
FIG. 1A is a schematic illustration of an Internet of things (IoT) platform system in accordance with aspects of the present disclosure.

FIG. 1A is a schematic illustration of a portion of an Internet of things (IoT) platform system 100 in accordance with aspects of the present disclosure. The IoT platform system 100 may be included in an Internet of things (IoT) network system 100S as will be described in greater detail below. The Internet of things (IoT) platform system 100 operates in and takes advantage of the sensory environment 10 within the smart city environment complex 1 and includes edge devices 120A-C, 121A-C and 122A-C (generally referred to as edge device 120 herein) for sensing sensor characteristics such as vehicle detection, traffic patterns, vehicle navigation or vehicle positioning. In other aspects, the edge device 120 is also coupled to or integrated with the diverse sensors 11-28 described above and are configured for sensing characteristics such as, for example, weather, public safety, waste management, gas leaks, sewer sensing, water leaks, parking sensing, smart parking sensing, water quality, structural integrity, soil moisture, electromagnetic emissions, smart lighting, safe and orderly street sensing, air quality, item tracking and location, water level, public health hazards or any suitable predetermined sensing characteristic as described above with respect to diverse sensors 11-28. Although the aspects of the present disclosure will be described with reference to the drawings, it should be understood that the aspects of the present disclosure can be embodied in many forms. In addition, any suitable size, shape or type of elements or materials could be used.

In one aspect, the Internet of things (IoT) platform system 100 may include a platform engine 101, one or more IoT gateways 110A-110C (generally referred to as gateway/node 110, IoT platform communication network nodes 110 or network node device 110 herein), one or more IoT edge device groups 120GP-122GP (comprising the edge devices 120A-C, 121A-C and 122A-C) and one or more peripheral devices 130-132. In one aspect, each of the one or more edge device groups 120GP-122GP are groups comprising of substantially the same type of edge devices 120A-C, 121A-C and 122A-C configured to detect or measure substantially the same kind of sensing characteristic, each of the one or more edge device groups 120GP-122GP are associated with a common gateway 110A-C. In other aspects, the one or more edge device groups 120GP-122GP can include diverse types of edge devices 120A-C, 121A-C and 122A-C configured to measure or detect any suitable sensing characteristics, each of the one or more edge device groups 120GP-122GP further being associated with a common gateway 110A-C. In other aspects, the Internet of things (IoT) platform system 100 includes any suitable number and type of components to facilitate, for example, the monitoring of the vehicle parking spaces or environmental conditions or infrastructure conditions associated with the Internet of things (IoT) platform system 100.

The platform engine 101 includes any suitable controller capable of communicating with and controlling the one or more gateways 110A-110C (and edge devices 120A-C, 121A-C and 122A-C of the edge device groups 120GP-122GP in communication with the one or more gateways 110A-110C) and the one or more peripheral devices 130-132. In one aspect, the platform engine 101 is configured to use any suitable wireless or wired communication interface link that extends from the edge device groups 120GP-122GP (and their respective edge devices 120A-C, 121A-C, 122A-C) and the gateways 110A-110C to the platform engine 101 and from the platform engine 101 to the peripheral devices 130-132. In one aspect, it is noted that the interface link may include a single communication protocol or a combination of different communication protocols. In one aspect, the wireless or wired communication interface link between the edge device groups 120GP-122GP, the gateways 110A-110C and the platform engine 101 is encrypted and closed to third parties to minimized potential for hacking or interception of communications between the edge devices 120A-C, 121A-C and 122A-C, the gateways 110A-C, the platform engine 101 and the peripheral devices 130-132.

In one aspect, the communication between at least the platform engine 101 and one or more of the gateways 110A-110C (as well as the sensing devices) and/or peripheral devices 130-132 may be through a cellular communication link 141, a satellite communication link 142, public switched telephone network 145, Internet/World Wide Web 143, Ethernet 144, local area network or other suitable wireless or wired protocol or connection. In one aspect communications from the edge devices in the edge device groups 120GP-122GP may be provided substantially in real time to the platform engine 101 and/or peripheral devices 130-132.

The platform engine 101 may include, in one aspect, one or more processors, a memory and any other suitable hardware/software configured to track and report, for each parking space being monitored, a user of the parking space, parking space assignments/allocations, time of arrival, time of departure, transaction rates, user account monetary balances, billing transactions, parking violations, parking space availability or any other suitable information pertaining to the use and billing of each parking space monitored by the Internet of things (IoT) platform system 100. Similarly, in one aspect, the one or more processor and memory is also configured to track, react, process and resolve resolutions for each of the different monitored systems monitored by the sensors 11-28 described herein. The platform engine 101 may be configured with one or more user interfaces to allow a user or recipient access to, administration of and operation of the platform engine 101. In one aspect the platform engine 101 may be any suitable computing device having a monitor, keyboard and/or other suitable user interface. In other aspects, the platform engine 101 is a cluster of computing devices, a distributed computing device or a cloud-based system backend. In other aspects, one or more of the peripheral devices 130-132 may provide a user interface for accessing and operating the platform engine 101 either through any suitable long or short range wireless communication link and/or through a wired connection as described above. The platform engine 101 may be configured to receive any suitable data from the edge devices 120A-C, 121A-C and 122A-C. The data sent from the edge devices 120A-C, 121A-C and 122A-C may include or otherwise embody, for example, any suitable data related to a parking space being monitored, vehicle detection, and or a health and welfare/maintenance status of the sensing device. In other aspects, the data sent from the edge devices 120A-C, 121A-C and 122A-C may include or otherwise embody any suitable sensor data measuring any suitable sensor characteristic as described above with respect to sensors 11-28. In one aspect the platform engine 101 may be configured to perform any suitable processing on the data from the edge devices 120A-C, 121A-C and 122A-C while in other aspects the data from the edge devices 120A-C, 121A-C and 122A-C may be configured, e.g. without processing by the platform engine 101, for display on one or more of the peripheral devices 130-132.

In one aspect, one or more of the peripheral devices 130-132 may include, for example, an enforcement unit which may be a hand held unit for use by parking/law enforcement personnel. The enforcement unit may be configured to report parking violations and/or the issuance of parking tickets to the platform engine 101 so that electronic ticketing and data capture is integrated into the distributed remote sensing system. For example, a law enforcement officer using a peripheral device 130-132 may arrive at a parking space after being notified of a violation and make a visual inspection of the parking space to verify that there is a vehicle in violation of a law. The violation may be entered into the peripheral device 130-132 and optionally pictures of the vehicle in violation can be taken with the peripheral device or otherwise loaded into the peripheral device. As such, violation data entered into the peripheral device 130-132 is automatically captured and stored in a memory, such as a memory of the platform engine 101 in substantially real time. As may be realized storing the violation information within the Internet of things (IoT) platform system stops the system from alerting an enforcement officer to that space until another violation threshold is met or a new vehicle parks in the space. In another aspect, the sensing devices may also be used in non-parking spaces such as in front of fire hydrants, fire lanes, cross walks, intersections, etc. The Internet of things (IoT) platform system 100 can be configured to create a violation after any suitable predetermined time period whenever a vehicle is parked in one of these non-parking spaces so that an alert is sent to an enforcement officer through, for example, a peripheral device 130-132.

In other aspects, one or more of the peripheral devices 130-132 may include other devices or recipient terminals which can be configured to monitor a sensor characteristic (for example, those associated with sensors 11-28 described herein). For example, the one or more of the peripheral devices 130-132 can include gas leak monitors, water leak monitors, sewage monitors, waste management monitors at a municipal command center. In other aspects, the one or more peripheral devices 130-132 can also include, for example, privately owned or operated monitors, such as, for example, a soil moisture monitor operated by a farm, electromagnetic emissions monitors operated by a telecommunications company, water sensors owned by a privately owned municipal wafer source, or radiation monitors operated by a nuclear power plant. In yet other aspects, the one or more peripheral devices 130-132 can include any user terminal configured to display or monitor diverse sensory data from sensors 11-28 described herein.

As may be realized, the Internet of things (IoT) platform system 100 may incorporate any suitable edge devices types such as, for example, thermocouples, moisture sensors, radiation or chemical sensors, light sensors, magnetometers, radars, vibration sensors, accelerometers, air quality sensors, electromagnetic emission sensors, motion sensors, capacity sensors, cameras and infrared sensors that may be used in conjunction with the edge devices of the edge device groups 120GP-122GP. Information from the sensors may be used in conjunction with the data provided by the other sensing devices associated with the edge device groups 120GP-122GP to track environmental or infrastructure conditions to provide a holistic (e.g. interconnected and integrated) management of data from sensors 11-28.

The one or more of the peripheral devices 130-132 may also include, for example, a unit for use by, for example, recipient accessing the parking spaces that are monitored by the Internet of things (IoT) platform system 100. In one aspect, the unit may be a dedicated vehicle parking system hand held unit while in other aspects the unit may be integrated into a user's wireless phone, vehicle GPS unit, or other user computing device such as through an application program capable of running on the wireless phone, GPS unit or other computing device. In still other aspects the handheld unit may be implemented in any suitable manner for allowing the recipient to, for example, monitor street safety, air quality, weather, public safety, gas leaks, sewers, water leaks, parking access, parking spots, water quality, structural integrity, soil moisture, electromagnetic emissions, smart lighting, air quality, asset location and tracking, water levels and public health sensors. The unit may provide a recipient with wayfinding information, e.g. based on data provided by the edge devices of the edge device groups 120GP-122GP, that includes, for example, a substantially real time view of the availability of parking (and routing thereto) throughout the deployment area of the distributed remote sensing system. The unit may be configured to allow a recipient to select a location and see how full the parking spaces are in an area using, for example, color coded or other suitable indicators. Pricing to park in each parking space may also be provided. The wayfinding information provided by the unit may also allow a recipient to keep track of where they park. In one aspect the unit may include or be used in conjunction with a global positioning system or other mapping data to provide a recipient with traffic information related to the parking spaces so that the recipient can select, for example a parking lot exit or street that is not congested with vehicles leaving parking spaces monitored by the distributed remote sensing system.

As noted previously, in one aspect, the platform engine 101 may be connected to the one or more gateways 110A-110C (and to the edge device groups and edge devices associated with the one or more gateways 110A-110C) in any suitable manner. In one aspect one or more communicators 140 may be used as a communication link between the gateways 110A-110C and the central controller 101. The one or more communication links 140 may include, for example, one or more cell towers/providers in a cellular communication network. In other aspects the one or more communication links 140 may include, for example, one or more satellites in a satellite communication network, a public switched telephone network, Internet/World Wide Web access points or any other suitable communication access points such as those used in the wired and/or wireless communication protocols described above. In still other aspects the one or more communication links 140 may be a combination of cellular and satellite communication or any other suitable wired or wireless communication link.

Figure 2C:
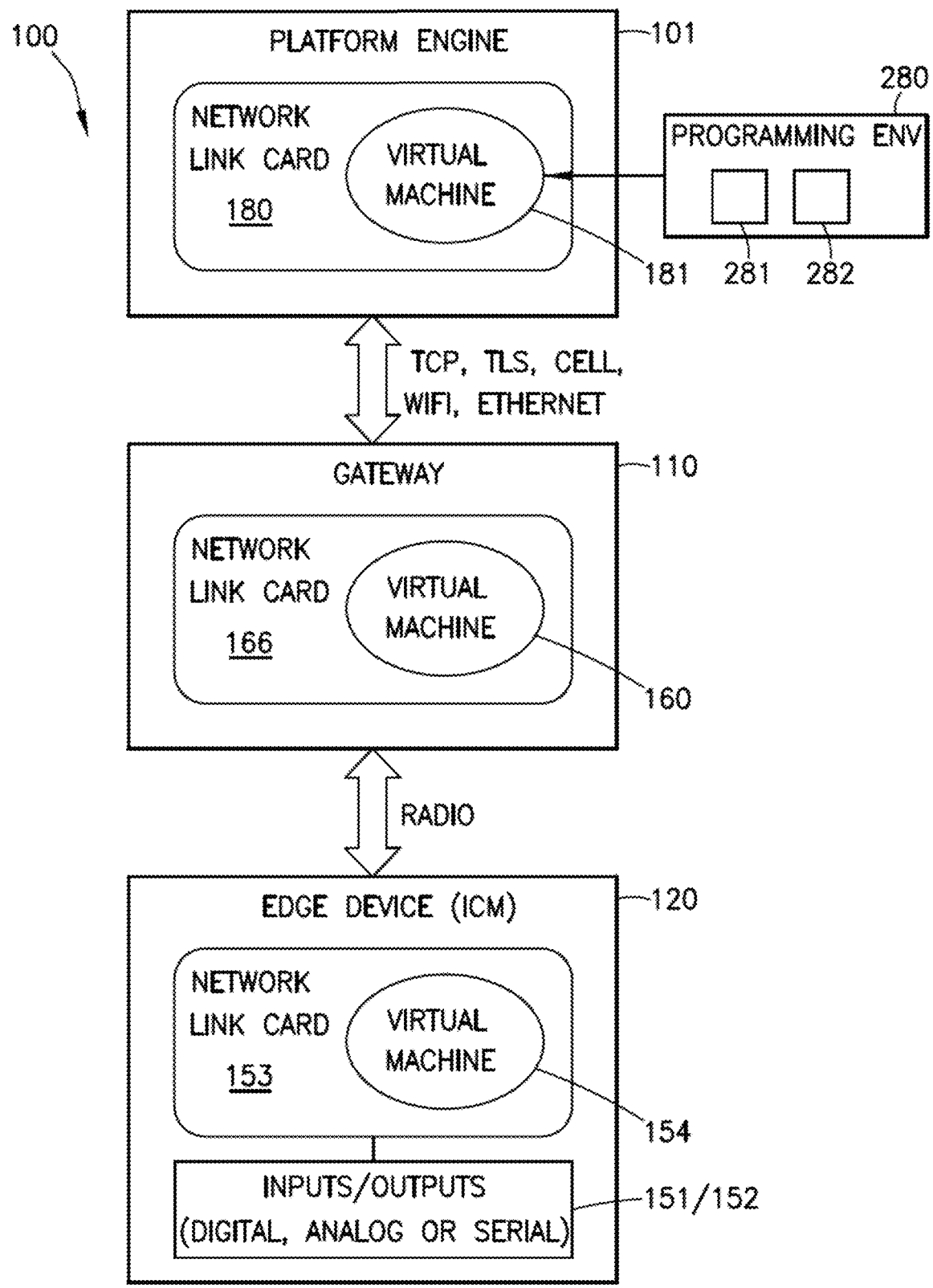

Referring now to FIGS. 2A, 2B, and 2C, additional schematic diagrams of the Internet of things (IoT) network system 100S including the IoT platform system 100 are shown. FIGS. 2A and 2B is representative of a single edge device 120 connected to a single gateway 110 to the platform engine 101 and out to the peripheral devices 130-132. In one aspect, FIGS. 2A and 2B is substantially another representation of the Internet of things (IoT) platform system 100 illustrated in FIG. 1A. As shown in FIGS. 2A and 2B, the Internet of things (IoT) platform system 100 includes the edge device 120, which communicates with the gateway 110, which in turn communicates with the platform engine 101, which disseminates data to peripheral devices 130-132. As shown in FIG. 2C, in one aspect, the Internet of things (IoT) platform system 100 is configured as a distributed system of virtual machines 154, 160, 181 functioning as, for example, programmable hardware and software. In one aspect, the respective virtual machine 154, 160, 181 of the at least one IoT platform system control engine 101, the at least one network node device 110, and the at least one IoT edge device 120 are configured to execute a specific IoT task. In one aspect, the respective virtual machine 154, 160, 181 of the at least one IoT platform system control engine 101, the at least one IoT network node device 110, or the at least one IoT edge device 120 are configured to execute portions of the specific IoT task, wherein the portions of the specific IoT task are distributed based on capacity and efficiency characteristics of the respective virtual machine 154, 160, 181 of the at least one IoT platform system control engine 101, the at least one IoT network node device 110, or the at least one IoT edge device 120.

Referring again to FIGS. 2A, 2B, and 2C, in one aspect, the hardware and software for the edge device 120, gateway 110 and platform engine 101 each respectively define a secure system space (e.g. within the respective network link card 153, 166, 180 which may include firmware for each respective device), as well as a user defined/configurable space in the form of the virtual machines 154, 160, 181 operating within the respective network link card 153, 166, 180. The secure system space controls, for example, interactions between each respective device (e.g. the edge device 120, gateway 110 and network operations controller 101) and the network and/or low level hardware operations (e.g. controlling how physical hardware communicates with each respective device at a physical layer or device layer). The secure system space within the network link card 153, 166, 180 are secured and not changeable by an end user or an administrator. Each edge device 120, gateway 110 and the platform engine 101 further includes respective virtual machines running within the firmware, which defines a user configurable space at each device level. For example, the respective virtual machine of an edge device 120 allows for user configuration of the interface between, for example, various diverse sensor input and output. Each respective virtual machine 154, 160, 181 further provides for, for example, a common interface for user customization. The virtual machines 154, 160, 181 are thus configured to run user defined or user customized scripting, rules or code to customize the functionalities of the edge device 120, gateway 110 and the platform engine 101. User customization is possible, in one aspect, in the form of a scripting language interpreter or in the form of visual configuration as described in greater detail below. In one aspect, the secure system space defined within each respective virtual machines 154, 160, 172 of the edge device 120, gateway 110 and platform engine 101 are isolated so as to prevent end user access and abuse by buggy or malicious code within the respective virtual machines 154, 160, 172. In one aspect, the IoT edge device 120 secure system space is configured to be secured to prevent unauthorized access and the IoT edge device 120 user defined space is configured to receive and execute user defined instructions to form the distributed system of virtual machines 154. In another aspect, the secure system space of the IoT edge device 120 and the network nodes 110 is configured to be secured to prevent unauthorized access and the user defined space of the IoT edge device 120 and network node 110 is configured to receive and execute user defined instructions to form the distributed system of virtual machines 154, 160. In still another aspect, the secure system space of the IoT edge device 120, the platform engine 101 and the network nodes 110 is configured to be secured to prevent unauthorized access and the user defined space of the IoT edge device 120, the platform engine 101 and network node 110 is configured to receive and execute user defined instructions to form the distributed system of virtual machines 154, 160, 172.

Figure 11:
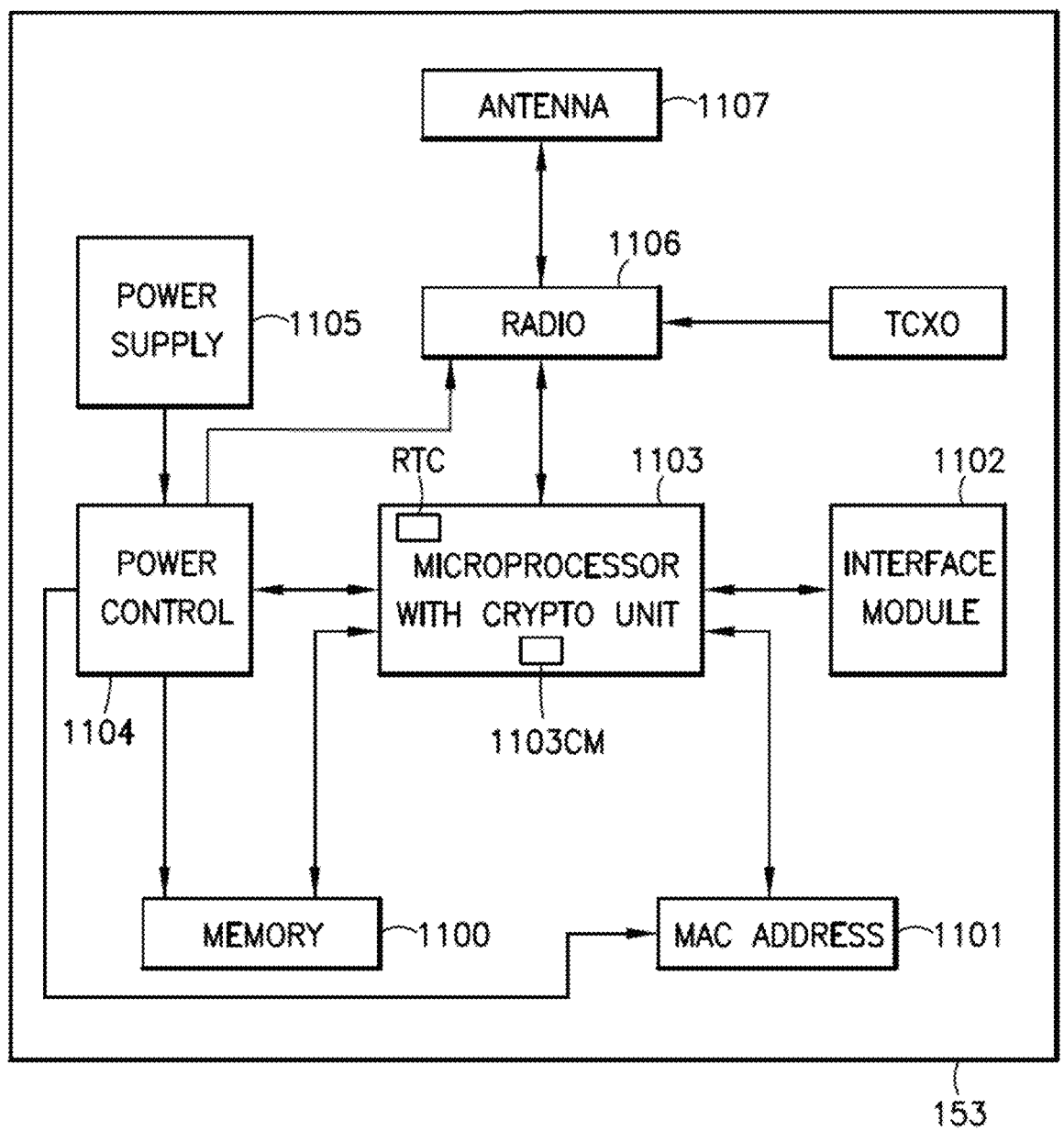
FIG. 11 is a schematic illustration of a network link card in accordance with aspects of the present disclosure.
Figure 12A:
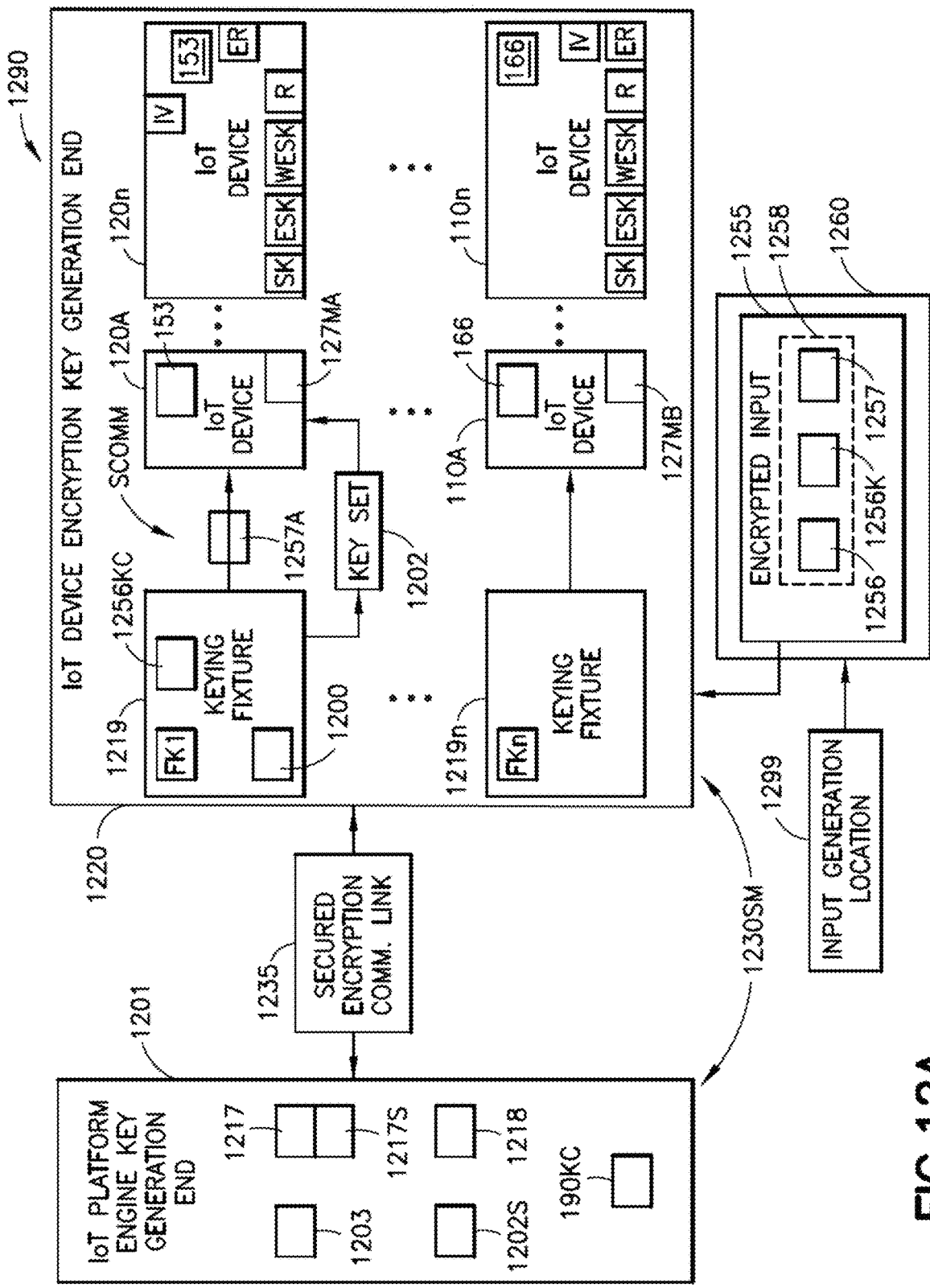
FIG. 12A is a schematic illustration of an IoT platform system in accordance with aspects of the present disclosure.
Figure 12B:
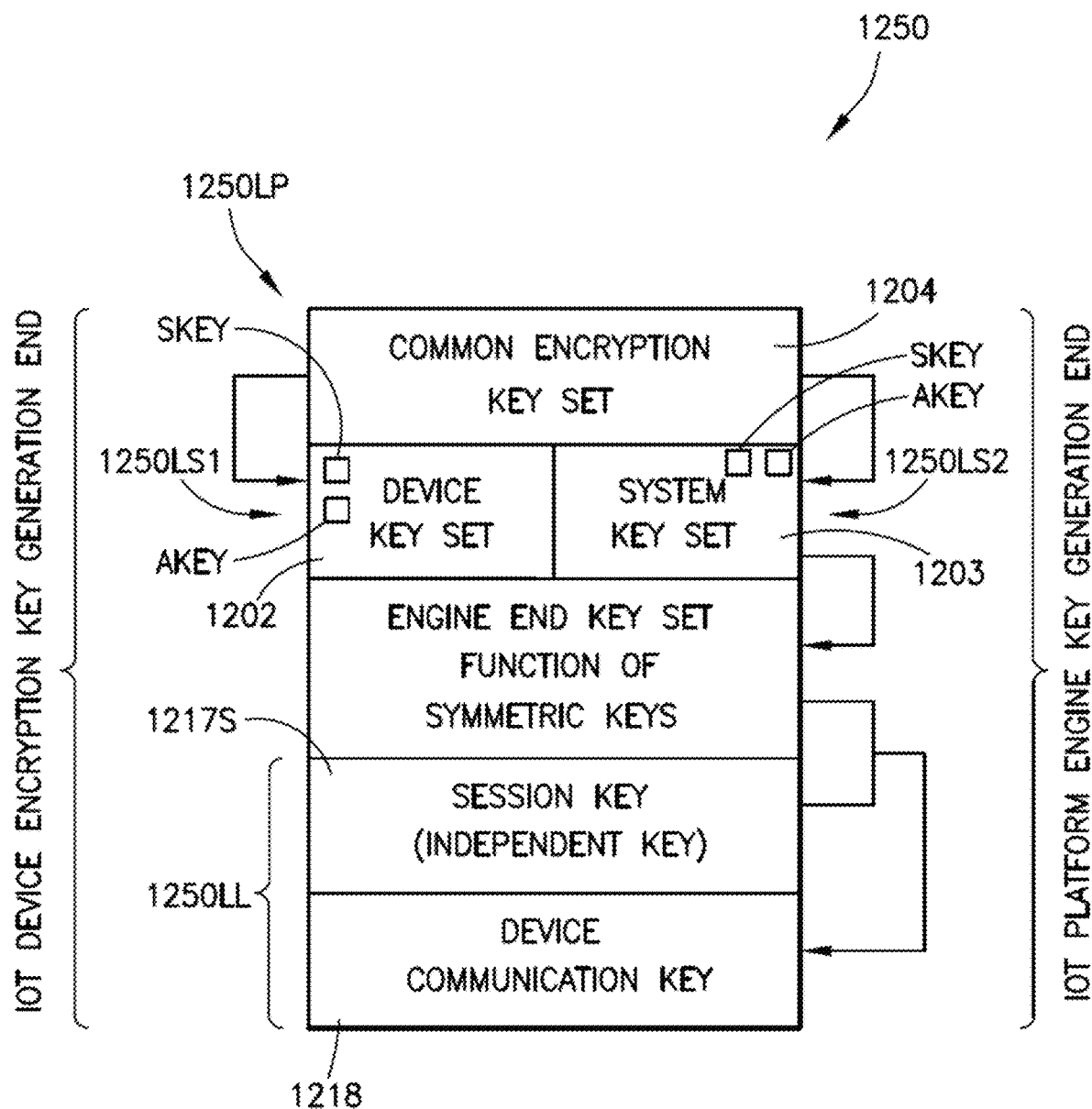
FIG. 12B is a schematic illustration of an encryption scheme in accordance with aspects of the present disclosure.

Referring to FIGS. 2A, 2B, and 11, each network link card 153, 166, 180 (also referred to as an IoT device link) will be described. The network link card 153 is shown in FIG. 11 for exemplary purposes and the network link cards 166, 180 may have a similar configuration. The network link card 153 includes a processor 1103 (also referred to as a microcontroller), a memory 1100, a media access control (MAC) address 1101 storage, interface module 1102, a power supply 1105, a power controller 1104, a communication module 1106 and an antenna 1107. The processor 1103 (where processor 162 is included in the IoT device 110) includes or is communicably coupled to a cryptologic unit 1103 CM (cryptologic unit 162CM is included in the IoT device 110). The processor 1103 is also communicably coupled to the memory 1100, the communication module 1106, the interface module 1102 and the MAC address module 1101. The processor 1103 is configured to execute non-transitory program code stored in the memory 100. The program code includes secure program code configured to be secured and prevent unauthorized access and user defined program code configured to execute user defined instructions. In one aspect, the processor 1103 includes or is coupled to a cryptologic unit 1103CM configured to encrypt and decrypt data transmitted and received by the IoT network link card 153.

The interface module 1102 provides for processor 1103 communication with other components of the IoT edge device 120, IoT gateway 110 or platform engine 101 in which the network link card 153, 166, 180 is installed. For example, the interface module 1102 is configured to connect and control at least one input 151 and output 152 of an IoT device link sensor 11-28. In one aspect, the interface module 1102 is common for the IoT device link sensor 11-28 where the IoT device link sensor includes sensors corresponding to one or more of weather, public safety, waste management, gas leak, sewer monitoring, water leak, parking access, smart parking, water quality, structural integrity, soil moisture, electronic emission, smart lighting, street safety, air quality, item location, water level or public health sensors. In one aspect, the user defined program code is configured to control the operation of the at least one input 151 and output 152 of the IoT device link sensor 11-28. In one aspect, the IoT device link sensor 11-28 senses a sensing characteristic (e.g., such as weather, public safety information, waste management information, gas leak information, sewer information, water leak information, parking information, water quality information, structural integrity information, soil moisture information, electronic emission information, lighting information, street safety information, air quality information, item location information, water level information or public health information) and the cryptologic unit 1103CM encrypts the sensing characteristic before the communication module 1106 and antenna 1107 transmits the sensing characteristic.

The power controller 1104 and power supply 1105 form a power supply and management module that is coupled to the memory 1100, the MAC address module 1101, processor 1103 (and cryptologic unit 1103CM), and communication module 1106, where the power supply and management module is configured to provide power to the IoT network link card 153.

The communication module 1106 is configured to transmit and receive data to and from the IoT network link card 153. In one aspect, a temperature compensated crystal oscillator (TCXO) is coupled to the communication module 1106. The communication module 1106 and antenna 1107 provide for communication over the wide area network (WAN) of the IoT platform system 100 so that at least one of the IoT edge device 120, IoT gateway 110 and platform engine 101 can communicate with another at least one of the IoT edge device 120, IoT gateway 110 and platform engine 101.

The MAC address module 1101 is configured to provide a unique network address for the IoT network link card 153. A real time clock RTC is also provided and is configured to clock processor 1103 operations.

Referring still to FIGS. 2A, 2B and 2C, in one aspect, the edge device 120 is a hardware and software module that interfaces to various sensor types and drives certain output devices. In one aspect, the edge device 120 integrates with various and diverse sensor types, and is configured to allow diverse sensor types (for example, the sensors 11-28 described herein) to communicate over the network. In one aspect, the edge device 120 is a microcontroller, chip or printed circuit board (PCB) which is configured to provide security by having a closed architecture to minimize the potential for hacking or access by unauthorized individuals. It is noted that the edge device 120 is distinct from a sensor or output device. Instead, the edge device 120 provides a common communication and control suite for interfacing with many different types of sensors (for example, the sensors 11-28 described herein). In one aspect, the secured architecture of the edge device 120 is defined by the network link card 153, which defines a secured system space as described below. The edge device 120 is further configured to provide the virtual machine 154, running within the network link card 153, which provides a common programming interface and allows user customization of edge devices 120 as well as their interaction with diverse sensor types and diverse outputs as described in greater detail below. In one aspect, the edge device 120 further provides for local logic or control architecture at the local edge device 120 level through the virtual machine 154.

In one aspect, the edge device 120 is configured to be coupled to or is integral with the diverse sensors of different sensor types (for example, the sensors 11-28 described herein) providing diverse types of sensor inputs 151. In one aspect, the edge device 120 is further configured to provide output 152 to, for example, displays, switches, data storage devices, registers or other controllers. In one aspect, the diverse sensors (e.g. sensors 11-28) coupled to the edge device 120 are configured to be low power sensors. As will be described in greater detail below, in one aspect, the edge device 120 includes the network link card 153. In one aspect, the network link card 153 defines a secure system space which is transparent and inaccessible to a user. In one aspect, the secure system space defined by the network link card 153 controls certain functionalities of the edge device 120, such as, for example, managing all interactions with network communications or low level hardware communications (for example, by communications module 155. By limiting access, by end users, to interactions with network communications or low level hardware communications, the secure system space of the network link card 153 provides a secured platform which prevents tampering and is resistant to being negatively affected by user defined code. For example, user defined code cannot lock up an edge device 120 because much of the core capabilities of the edge device 120 (e.g. the bootloaders, domain specific language interpreters, network communications drivers, physical level interaction with devices) are not accessible to the user defined code.

In one aspect, the network link card 153 includes the virtual machine 154 that provides a virtual machine runtime for a common interface for the diverse sensor types through the network link card 153 so that the inputs 151 and outputs 152 of the edge device 120 are of a common data structure. Further, in one aspect, the edge device 120 is generic and fungible and can be associated with any suitable sensor type (e.g., sensors 11-28 described herein) as well as any suitable output type. Because the edge devices 120 are generic and fungible, the data it receives from inputs 151 and output 152 are type independent or type agnostic and is free from being restricted to any specific data or sensor protocol. In one aspect, the virtual machine 154 is configured to be user programmable without affecting system security and integrity and facilitate decision-making, analysis and integration of sensor data from the edge device 120 coupled to diverse sensor types. In one aspect, the virtual machine 154 is configured to run user defined code or scripting to customize the functionality of the edge device 120. For example, in one aspect, the virtual machine 154 on the edge device 120 connected to a thermometer or thermocouple is configured to execute user defined or user programmable code which customize the edge device 120 so that it receives the sensor inputs as electrical signals and converts the electrical signals into a temperature reading. In another edge device 120, the virtual machine 154 might have a different functionality based on the user defined code customizing that particular edge device 120, for example a presence sensor for an automated parking system. In one aspect, the virtual machine 154 is also configured to facilitate interface between the edge device 120 and the common gateway 110 despite receiving data from diverse sensor types having different data structures or protocols. In one aspect, the network link card 153 also includes a communications module 155 which is configured to communicate with the gateway 110 with an encrypted communication protocol. The edge device 120 will be described in greater detail below. In one aspect, the virtual machine 154 of the edge device 120 is configured to provide for local logical operations at the edge device 120 level. For example, the virtual machine 154 may run code which defines certain predetermined sensor thresholds and actions to be performed when a certain predetermined sensor threshold is met.

Referring still to FIGS. 2A, 2B and 2C, in one aspect, the edge device 120 is communicable with the gateway 110. In one aspect, the gateway 110 includes a device actor module 161, a communication module 162 which is configured to communicate with the communications module 155 of the edge device 120 as well as the platform engine 101 by way of a wifi module 165, an Ethernet module 164 and a cellular module 163. In other aspects, the gateway module 110 includes any suitable communications module configured to communicate with the edge device 120 and the platform engine 101. In one aspect, the gateway 110 includes the network link card 166. The network link card 166 defines a complementary secured system space substantially similar to the secured system space defined by the network link card 153 of the edge device 120. In one aspect, the secured system space defined by the network link card 166 is configured to control, for example, network communications between the gateway 110 and other devices within the network (e.g. the network operations controller 101 and edge device 120). In yet other aspects, the secured system space defined by the network link card 166 also controls other low level hardware controls on the physical layer. In one aspect, the secured system space defined by the network link card 166 is inaccessible and transparent to an end user and is configured to prevent tampering by the end user. In one aspect, the secured system space is further configured to prevent user defined code from locking or affecting the performance of the gateway 110. In one aspect, the network link card 166 further includes a complementary virtual machine 160 resident, within the network link card 166 which corresponds with the virtual machine 154 of a respective edge device 120. In one aspect, the virtual machine 160 is also configured to be programmable and facilitate decision-making, analysis and integration of sensor data from the edge device 120 coupled to diverse sensor types at the gateway level as will be described in greater detail below. The gateway 110 will be described in greater detail below.

Referring still to FIGS. 2A, 2B and 2C, in one aspect, the gateway 110 is communicable with the platform engine 101. In one aspect, the platform engine generally includes a platform engine network link card 180 a communications module 173 configured to communicate with the gateway 110 a distributed storage 171 configured to store data, such as, for example, data received from the edge device 120, a platform engine logical layer module 172, which includes a domain specific language (DSL) module 182 and a platform engine virtual machine 181 operable to control the operation of the platform engine 101. In one aspect, the network link card 180 of the network operations controller is configured to control network communications and/or low level hardware communications (e.g. at a device or driver level). In one aspect, the platform engine virtual machine 181 is complementary to the virtual machines 154 of the edge device 120 and virtual machine 160 of the gateway 110. In one aspect, the virtual machine 181 is configured to receive and execute user defined or user programmable code as described in further detail below. In one aspect, the platform engine also includes an insight module 174 configured for machine learning and big data analytics with an analytics module 174A as well as a business metadata manager module 174B, an enterprise data integrations module 175 configured to integrate local data with third party data integration. In one aspect, the platform engine 101 also includes an application programming interface module 175, as well as dashboard builders 179, application frameworks 178 and user interface module 177. In one aspect, the platform engine 101 is further configured to communicate with peripheral devices 130-132, which can include, for example, business applications 130, consumer applications 131 and municipal applications 132.

In one aspect, the Internet of things (IoT) network system 100S includes an administration module 190. In one aspect, the administration module 190 is configured to provision or set up the edge devices 120, the gateways 110, the platform engine 101 or the peripheral devices 130-132. In other aspects, the administration module 190 is also configured to orchestrate communication and synchronization between the edge devices 120, the gateways 110, the platform engine 101 or the peripheral devices 130-132 to ensure adequate quality of service. In yet other aspects, the administration module 190 is also configured to provide security or to defect unauthorized access or intrusion into the system. In other aspects, provisioning may be performed by other parts of the Internet of things (IoT) platform system 100, such as, for example, the network operations controller 101.

Figure 2D:
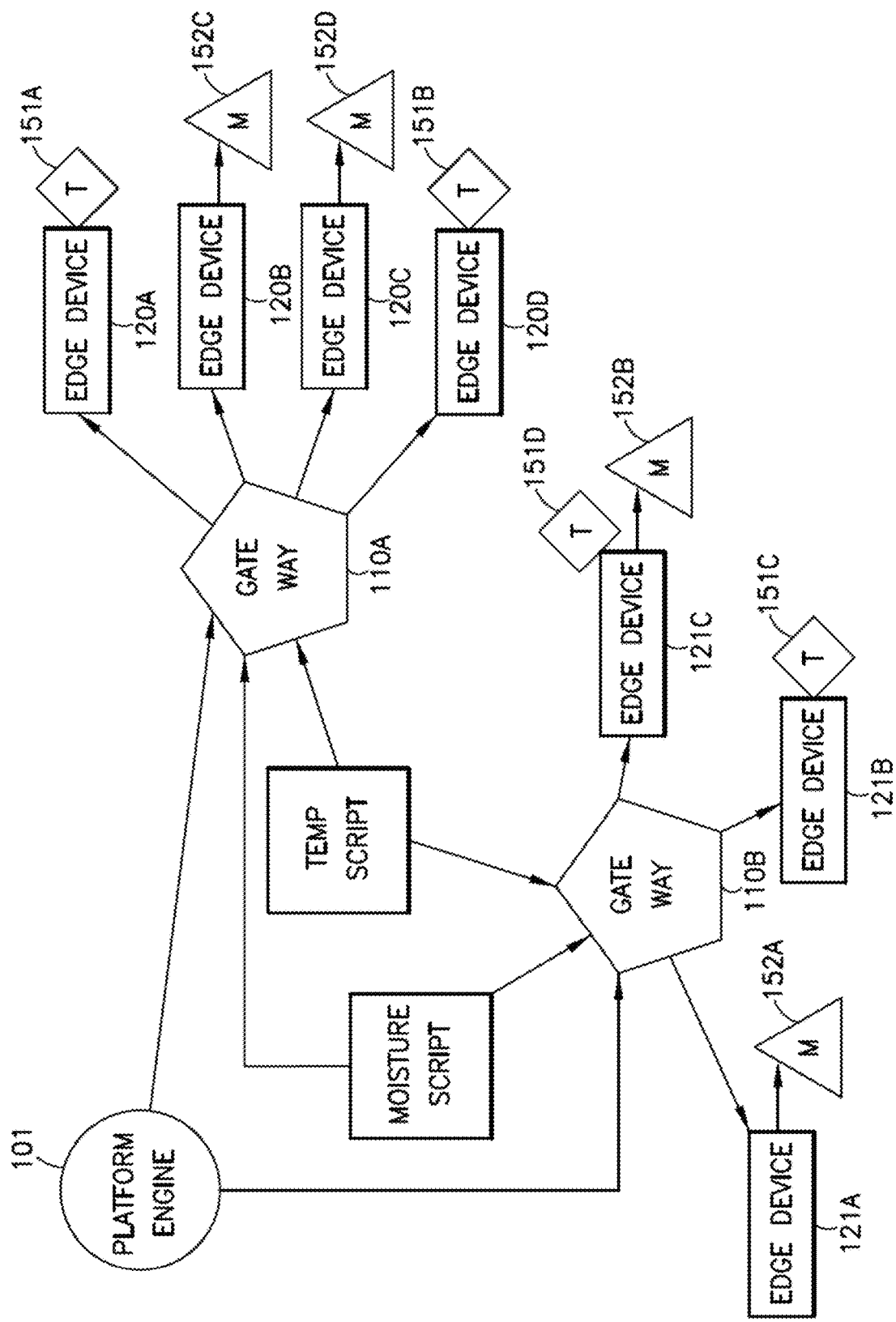

Referring now to FIGS. 2C and 2D, in one aspect, the virtual machines 154, 160 and 181 are configured to provide a common user-customizable interface for customer hardware and for processing sensor or hardware data at the device level. For example, as can be seen in FIG. 2B, the edge devices 120A-120D and 121A-121C is configured to interface with various sensor inputs 151A-151D and various outputs 152A-152D. Each of the various sensor input 151A-151D may be different or have different characteristics. For example, while sensor input 151A may be a temperature sensor, input device 151B may be a moisture sensor, while another sensor input 151C-D is configured to detect some other environmental factor (for example, sensors 11-28). Similarly, the edge devices 120A-D and 121A-C may also communicate with myriad output devices 152A-152D. These output devices may include, for example, moisturizers, thermostats, or other devices which effect an action. It is difficult for the Internet of things (IoT) platform system 100 to provide support for every possible input devices 151 and output device 152. It is also difficult for the manufacturer of the Internet of things (IoT) platform system 100 review the software in order to communicate with so many different potential input devices 151 and output devices 152. In order for the edge devices 120A-D and 121A-C to communicate with various input devices 151A-D and myriad output devices 152A-D, the edge devices 120A-D and 121A-C each have the virtual machine 154 (e.g. the user configurable space described above) running user customizable code to interface with each input device 151A-D and output device 152A-D. In one aspect, the user customizable code further other functionality beyond interfacing with diverse sensor or output device types. In one aspect, the user customizable code can report sensor inputs via conditional messages. In yet other aspects, the user customizable code can include simple conditional decisions based on input values to send conditional messages. This can be used, for example, for reporting based on a threshold or a change in state.

Referring now to FIG. 2E, a diagram of an edge device 120 is shown. In one aspect, the edge device 120 includes a virtual machine 154 and a network link card 153. In one aspect, the network link card 153 further includes a Domain Specific Language (DSL) interpreter 156, a kernel 157 and a bootloader 158. In one aspect, the network link card 153 and its respective DSL interpreter 156, kernel 157 and boot loader 158 are part of the secured system space not accessible to an end user. The DSL interpreter 156 is configured to interpret a domain specific language, that is, a simplified scripting language (for example, the scripting language used to provide user defined code within the virtual machine 154). In one aspect, the DSL interpreter 156 is lightweight to accommodate the simplified DSL syntax and can run on a variety of hardware types that operates with low power or with limited processing power. The kernel 157 and bootloader 158 are parts of the network link card 153 which control the operations of the edge device 120. For example, the bootloader 158 is responsible for loading the kernel 157 when the edge device 120 is turned on. The kernel 157, in turn, is responsible for low level functionality such as, for example, communication over a network, or low level communications with devices (e.g. receiving the unprocessed signals from a device). The kernel 157, boot loader 158 and the DSL interpreter 156 of the network link card 153 are inaccessible to an end user and cannot be altered. By isolating the secured system space within the network link card 153 and its components, end user is prevented from locking up the edge device 120 due to a bug in user defined or user programmable code. Isolating the secured system space of the network link card 153 further prevents an end user's user defined code from abusing the entire network. In one aspect, the network link card 153 and the kernel 157 is configured to communicate to devices or with the network on the device layer 250 and the physical layer 260 (e.g. low level communications, for example, at the bit level communications). In one aspect, the device layer 250 and physical layer 260 are also part of the secured system space and the end user is prevented from making alterations to the API between the application layer and the device layer 250 and the physical layer 260.

In one aspect, the virtual machine 154 is an emulated instance of a computer runtime running on the network link card 153. As noted above, the virtual machine 154 is a user configurable space running user defined code which is customized interfacing with the various input devices 151A-D and various output devices 152A-D. In one aspect, the virtual machine 154 receives and executes user defined code so that the virtual machine 154 can be customized for diverse sensor inputs 151 (e.g. sensor inputs 151A-B). For example, the virtual machine 154 and the edge device 120 functions as a generic module which allows diverse sensor types to interface to the network. In one aspect, the user defined code executed by the virtual machine 154 also allows the edge device to do local processing at the edge device 120 level. For example, in one aspect, the user defined code executed by the virtual machine 154 allows for conditional processing. For example, an edge device 120 which is connected to a thermometer may include user defined code which receives the temperature reading of the thermometer, and further processes the temperature reading to determine whether the temperature reaches a predetermined threshold. If the predetermined threshold is met, the user defined code running on the virtual machine 154 may send an alert, or perform an action as defined by the user.

In one aspect, the virtual machine 154 may receive user defined code in the form of the Domain Specific Language, which is interpreted through the Domain Specific Language Interpreter 156. In one aspect, the Domain Specific Language is a simplified low level language such as assembly, and has syntactic features similar to assembly language such as operands and operators. In yet other aspects, the Domain Specific Language may be a scripting language or interpreted language similar to Lua, Ruby, Python or Perl. In yet other aspects, the Domain Specific Language can be any suitable scripting language which is simplified and has a limited set of operands and operators. In one aspect, the virtual machine 154 may receive the user defined code through visual user interface, for example, through a web-based tool interface for customers so that it facilitates hardware and software programming of the virtual machine 154, and simplifies control and exploitation of the edge device 120 or the Internet of things (IoT) platform system 100.

Figure 3:
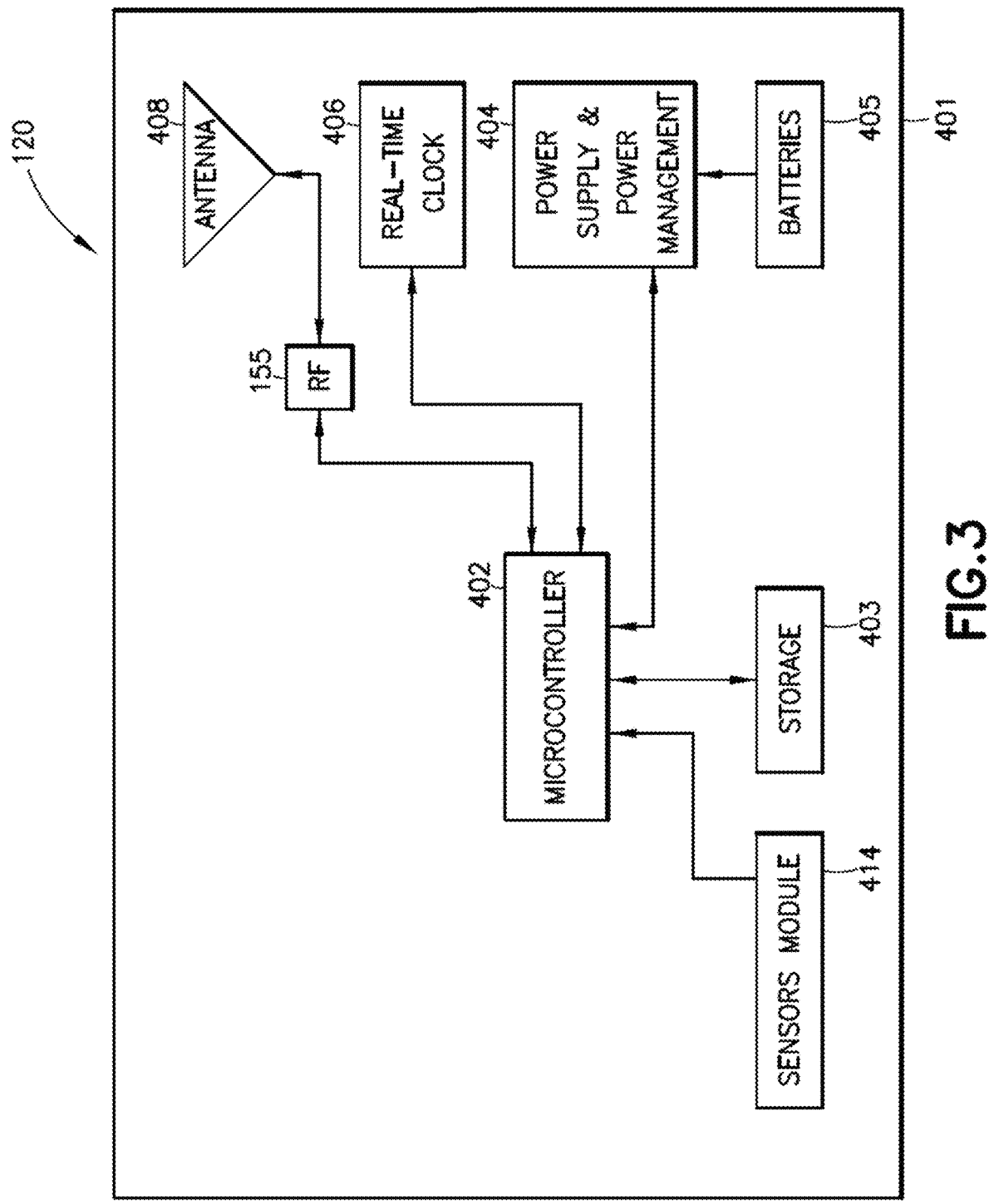
FIGS. 3 and 3A are schematic illustrations of an edge device in accordance with aspects of the present disclosure.

Referring to FIG. 3, an exemplary schematic diagram of the physical architecture of the edge device 120 is shown. In one aspect the edge device 120 may include any suitable housing 401. The housing 401 may have any suitable shape and be constructed of any suitable material so that in one aspect the edge device 120 may be placed or otherwise embedded in any suitable location including, for example, in exposed environments, within street or road surfaces, within dumpsters, within gas mains, within sewers, within water mains, within parking lots, within bodies of water, within buildings, within the soil, within lampposts, within towers, within pollution-emitting buildings or machinery, within warehouses, within storm drains and reservoirs or within nuclear, biological or chemical facilities (for example, as shown with respect to sensors 11-28 in FIG. 1). In another aspect, the housing 401 may be configured for placement above ground at any suitable location for sensing vehicles in a respective parking space. The housing 401 may be configured to house components of the sensing device 400 such as a microprocessor with cryptographic unit (MCU) 402, a memory 403 (which is suitably configured along with the processor 402 to effect the operational aspects of the edge devices 120 through the network link card 153 and logic layer 154 as described herein), an edge device power system, system clock 406, an edge device power system, an edge device power system communication system and any suitable sensor module 414 such as, for example, the suite of edge device control interface modules from patent application Ser. No. 14/495,676, which is incorporated by reference herein.

In one aspect the edge device power system may include a power supply and management unit 404 that is connected to the processor 402. Any suitable power storage unit(s) 405 may be connected to the power supply and management unit 404 for supplying power to the components of the sensing device 400. The power supply and management unit 404 may be configured to regulate and distribute power from the power storage units 405 in any suitable manner, such as under the control of the processor 402. The sensor communication system may include a communication module 155 (which may be any suitable radio frequency communication module) connected to the processor 402 and an associated antenna 408. The antenna 408 may be any suitable antenna such as in one aspect an omnidirectional antenna and in another aspect a directional antenna. Where the antenna 408 is a directional antenna suitable motors or other solid state or mechanical drive unit may be provided for swiveling or otherwise rotating the antenna so that a signal strength of a received or sent communication is maximized in a manner substantially similar to that described above with respect to the gateway 110 (FIGS. 2A and 2B). In one aspect, the sensor module 414 may be any suitable sensors including but not limited to weather sensors 11, public safety sensors 12, waste management sensors 13, gas leak sensors 14, sewer monitoring sensors 15, water leak sensors 16, parking access sensors 17, smart, parking sensors 18, water quality sensors 19, structural integrity sensors 20, soil moisture sensors 21, electronic emission sensors 22, smart lighting sensors 23, street safety sensors 24, air quality sensors 25, item location sensors 26, water level sensors 27, or public health sensors 28. In one aspect, the sensor module 414 may be connected to the processor 402 in any suitable manner and be configured to sense any suitable sensory characteristic. As may be realized any suitable ancillary circuitry may be provided to allow communication of sensor module 414 with the processor 402.

Figure 3A:
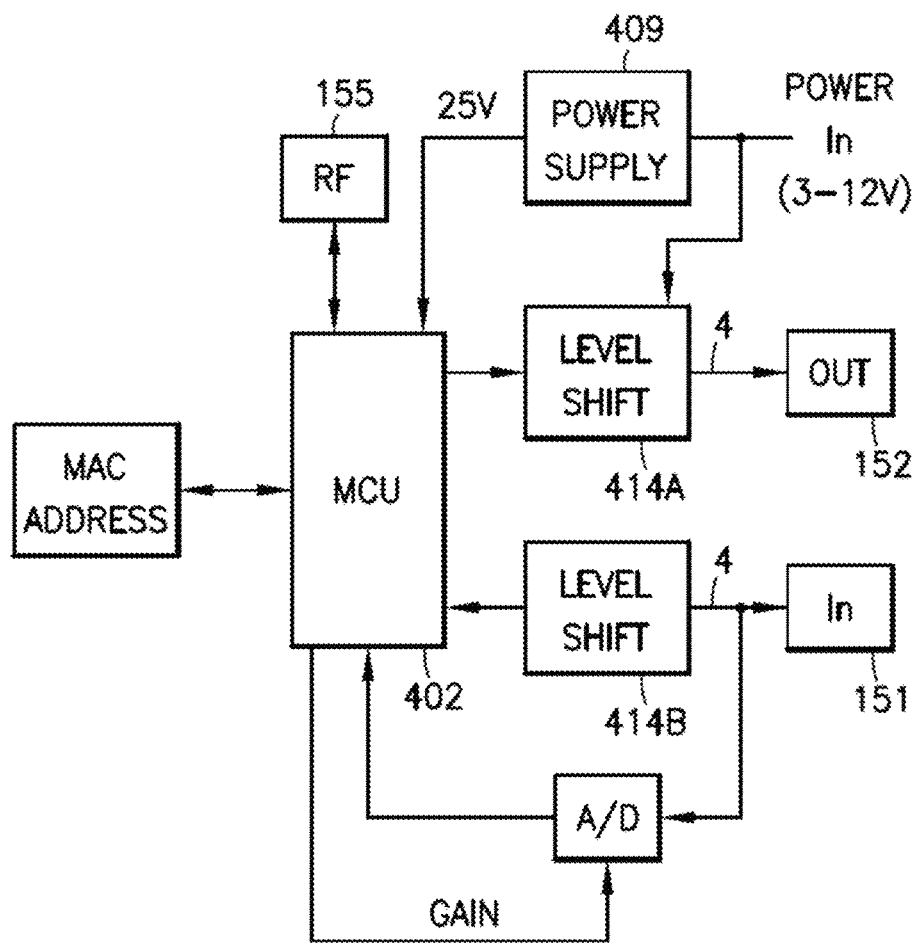

Referring now to FIG. 3A, an alternate aspect of the edge device 120 is shown. In FIG. 3A, the MCU 402 is connected to the communications module 155 (in the form of an radio frequency (RF) receiver/transmitter. The MCU 402 is further connected to the MAC address 420, which provides for communication over a network. In one aspect (not shown), the MAC address 420 is part of the communications module 155 and allows for network communication over the communications module 155. In one aspect, the MCU 402 is further connected to the power supply 404, which supplies power to the edge device 120. The MCU 402 is further connected to an output level shifter 414A which level shifts the signal from the MCU 402 to the output device 152. The MCU 402 is also connected to an input level shifter 414B, which is further connected to an input 151.

Referring again to FIGS. 1A, 2A, and 2B, as noted previously, in one aspect, the edge device 120 is a microcontroller, chip or printed circuit board (PCB) which is configured to be coupled to or is integral with diverse sensors of different sensor types (for example, the sensors 11-28 described herein) providing diverse types of sensor inputs 151. In one aspect, the edge device 120 also configured to provide output 152 to, for example, displays, switches or other controllers. In one aspect, the diverse sensors (for example, sensors 11-28) coupled to the edge device 120 are configured to be low power sensors to limit power consumption. In one aspect, the edge device virtual machine 154 of the edge device 120 is configured to be a common platform and programmable interface for configuring software for programming and configuring the edge device 120 to receive sensory data from the diverse sensors 11-28 (as described above), analyze and integrate the sensory data from the diverse sensors 11-28 and to make local (e.g. edge device 120 level) decisions based on the sensory data from the diverse sensors 11-28 based on pre-defined or user programmed rules or instructions within the logic layer 154. As noted previously, in one aspect, the edge device 120 is substantially fungible and configured to connect to any suitable sensor.

Figure 4:
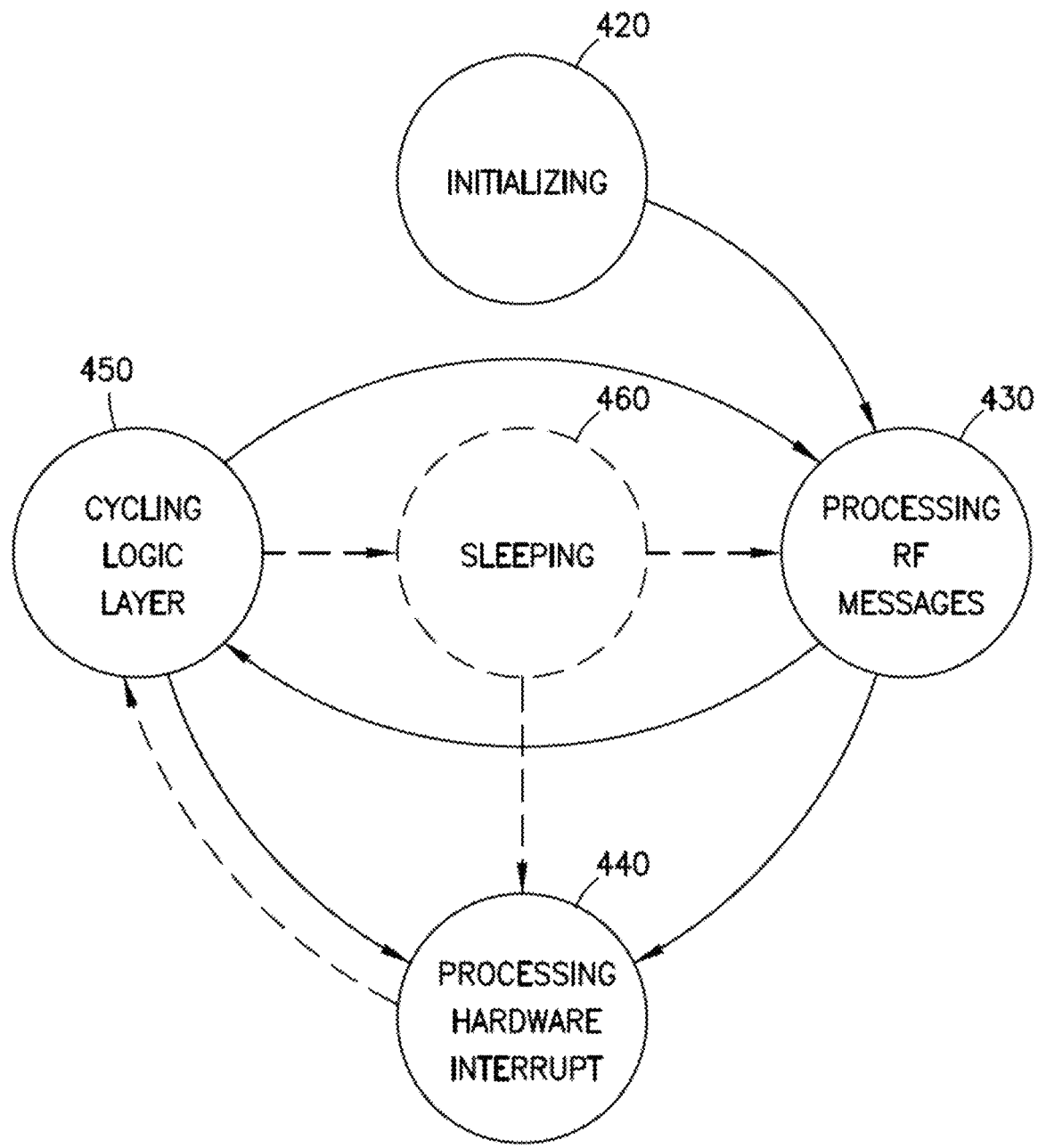
FIG. 4 is a state diagram of the firmware of an edge device in accordance with aspects of the present disclosure.

Referring now to FIG. 4, in one aspect, the possible states of the edge device network link card 153 are illustrated as a finite state machine diagram. In one aspect, the edge device network link card 153 is initialized at initialization state 420. After the network link card 153 is initialized, the network link card 153 enters a run state which alternates between processing RF messages 430 (for example, RF messages received from the gateway 110 or the platform engine 101), processing a hardware interrupt 440 (for example, a hardware interrupt from one of the diverse sensors 11-28) and cycling the logic layer 450 (e.g. running a pre-defined or user-programmed program stored within the logic layer 154). In other aspects, the network link card 153 is also configured to go into a sleep mode 460 between cycling the logic layer 450, the processing hardware interrupt 440 and processing RF messages 430 states to conserve battery life or to decrease power consumption.

Referring again to FIGS. 1A, 2A and 2B, in one aspect, as noted previously, the edge device virtual machine 154 is a user programmable interface for the diverse sensors (e.g. sensors 11-28) comprising both predefined and user programmed business logic and learned behavior. In one aspect, the edge device virtual machine 154 is configured to provide for receiving data (e.g. from the diverse sensors 11-28), the processing of data collection (e.g. from the diverse sensors 11-28 via input 151), storage of data (e.g. collected from the diverse sensors 11-28) and transmission of data (e.g. to the gateway 110 or platform engine 101). In one aspect, the edge device virtual machine 154 also provides for the processing of RF messages (e.g. within processing RF messages 430 state of the network link card 153) received from the gateway 110 or platform engine 101 or processing of hardware interrupts (e.g. the hardware interrupt state 440) from the input 151 (e.g. from the diverse sensors 11-28).

In one aspect, the edge device virtual machine 154 is configured to be a rules-based resolution system which provides for certain sensor input types, logical local analysis, and resolution from the local edge device virtual machine 154 resident within the edge device 120. The rules-based resolution system provided by the edge device virtual machine 154 is provided via the Domain Specific Language (DSL) described above, or through any interpreted or compiled language interpreted or compiled by the DSL module 156. In one aspect, the rules-based resolution system provided by the edge device virtual machine 154 is also configured to generate local output via output 152 (e.g. if a sensor exceeds a predetermined threshold, the edge device virtual machine 154 is configured to initiate an alarm command via output 152). In one aspect, the output 152 can be transmitted to other parts of the Internet of things (IoT) platform system 100 architecture, including, for example, the gateway 110 and the platform engine 101. In one aspect, the edge device virtual machine 154 also enables the edge device 120 to react to input changes from the input 151 (e.g. from the diverse sensors 11-28) by effecting local changes in output 152 on the edge device 120. For example, in one aspect, if an edge device 120 receives a temperature measurement from a temperature sensor that exceeds a predetermined threshold (as determined by the logic layer 154), then the edge device 120 can output an alarm command via output 152 locally without having to communicate the temperature to the gateway 110 or the platform engine 101. In one aspect, the local processing ability of the edge device virtual machine 154 for the edge device effects optimal sensor analysis and decision at the network's edge (e.g. at the edge device 120). In one aspect, the edge device virtual machine 154 also effects sensor data interpretation or fusion of diverse, but associated sensor data to identify or define local analysis. For example, the edge device 120 may receive data from a leak detection sensor and a metal detection sensor and determine that there is automobile traffic within the proximity of a water main break. In yet other aspects, the edge device virtual machine 154 is also configured to initiate or effect local action, such as sending an alarm to a police department or water department or private water authority to alert relevant parties of the water main break.

Figure 5:
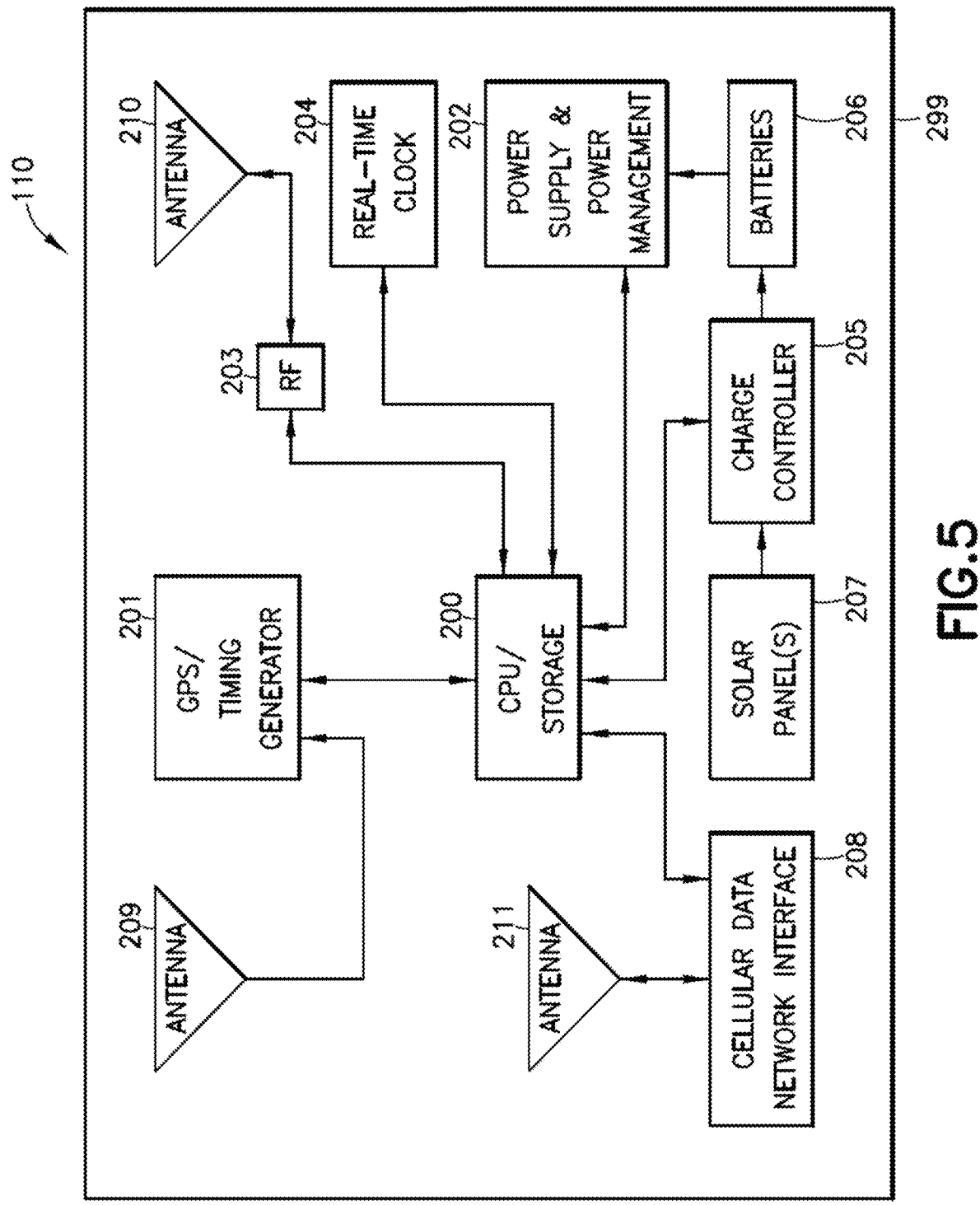
FIG. 5 is a schematic illustration of a gateway in accordance with aspects of the present disclosure.
Figure 6:
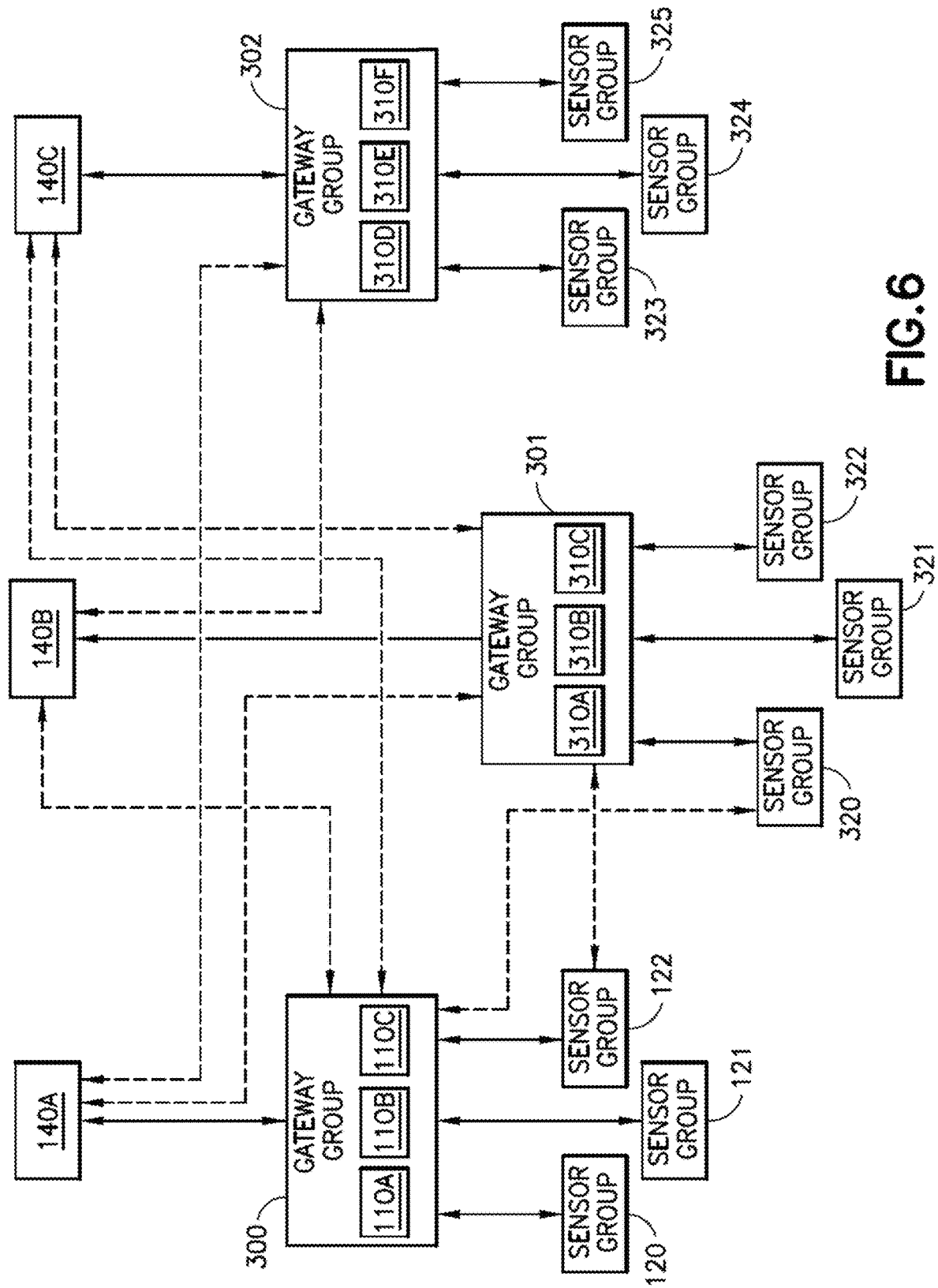
FIG. 6 is an exemplary illustration of an gateway fallover in accordance with aspects of the present disclosure.

Referring now to FIG. 5, each of the gateways 110 may include any suitable housing 299 having any suitable shape and size. In one aspect the housing is weatherproof and may be UV (ultraviolet) ray resistant. The housing 299 may be constructed of any suitable material so that, in one aspect, radio frequencies are allowed to pass through the housing. Each gateway 110A-110C (generally referred to as gateway 110) may include, e.g. within a respective housing, a processor module 200 (which may include any suitable memory and suitable programming and may be configured for performing the functions of the gateway as described herein), GPS module 201, a clock module 204, a charge controller 205, a power supply module 202 and any suitable number of communication modules 203, 208. In one aspect, the gateways 110 are substantially similar to the gateways disclosed in US Pub. No. 2014/0340240, published on Nov. 20, 2014 and US Pub. No. 2014/0340243, published on Nov. 20, 2014, both of which are incorporated by reference in their entirety. In one aspect, the gateway 110 also includes, in one aspect, a gateway network link card 166 which includes the gateway virtual machine 160 resident on processor module 200 of the gateway 110. In one aspect, the gateway virtual machine 160 is defined by user defined code that is isolated from the secured system space of the gateway network link card 166. In one aspect, the gateway virtual machine 160 is configured to include code which receive sensor data from the edge devices 120 and provide analysis from the groups of edge devices 120A-C, 121A-C, and 122A-C. In one aspect, the gateway virtual machine 160 corresponds to the edge device virtual machine 154 of the edge device 120. In one aspect, the gateway virtual machine 160 is configured to provide for sensor data organization, analysis and integration locally at the gateway 110 level. In one aspect, the gateways 110 are also configured to provide for cross-gateway fall-over for fault tolerance as disclosed in U.S. Pat. No. 8,274,403, issued on Sep. 25, 2012, which is incorporated by reference in its entirety (see FIG. 6).

The GPS module 201 may be operably connected to the processor module 200 and include any suitable antenna 209 for communicating with one or more GPS satellites. The GPS module 201 may be configured to provide any suitable data to the processor module including, but not limited to location/positioning data, date data and time data. The clock module 204 may be operably connected to the processor module 200 and provide the processor module 200 with time data which may be periodically (or at any suitable time(s)) updated by the processor module 200 using date and/or time data obtained from the GPS module 201.

The charge controller 205 may be operably connected to the processor module 200. One or more solar panels 207 may be disposed on, located remotely from or otherwise connected to the housing 299. In one aspect, the one or more solar panels 207 may be movable and configured in any suitable manner to track one or more available light sources, such as e.g. the best light source, to optimize a recharge cycle of the one or more power storage units 206. Here the one or more solar panels may include any suitable motors and light sensors for effecting light tracking movement of the one or more solar panels. As may be realized, the motors and light sensors may be connected to the processor module 200 for any necessary calculations and control for effecting the light tracking movements. In other aspects the solar panels 207 may include a processor for performing the necessary calculations to effect the light tracking movement. The solar panels 207 may be operably connected to the charge controller 205 for charging one or more rechargeable power storage units 206. In one aspect the gateway 110 may be configured to operate substantially from power provided by the one or more solar panels 207 during lighted conditions (e.g. during the day) and substantially from power provided by the one or more rechargeable power storage units 206 during unlighted or low light conditions (e.g. at night, dusk, dawn, etc.). In other aspects the gateway 110 may be configured to operate from power provided by a combined output of the one or more solar panels 207 and the one or more power storage units 206. In still other aspects the gateways may be powered with a hard line such as from a utility source and include suitable electronics for converting the utility power to power that is usable by the gateway.

The power supply 202 may be operably connected to the processor unit 200 and the one or more power storage units 206 to provide and manage power from the one or more power storage units 206 and/or solar panels 207 for the operation of the gateway 110. In one aspect, the power supply module 202 may provide a charge status of the one or more power storage units 206 to the processor module 200. The processor module 200 may be configured, e.g. when the charge status reaches a predetermined threshold or at any other suitable time, to effect operation of the charge controller 205 so that power is transmitted from the one or more solar panels 207 to the one or more power storage units 206 for charging the one or more power storage units 206. The power supply module 202 may also provide predictive maintenance that monitors, for example, the charge cycles of the one or more power storage units 206. The processor module 200 may be configured to determine or otherwise predict a life of the one or more power storage units 206 using data from, for example, the power supply module 202, such as a voltage/current curve of the one or more solar panels 207 and/or the charge cycles of the one or more power storage units 206. The processor module 200 may cause a message (including a status/life of the one or more power storage units 206) to be sent from the gateway 110 to the central controller 101 for communication to any suitable operator/maintenance personnel of the Internet of things (IoT) platform system 100.

In one aspect the gateway 110 may include two communication modules 203, 208. One of the communication modules 203 may be a "local" communication module configured for, e.g., communication with respective edge devices 120A-120C, 121A-121C, 122A-122C over any suitable wireless protocol such as a cellular, satellite or other long or short range communication protocol. Another of the communication modules 208 may be a "distant" communication module configured for, e.g., communication with the one or more communicators 140 using, for example, antenna 211 as will be described in greater detail below. In other aspects, a single communicator may be used to communicate with the edge devices 120A-120C, 121A-121C, 122A-122C and the one or more communicators 140. In one aspect any suitable antenna 210 may be connected to the communication module 203 for allowing any suitable radio frequency communication with the edge devices 120A-120C, 121A-121C, 122A-122C. The antenna 210 may be disposed within the housing 299, mounted to or remotely located from the housing 299.

The platform engine 101 is computerized dataflow system. In one aspect, the platform engine 101 includes a platform engine network link card 180 which includes a platform engine logic layer module 172 an insight module 174, an enterprise data integration module 175, a distributed storage module 171 and a communications interface module 173. In one aspect, the platform engine 101 further includes a platform engine virtual machine 181 running within the platform engine logic layer module 172. In one aspect, the platform engine 101 also includes an application programming interface module 176, a dashboard builder 179, an application framework 178 and a user interface module 177.

In one aspect, the platform engine firmware 180 of the platform engine 101 is a secured system space. Similar to the gateway network link card 166 and the edge device network link card 153, the secured system space is configured to control the operations of the platform engine 101 that are inaccessible to an end user. For example, in one aspect, the platform engine network link card 180 includes the communications interface 173, which controls network communications with the gateway 110 and the edge device 156. By preventing user access to the communications interface 173, the platform engine 101 is less susceptible to tampering, hacking and running user defined code which may have a detrimental effect to the operations of the platform engine 101. In one aspect, the platform engine network link card 180 also includes the insight module which is configured for big data analytics or machine learning, as well as business metadata management. In one aspect, the platform engine network link card 180 also includes a logic layer module 172. In one aspect, the logic layer module 172 includes a domain specific language (DSL) module 182. The domain specific language is, in one aspect, a simplified language for defining user defined or user programmable code. For example, the domain specific language may be a simplified low-level, assembly-type language with operands and operators. In one aspect, the DSL is a low level interpreted language that comprises a number of low level commands the virtual machines 154, 160 and 181 are configured to execute. In one aspect, the virtual machines 154, 160 and 181 may further include simulation environments, use case, and other user defined scripts which is also written in the DSL language. In one aspect, the configuration of the virtual machines, 154, 160 and 181 can be performed by loading a configuration file written in the DSL language to the platform engine virtual machine 181, which is then propagated to, and customizing, the gateway virtual machine 160 and edge device virtual machine 154. In other aspects, the domain specific language is a higher level interpreted language similar to interpreted languages like Ruby, Lua, Python or Perl. In yet other aspects, the domain specific language can be compiled into an executable binary program. In one aspect, the DSL module 182 is configured to parse, interpret or compile user defined or user programmable code. I The user defined or user programmable code are a programmable set of rules configured to organize, analyze, integrate and make decisions based on the sensory data received from the edge devices 120. In one aspect, the user defined or user programmable code interpreted or compiled by the DSL module 182 runs in the platform engine virtual machine 181, which is a virtual machine runtime configured to run the user defined or user programmable code. In one aspect, the user defined rules of the platform engine logic layer module 172 are both pre-defined and user-programmable in nature. In one aspect, the platform engine virtual machine 181 is substantially similar to the complementary gateway virtual machine 160 of the gateway 110 and the edge device virtual machine 154 of the edge device 120 and provides for the organization, integration, analysis and processing of data at the platform engine 101 level. The rules of the platform engine virtual machine 181 will dictate how the data will be handled. The first step of the rules will be to parse the data stream being received into applicable data elements for forwarding to the appropriate databases or management systems. The rules will define for each data stream markers upon which the received data stream is to be parsed. The rules will also dictate which system is to receive those parsed elements and if returned data is expected. Each data stream will then is passed to the specific database or management system and confirm receipt of the full data stream. The communications with each element will be logged in a separate database for historical tracking and internal diagnostic reports. If the rules dictate that a response from the defined supporting system is expected, the platform engine 101 will wait for that returned data stream and store it locally. Once each parsed data stream is processed, any returned data streams are compiled and passed on to the communications interface module 173 for communication to the gateway 110, the edge devices 120 or the peripheral devices 130-132.

The communications interface module 173 is a multi-faceted shell that is, in one aspect, connected to multiple physical connections and using multiple protocols. The communications interface module 173, in one aspect, is also connected to a user interface engine 177 which generates interactive documents for display in web browsers or mobile applications when applicable. In one aspect, the communications interface module 173 also provides for the exchange of encrypted data streams to edge devices 120, the gateway 110 and the peripheral devices 130-131 by way of cellular, satellite or other long range wireless connections. The communications interface module 173 uses routing tables to track both the means and protocols to be used when communicating with each device.

To transfer data, the communications interface module 173 receives the data to be transmitted and the device address to which it is to be delivered. Based on defined routing tables, the means of communication and protocols are determined and the payload data formatted for delivery. The delivery of information may be addressed to one individual device or a group of devices. Once received, the packets are re-ordered as necessary and interpreted by the logic of the receiving device(s). The payload of the data packet will tell the receiving device what action to take and which parameters to apply.

In one aspect, as shown in FIG. 2C, it is noted that the end user can propagate user defined or user programmable code through a programming environment tool 280 which communicates user defined or user programmable code to the platform engine virtual machine 181. In one aspect, the programming environment tool 280 can include a graphical programming module 281 which allows for a user to simplify scripting commands through a simplified graphical interface, or a point and click interface. In other aspects, the programming environment tool 280 further includes a text programming environment 282, which allows users to customize user defined or user programmable code through input of text or text files. In one aspect, the text programming environment 282 is a DSL parser and accepts input of scripting in the DSL. In other aspects, the text programming environment 282 is configured to parse any suitable programming language and interpret it into the simplified syntax of the DSL. In one aspect, this can include both high and low level languages, such as C, Python, Lua, Perl, Ruby, etc. In one aspect, the user defined or user programmable code is passed from the programming environment tool 280 to the platform engine virtual machine 181. The user defined or user programmable code passed from the programming environment tool 280 to the platform engine virtual machine 181 can, in turn, can be passed to the virtual machine 154 of the edge device 120 and the virtual machine 160 of the gateway 110 to further customize the operations of the virtual machines 154 and 160.

Application Programming Interface Module

In order for computer or mobile applications and third party users to access the platform engine 101, the platform engine 101 also includes an application programming interface which is configured to provide a set of subroutine definitions, protocols, and tools for building software and applications that can be accessed by users over any internet connection or for displaying application data. The invention includes several different types of interfaces.

Geographical Information System

Figure 7:
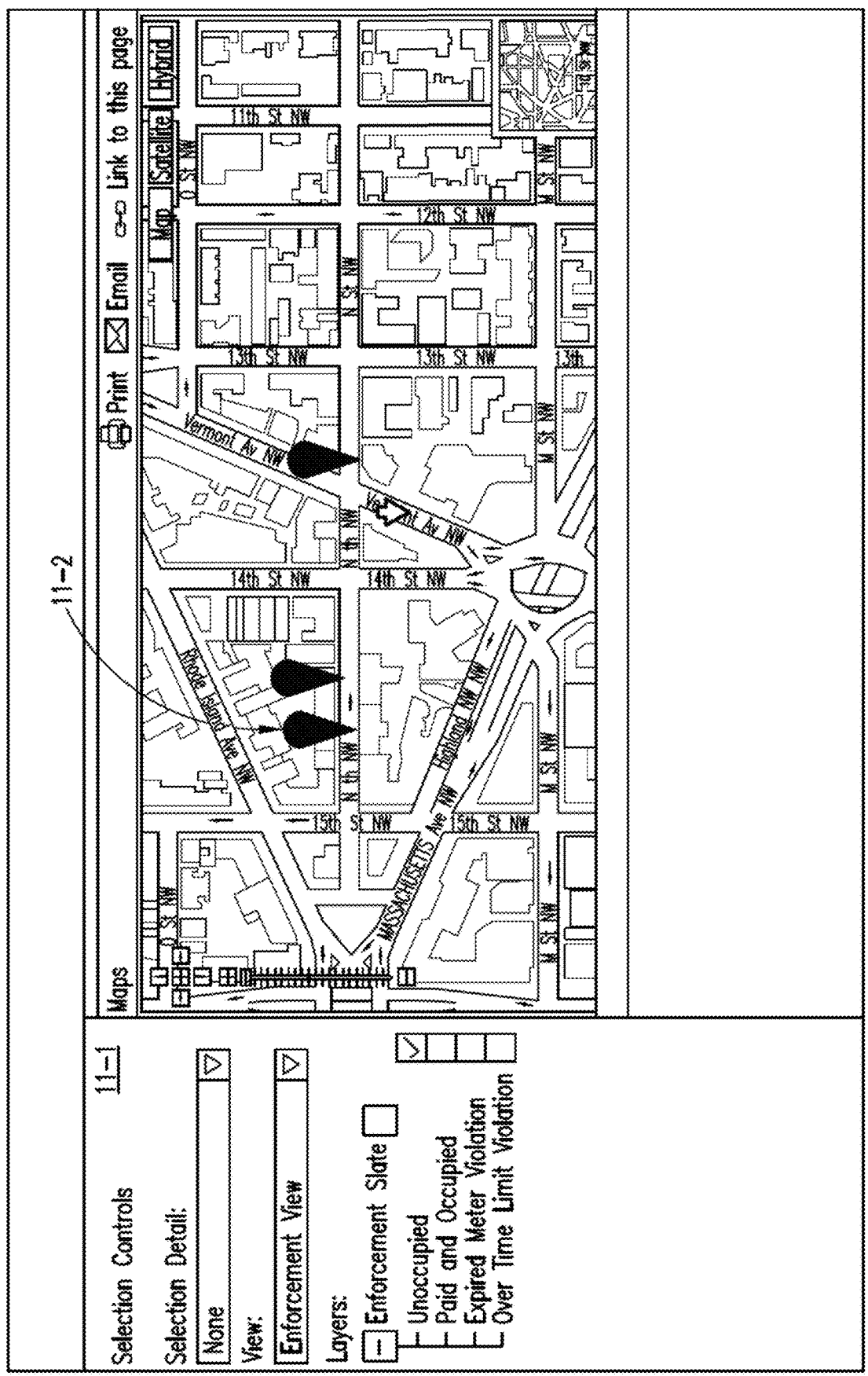
FIGS. 7-10 are exemplary user interfaces in accordance with aspects of the present disclosure.

FIGS. 7-11 illustrate the basic format of a geographical information system user interface as presented by, for example, the user interface module 177 (on a web browser) or on the display of a peripheral device 130-132 (for example, on a mobile app accessing the application programming interface module 176). The interface has many views and filtering levels. FIG. 7 shows a view focused on enforcement status. The selection controls (11-1) allow the user to filter the view according to specific statuses. In this case, the view is filtered to show only certain data such as, for example, unoccupied parking spaces within a parking context. In other aspects, the view can include any suitable data from any of the edge devices 120 and any of the diverse sensors 11-28, and can display any suitable context including weather, public safety, waste management, gas leaks, sewer sensing, water leaks, parking sensing, smart parking sensing, water quality, structural integrity, soil moisture, electromagnetic emissions, smart lighting, safe and orderly street sensing, air quality, item tracking and location, water level, public health hazards or any suitable predetermined sensing characteristic as described above with respect to diverse sensors 11-28. These are indicated by icons (11-2) on the map.

Figure 8:
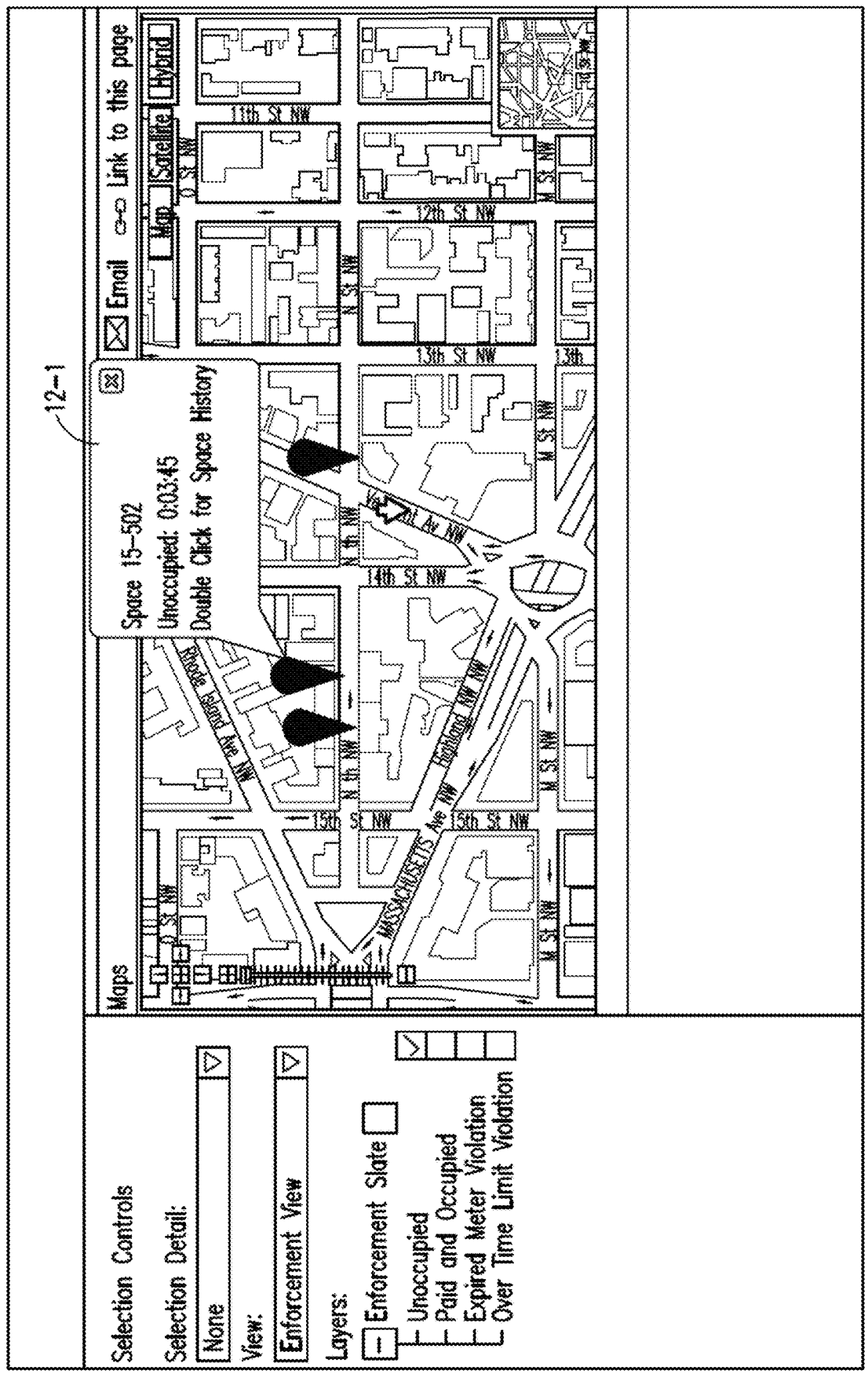

FIG. 8 shows the same view as FIG. 7, however in FIG. 8 a user has clicked on one of the icons. When this happens a balloon or window (12-1) opens to provide further details regarding the space represented by the icon.

Figure 9:
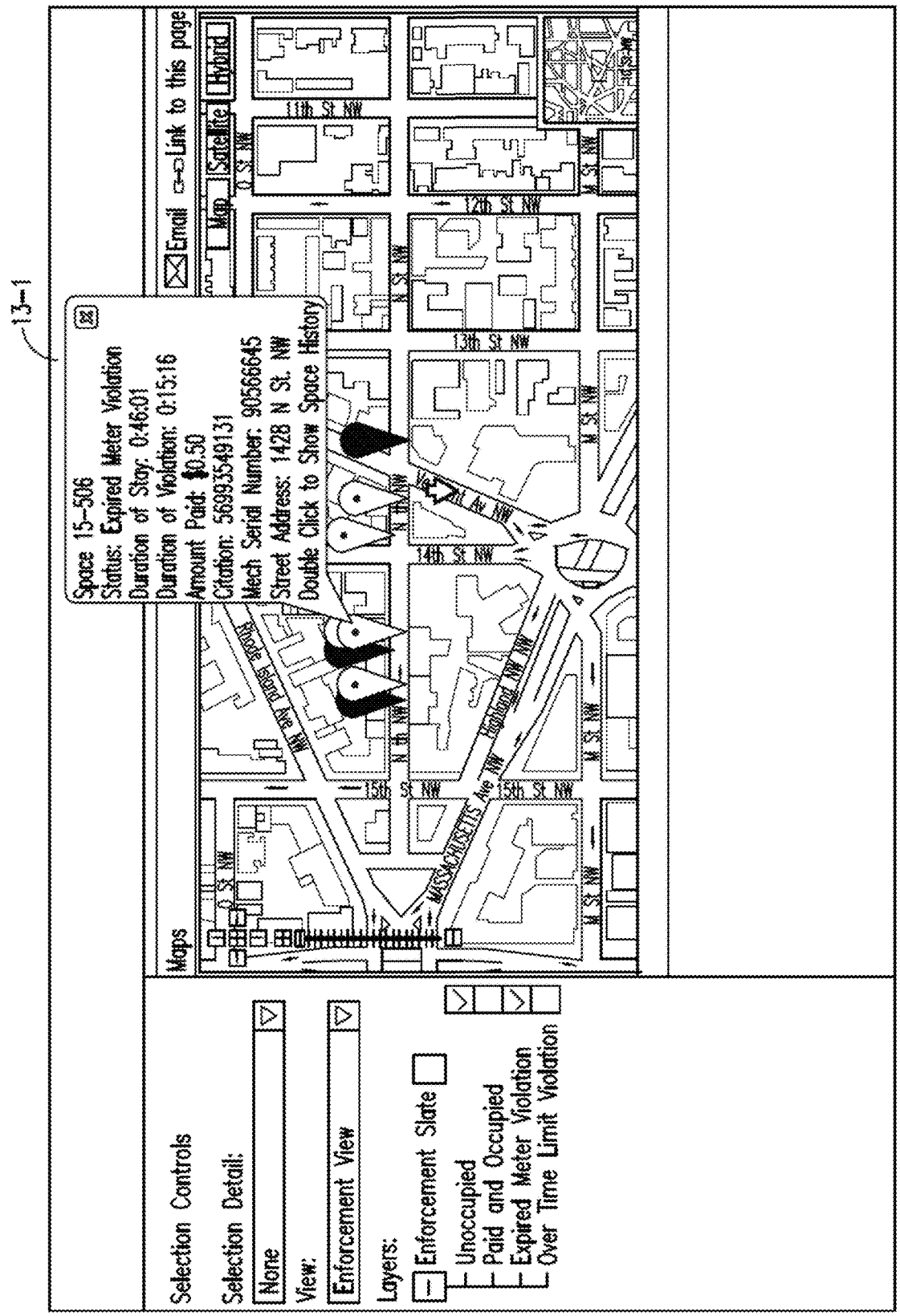
Figure 10:
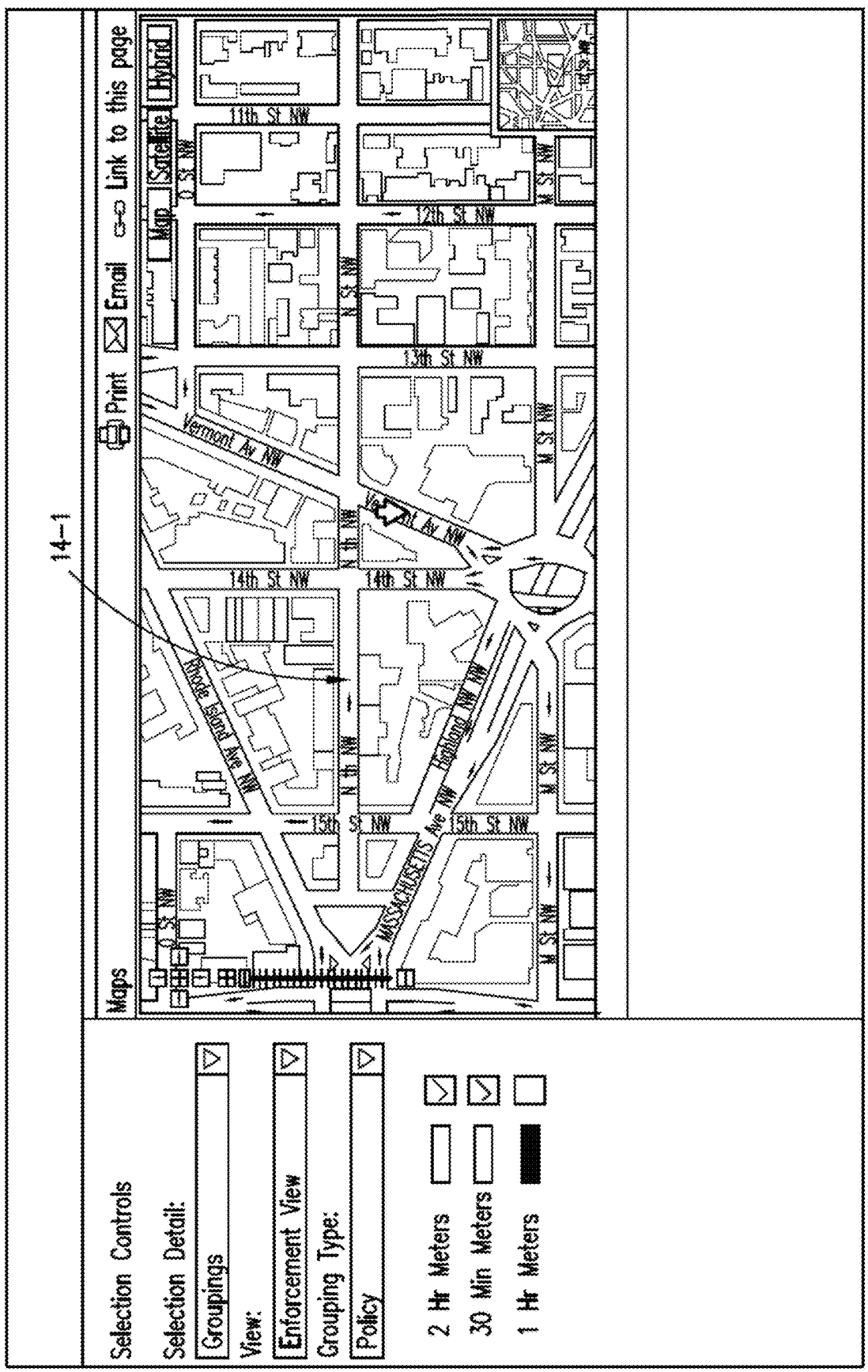

FIG. 9 is similar to the FIGS. 7 and 8, but the filter has been expanded to show both unoccupied spaces and those with an expired meter violation The detail balloon (13-1) gives information about both the space and the violation occurring therein. FIG. 10 is a view of the GIS that represents user defined groupings of spaces. In this case, the user as defined groups based on the enforcement policy in effect at the spaces. The selected policies are indicated by the colored line (14-1) or some other visual means.

These groupings can then be used to run reports, make changes to policy, or otherwise manage the spaces. FIG. 11 shows a geographic selection of meters. Users can define different types of geographies. Such types can be either political (council district) or functional (enforcement zones). As with the groupings in FIG. 10, these selections (15-1) can be used to generate reports, change policy or manage the spaces within that geography.

Types are initiated with a user selecting one or more spaces using a mouse or by selecting the spaces from a list in the Public. Once selected, the user can initiate predefined actions using menus accessed through a menu bar on the top of the interface screen or by contextual menus available through a defined combination of mouse clicks. A series of parameters can then be entered by the user to define the specifics of the request. The entire request is then passed on to the logic center of the platform engine 101 where predefined rules dictate what data elements are to be collected, how they are to be collated and to which device(s) communications should be passed.

Similarly, the icons on the map images can be used to display current status information. This information is updated either by manual request of the user to refresh the display or by automatic refreshing of the display. In either case, platform engine 101 retrieves information regarding the current location and status of remote assets and personnel from a database including the current information and updates the display image to reflect any changes.

Textual Reporting

Often, the information required by users (using peripheral devices 130-132) is statistical in nature. To address these requests, the present disclosure, in one aspect, includes textual reports which will be available to users, for example, through the application programming interface module 176 and accessible through an application on a peripheral device 130-132. Reports are driven by input screens specifying date ranges, selection of spaces by groups or individually, types of statistics and information to be included, e.g. how many meters in a plant are inoperative at a particular time and sub-sections of data to be compared to one another. Reporting will take the form of written reports, tables or charts as contextually appropriate for the statistics requested by the user.

Graphical Reporting

In addition to the textual reports, graphs offer visual representations of statistics that provide quick and concise understanding of trends, comparisons and breakdowns of interrelated statistics.

Like the textual reports, graphical reports will be presented (on a peripheral device 130-132 through access to the application programming interface module 176) as directed by a user input screen which controls date ranges, groups or individual spaces to be included and the statistics to be graphed. Users also select the graph type to be used from a list of available graph types. When applicable, the users can compare statistics by overlaying one statistic against, another. The graph selection interface provides the option for the user to specify if results are to be presented on separate axes. This is useful when comparing statistics with differing units of measure, such as comparing revenue in dollars against compliance levels measured in percentages.

Electronic Signage

The Internet of things (IoT) platform system 100 includes electronic displays for remote units such as the space monitoring and metering equipment or status meters or temperature readouts. In one aspect, the electronic displays are peripheral devices 130-132 which are configured to access the platform engine 101 through the application programming interface module 176. Such displays (for example, the displays shown in FIGS. 7-11) include street, signs and LCD displays connected to the actual metering equipment to communicate current rates and policies to the parking public. The electronic nature allows such signage to be updated to reflect changes in rates, hours of operation and so on without the need to deploy a workforce to replace or modify signs. Without such signage, quick and regular changes cannot be made to such policies.

Supporting Databases and Management Systems

In order to render detailed and flexible reports in all of the necessary formats, a number of interconnected systems and databases are required. The platform engine 101 coordinates the inputs of these individual data sources to create the individual presentations in any one or more of the peripheral devices 130-132 shown in FIGS. 1A, 2A and 2B.

Insight Engine 174

In one aspect, the platform engine 101 also includes an insight engine 174 which is configured to process raw data received from the edge devices 120 and the gateway 110. In one aspect, the insight engine 174 is configured for big data analytics and machine learning to discern sensor data for usage patterns or to analyze the data for any suitable fashion. For example, the insight engine 174 can be configured to discern usage patterns of water with, for example, water leak detection sensors 16 and soil moisture sensors 21 to determine where, for example, there may be individuals who are watering their lawn during drought conditions. In one aspect, any suitable relationship between sensor data can be determined or analyzed by the insight engine 174.

In one aspect, the processing of meter data, a system like the Smart Meter System as described in U.S. patent application Ser. No. 11/179,779, filed 13 Jul. 2005 and pending is incorporated by reference to the Brief Description of the Drawings and the Detailed Description as found in that application. This system must be expanded to allow for maximum flexibility in system management. The outputs of this processing are then stored in an associated database in the platform engine 101. For later retrieval and compilation into the aggregated statistics required for user requested reports.

The system of the invention also allows for modeling of changes in policies affecting the operation of the system 100 as formulated by the Staff Supervisors and Policy Makers. By storing historical data, the insight engine 174 can generate statistical and mathematical models of the sensor data from the edge devices 120. The user can simply specify which statistics to manually alter and which statistics to calculate and the system can use the historical data to estimate the results. These results are based on actual data for target geography and allow a user to make a variety of assumptions such as the assumption that compliance levels would decrease by a certain percentage if rates were raised.

Current Status Database

In one aspect, the platform engine 101 also includes a current status database as part of the distributed storage 171 is a database including records for each asset or human resource being monitored.

Records relating to edge devices 120 and gateway 110 are being monitored by the encrypted data messages include information regarding the edge device 120 status and gateway 110 status. The table is updated with each new report from the system telemetry of changes in the space's various statuses. The details of the records include any exception cases relating to the edge devices 120, the gateways 110 and the peripheral devices 130-132.

Records relating to human resources, for example by the Staff Supervisors or the Policy Makers, are also updated as new data is received by the system communication techniques, such as telemetry. These records include information regarding the equipment in use by that employee (including vehicles and tools), the employee's location and any assigned or associated work orders as required by the Maintenance Personnel.

Management Systems

In one aspect, one major component of managing any operation of the system 101 is inventory tracking (for example, via sensor 26). In one aspect, this can include, for example, integration with the enterprise data integration module 175 or could be part of the distributed storage 171. Each element of the operation is identified with a unique serial number. This serial number is used to index a database table which includes all information regarding the asset. This information includes part numbers, model numbers and manufacturer.

Additional database tables are used to track historical events regarding the asset. Such events include maintenance issues and events, upgrades, location changes and connected assets. This data is useful to the operation of the Maintenance Personnel. The supplemental tables can be used to display both current and historical data regarding any asset in the system in order to schedule maintenance, replacements or upgrades.

When problems do arise that may require replacement parts, tables storing information regarding associated replacement parts and available stock for replacements can be used to ensure maintenance crews (Maintenance Personnel) have all the necessary parts to perform needed repairs. Further tables store information regarding the sources for purchasing parts and lead times to facilitate efficient ordering of parts from their manufacturers.

Most systems also include tools to further create efficiencies in inventory management by recording the attributes of ordering parts from manufacturers and calculating the most effective ordering quantities and shipping costs.

Maintenance History

As mentioned previously, the maintenance history of each asset is tracked in the distributed storage 171 of the platform engine 101. This information is important in analyzing trends of breakdowns facilitating preventive maintenance as well as improving the experiences of the public. Often, people who have been cited for violations of parking policy contest tickets due to alleged malfunctions in the parking meter. Historical information can be referenced to determine if such a failure had occurred. If so, the ticket can be dismissed. This data is necessary for the operation of the Enforcement Personnel.

If malfunctions occur within a defined geographic region during specific times, maintenance managers may be able to identify problems of vandalism and seek assistance from law enforcement to correct the problem.

Policy Management

The policy management database is used to track the activation of various edge devices 120. This database also tracks the historical application of these policies to edge devices 120.

The database is referenced to process data received from the edge device 120. The analysis of this raw data must apply the correct meter rate and enforcement parameters by the Personnel to the data in order to correctly calculate statistics and update the current space status in the current status database for display in maps (FIGS. 7-11) and reports.

Further examples of suitable aspect in the transmission and dissemination of information, analysis and collection to end users are similar to the system described and shown in U.S. Pat. No. 8,274,403, published Sep. 25, 2012, which is incorporated by reference in its entirety as applicable.

Referring to FIGS. 2A, 2B, 12A and 12B, in one aspect, the IoT network system includes at least one network link card 153, 166 (as noted above, the platform engine 101 may also include a network link card 180), an in-fabrication keying fixture 1219, and an IoT Edge device 120 and IoT network node device registration and authentication manager controller 199 (which may include one or more components of the platform engine 101, such as one or more of the engine core 101EC and engine vault 101EV (or any other component of the platform engine 101), and/or one or more components of the administration module 190, such as a sealed isolation vault 190V (or any other component of the administration module 190)). Each of the at least one network link card 153, 166, 180 is configured to respectively interface with a corresponding at least one of an IoT edge device 120 and an IoT network node device 110, of the IoT platform system 100, so as to communicably link, via a wide area network WAN each respective at least one IoT edge device 120 and IoT network node device 110 of the IoT platform system 100 to an IoT platform system control engine, such as the platform engine 101.

The in-fabrication keying fixture 1219 is configured in any suitable manner so as to couple with and key onto each at least one network link card 153, 166 respectively at fabrication so as to form an encryption key set 1203 on, and uniquely corresponding to, each respective network link card 153, 166 at fabrication of each respective network link card 153, 166. In one aspect, the keying fixture 1219 may be configured to couple with the at least one network link card 153, 166, during keying, through any suitable wired or wireless connection.

The IoT Edge device 120 and IoT network node device registration and authentication manager controller 199 is configured to respectively register and authenticate each at least one of the IoT edge device 120 and the IoT network node device 110 upon respective initialization and registration thereof, by the IoT platform (system control) engine 101, of each at least one of the IoT edge device 120 and the IoT network node device 110 within the IoT platform system 100 based on a secure symmetric encryption key set 1202S to the at fabrication formed encryption key set 1202 of the corresponding link card 153, 166 of each at least one of the IoT edge device 120 and IoT network node device 110 so as to effect authenticated onboarding respectively of each at least one of the IoT edge device 120 and IOT network node device 110 to the IoT platform system 100. In one aspect, authentication is effected upon and substantially coincident, with registration by the IoT network platform (system control) engine 101 of device 120, 110 initialization within the IoT network system 100S. The encryption key set 103 is disposed at least in a cryptologic unit 1103CM of each at least one network link card 153, 166 at fabrication of each at least one network link card 153, 166.

Figure 13A:
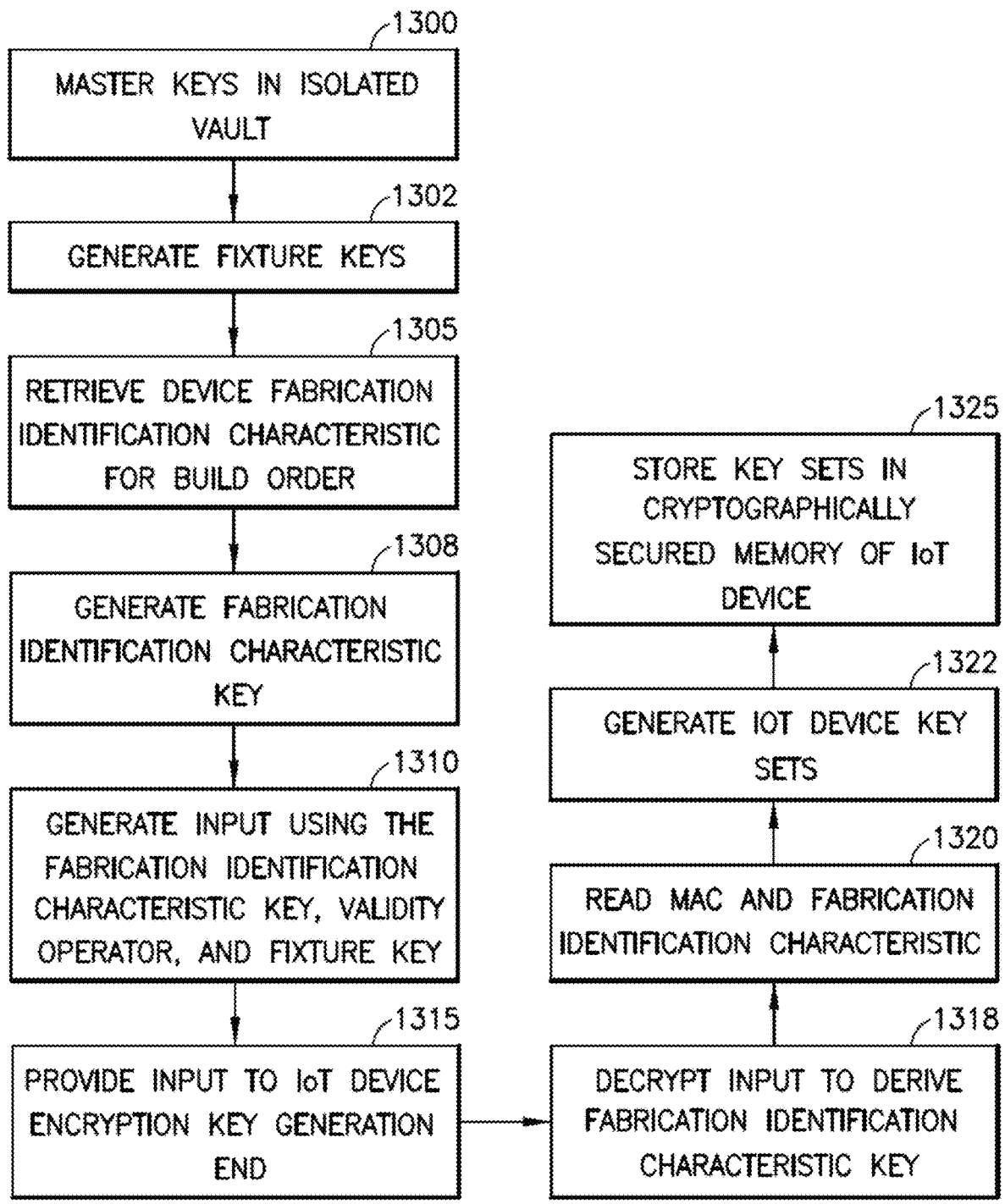
FIG. 13A is a flow diagram in accordance with aspects of the present disclosure.
Figure 13B:
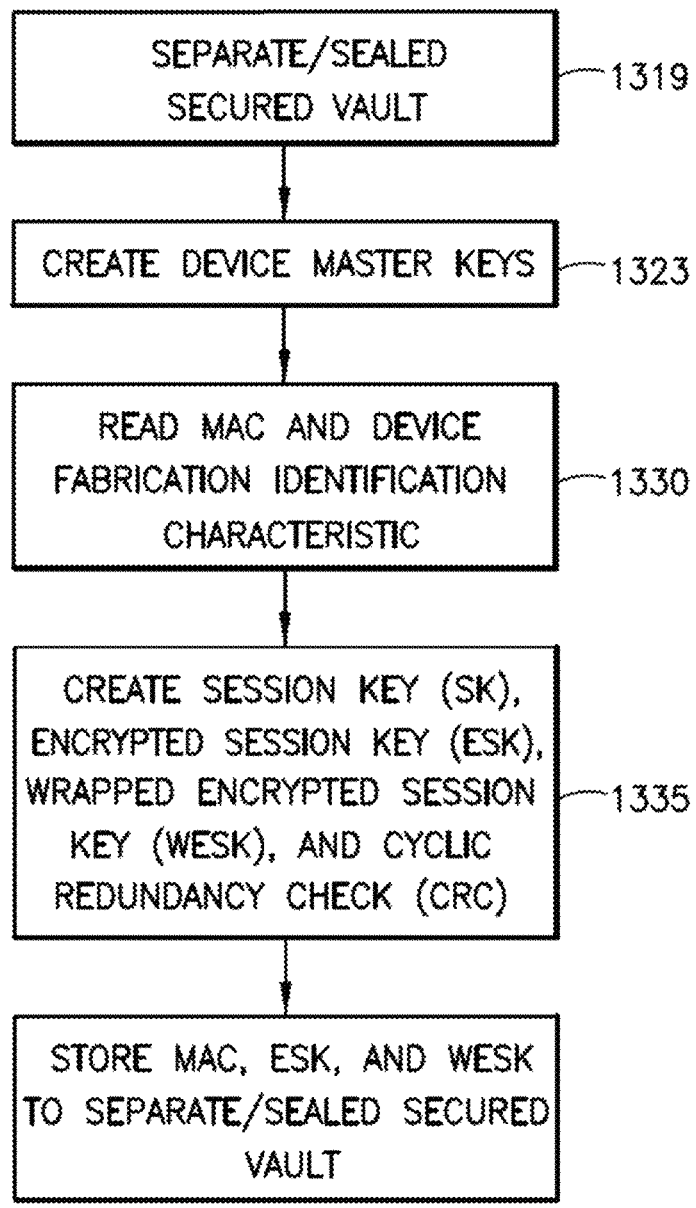
FIG. 13B is a flow diagram in accordance with aspects of the present disclosure.

Still referring to FIGS. 2A, 2B, 12A and 12B as well as FIGS. 13A and 13B, the IoT platform system 100 includes an IoT platform system encryption key security system 1290. The operation of the IoT platform system encryption key security system 1290 may be based on a common encryption key set 1204 that includes at least one principal or common (e.g., master) key MK1-MK stored in a secure storage 190KS (FIG. 13A, Block 1300) so as to be separate and sealed from the IoT platform system 100. In one aspect, the secure storage 190KS is included in a key generating unit 190K of the administration module 190, while in other aspects the secure storage 190KS may be any storage that is separate and isolated from the IoT platform system 100. While four common keys MK1-MK4 are shown in other aspects there may be more or less than four common keys. The key generating unit 190K may be a one-time-programmable storage and may not be read or modified by a controller/processor 190KC of the key generation unit 190K.

IoT platform system encryption key security system 1290, formed by the IoT platform system 100, in one aspect, includes an IoT device encryption key generation end 1220 that is communicably coupled to an IoT platform engine encryption key generation end 1201 through a secured encryption communication link 1235, The IoT platform engine encryption key generation end 1201 may be a portion of one or more platform engines 101 disposed to register and authorize IoT devices 110, 120 as the initialize on the IoT platform system 100. The secured encryption communication link 1235 defines a hierarchical encryption key set layer arrangement 1250 with encryption key sets 1202 of a superior layer 1250LS1 generated at the IoT device encryption key generation end 1220 and encryption key sets 1203 of a superior layer 1250LS2 generated at the IoT platform engine encryption key generation end 1201 being based on the common encryption key set 1204 (e.g., common keys MK1-MK4) forming the principal layer 125LP of the hierarchical encryption key set layer arrangement 1250 from which the superior layer 1251LS1, 1250LS2 depends.

The IoT device encryption key generation end 1220 of the encryption key security system 1290 is defined by an encryption key generation processor 1200, such as included in a respective keying fixture 1219, disposed so as to key encryption key sets 1202 onto IoT edge devices 120 and IoT communication node devices 110 at fabrication of the IoT edge devices 120 and IoT communication node devices 110.

Another encryption key generation processor 190KC, such as of the key generation unit 190K, is disposed so, or communicably coupled so, as to provide encryption key generation input providing encryption key sets 1203 to the IoT platform engine 101. The other encryption key generation processor 190KC defines an IoT platform engine encryption key generation end 1201 of the encryption key security system so that the IoT device encryption key generation end 1220 and the IoT platform engine encryption key generation end 1201 form substantially symmetrical key generation ends 1230SM of the encryption key security system 1290. Each of the encryption key sets 1203 generated at the IoT platform engine encryption key generation end 1201 may be based, at least in part, on a symmetric set of encryption keys 1202S to each corresponding encryption key set 1202 of the encryption key sets 1202 generated at the IoT device encryption key generation end 1220.

Each of the encryption key sets 1203 generated at the IoT platform engine encryption key generation end 1201 includes an independently generated independent key 1217 and at least one other key 1218 (e.g. a device communication key). The independent key 1217 and the at least one other key 1218 based at least in part on the symmetric set of encryption keys 1202S define other superior key set layers 1250LL of the hierarchical encryption key set layer arrangement 1250 securing end to end encryption security of a communication link connecting an IoT platform engine encryption key generation end 1201 and an IoT device encryption key generation end 1220 of the IoT platform system 100. The independent key 1217 uniquely corresponds to each respective IoT edge device 120 and/or IoT network node device 110. The at least one other key 1218 is based, at least in part, on the symmetric set of encryption keys 1202S to each corresponding encryption key set 1202 of the encryption key sets 1202 generated at the IOT device encryption key generation end 1220. The independent key 1217 defines a session key 1217S for the respective IoT edge device 120 or respective IoT network node device 110 (collectively referred to herein as the IoT device 110, 120) and is input to the IoT device 110, 120 by session key encrypted communication SCOMM from the IoT platform engine 101, via the wide area network WAN of the IoT platform system 100. The session key encrypted communication SCOMM being based on the at least one other key 1218 and includes at least one validity operator 1257A (which may or may not be the same as validity operator 1257) providing a communication tamper indicator 1258A (which may or may not be the same as validity tamper indicator 128) of the session key encrypted communication SCOMM.

The session key encrypted communication SCOMM embodying the session key 1217S input to the respective IoT device 110, 120 is effected upon and in initial response to IoT platform engine 101 registration of initialization of the respective IoT device 110, 120 within the IoT platform system 100. The initial response of the session key encrypted communication SCOMM from IoT platform engine 101 to respective IoT device 110, 120 and decryption of the session key 1217S from the session key encrypted communication SCOMM and input in the respective IoT device 110, 120 effect authentication of the respective IoT device 110, 120 and onboarding of the respective IoT device 110, 120 to the IoT platform system 100 as described in greater detail herein.

In one aspect, the encryption key sets 1202 of the superior layer 1250LS1 generated at the IoT device encryption key generation end 1220 and the encryption key sets 1203 of the superior layer 1250LS2 generated at the IOT platform engine encryption key generation end 1201 comprise a combination of at least one symmetric encryption key SKEY and at least one asymmetric encryption key AKEY.

The encryption key sets 1202 generated at the IoT device encryption key generation end 1220 are based on the common encryption key set 1204 and information from an encrypted input 1255 to the IOT device encryption key generation end 1220. These encryption key sets 1202 can only be used to encrypt and decrypt data passing it to the cryptologic unit 1103CM, 162CM (e.g., this hardware isolation may ensure that the device key sets 1202 cannot be stolen remotely by installing malicious firmware on the IoT device 110, 120). The uniqueness of the device key sets 1202 may also ensure that if a malicious attacker gets physical access to an IoT device 110, 120 in a laboratory environment, the malicious attacker may only be able to steal the keys of the physically possessed IoT device 110, 120 (because each IoT device 110, 120 has a unique set of keys 1202). The encrypted input 1255 is based on the common encryption key set 1204 and includes at least a predetermined IoT device fabrication identification characteristic 1256 and a validity operator 1258 effecting a tamper indicator 1258 of the encrypted input 1255. The predetermined IoT device fabrication identification characteristic 1256 forms a basis in generation of the encryption key sets 1202 at the IoT device encryption key generation end 1220, each of which encryption key sets 1202 is keyed onto and uniquely corresponds to a respective link card 153, 166 of each given IoT edge device 120 and each given IoT communication node device 110 at fabrication of the respective link card 153, 166. The validity operator 1257 defines a validity window (or expiry) of the encrypted input 1255, and a validity window (or expiry) for generation of the encryption key sets 1202 generated, based on the encrypted input 1255 at the IoT device encryption key generation end 1220, and for keying each of the encryption sets 1202, based on the encrypted input, onto the respective link card 153, 166 at fabrication thereof.

In one aspect, each of the keying fixtures 1219 includes a respective unique fixture key FK1-FKn that is derived from the common keys MK1-MK4 and a unique MAC address of the respective keying fixture 1219-1219$n$. For example, given a keying fixture 1219 MAC address, such as exemplary 6 byte MAC address 0004a3810123 and the set of common keys MK1-MK4, the key generating unit 190K is configured to generate the fixture key FK1-FKn (FIG. 13A, Block 1302). The fixture key FK1-FKn is generated by right-zero-padding the MAC address to form a 16 byte plaintext such as, for example, 0004a38101230000000000. The key generating unit 190K is configured to, with any suitable encryption algorithm (such as, e.g., AES-128 in any suitable mode such as, e.g., counter, electronic code book and cipher feedback modes), encrypt the plaintext with each of the common keys MK1-MK4 in turn (e.g., by pointing to them KEYSRC 1-4), to produce a 16 byte ciphertext corresponding to each of the respective common keys MK1-MK4. For example, the 16 byte cipher text for common key MK1 may be, e.g., 1f7c4d08432fa5a1ece0aa02349503, where a 16 byte cipher text is generated for each of the other three common keys MK2-MK4 to produce a respective set of fixture keys FK1 for the keying fixture 1219 having MAC address 0004a3810123. These fixture keys FK1-FKn may be included in the encrypted input 1255.

The encrypted input 1255 may disposed on any suitable computer readable storage media 1260 that is ported from any suitable input generation location 1299 to the IoT device encryption key generation end 1220. The encrypted input 1255 is disposed on the computer readable storage media at the input generation location 1299, where the input generation location 1299 is separate and remote from the IOT device encryption key generation end 1220. In one aspect, the computer readable storage media is a universal serial bus storage device or any other suitable solid state storage device. In another aspect, the encrypted input 1255 may be ported to the IoT device encryption key generation end 1220 through any suitable wired or wireless network, such as the wide area network WAN.

Still referring to FIGS. 2A, 2B, 12A, 12B, 13A and 13B, the generation of the key set 1202 keyed to the respective IoT devices 110A-110$n$, 120A-120$n$ will be described. In one aspect, the IoT devices 110A-110$n$, 120A-120$n$ may be manufactured by any suitable contract manufacturer. This contract manufacturer may load firmware (which may be included in the network link cards 153, 166) onto the IoT devices 110, 120 so that the IoT devices 110A-110$n$, 120A-120$n$ may be tested. However, to reduce tampering of the IoT devices 110A-110$n$, 120A-120$n$ the contract manufacturer is not provided with the key sets 1202 until the key sets 1202 are ready to be keyed into the respective IoT devices 110A-110$n$, 120A-120$n$. For example, prior to a production run of IoT devices 110A-110$n$, 120A-120$n$ the predetermined IoT device fabrication identification characteristic 1256 and a validity operator 1258 are generated/retrieved by, for example, a processor 190VP of the sealed isolated vault 190V of the administration module 190 (FIG. 13, Block 1305) for a predetermined IoT device build order. An IoT device fabrication identification characteristic key 1256K may be generated (FIG. 13A, Block 1308) by the processor 190VP based on, for example, the predetermined IoT device fabrication identification characteristic 1256. In one aspect, the predetermined IoT device fabrication identification characteristic 1256 is a production batch number and the IoT device fabrication identification characteristic key 1256K is a batch key generated from the production batch number, but in other aspects any suitable fabrication identification information/characteristics may be used. The encrypted input 1255 (e.g. in the form of wrapped data) may be generated (FIG. 13A, Block 1310) by the processor 190VP using at least the IoT device fabrication identification characteristic key 1256K, the validity operator 1257 and the respective unique fixture key FK1-FKn of the keying fixture 1219 being used to produce the batch of IoT devices 110A-110n, 120A-120n. If any part of the encrypted input 1255 is tampered with, this tampering may be detected using the validity operator 1257 which may be a time validity window after the expiration of which the encrypted input 1255 is no longer be valid for use.

The encrypted input 1255 is provided to the IoT device encryption key generation end 1220 (FIG. 13A, Bock 1315) from the input generation location 1299 in any suitable manner, such as being ported with the computer readable storage media 1260. The IoT device encryption key generation end 1220 is configured to receive the encrypted input 1255 at, for example, the keying fixture 1219, where if validated the encrypted input 1255 unlocks (e.g., makes operable) the keying fixture 1219 to enable the generation/manufacture of the IoT devices 110A-110n, 120A-120n with the keying fixture 1219. The keying fixture 1219 is configured to decrypt the encrypted input 1255 for authenticating the encrypted input 1255. For example, the keying device 1219 decrypts the encrypted input to derive the fabrication identification characteristic key 1256K (FIG. 13A, Block 1318). If, for example, the fabrication identification characteristic key 1256K matches a corresponding fabrication identification characteristic key 1256KC generated by the keying fixture 1219 then the encrypted input is authenticated and the keying fixture 1219 is activated for production of the IoT devices 110A-110n, 120A-120n.

As described herein, the IoT devices 110A-110n, 120A-120n include a respective secured memory, such as the cryptologic unit 1103CM, 162CM (FIG. 13B, Block 1319). The cryptologic unit 1103CM, 162CM may not be a general output register and may be used for subsequent operation of the IoT device 110A-110n, 120A-120n but may not be read by the processor of the respective IoT device 110A-110n, 120A-120n. The keying fixture 1219, for example, communicates with the IoT devices 110A-110n, 120A-120n within the batch of IoT devices 110A-110n, 120A-120n being manufactured to test the hardware of the IoT devices 110A-110n, 120A-120n. The keying fixture also reads a MAC address 127MA of the respective IoT devices 110A-110n, 120A-120n from the respective IoT devices 110A-110n, 120A-120n and the fabrication identification characteristic 1256 (FIG. 13A, Block 1320; FIG. 13B, Block 1330) from any suitable memory (e.g. such as memory of the keying fixture 1219 where the fabrication identification characteristic 1256 may be user input. The keying fixture 1219 determines a device key set 1202 or master keys (FIG. 13A, Block 1322; FIG. 13B, Block 1323) having a predetermined number (e.g., about for or in other aspects more or less than about 4) of encryption keys. As described herein, the key set 1202 is determined from the fixture key set FK1-FKn of the keying fixture 1219 producing/keying the IoT devices 110A-110n, 120A-120n, the fabrication identification characteristic key and the MAC address of the respective IoT device 110A-110n, 120A-120n. As also described herein, the IoT devices 110A-110n, 120A-120n include a respective secured memory, such as the cryptologic unit 1103CM, 162CM, where the device key set 1202 is cryptographically stored in the secured memory of the respective IoT device 110A-110n, 120A-120n (FIG. 13A, Block 1325).

For each IoT device 110, 120 manufactured, in an off-line operation (or an online operation) at, e.g., the IoT platform engine key generation end 1201, a session key SK (e.g., the session key 1217S), an encrypted session key ESK, a wrapped session key WESK, a random number R, a cryptographic derivative of the random number ER and a cyclic redundancy code (CRC) are generated (FIG. 13B. Block 1335). An initialization vector IV is also generated at, e.g., the IoT platform engine key generation end 1201 and is obtained from the at least one validity operator 1257 or 1257A. The cryptographic derivative ER may be a cyclic redundancy code (CRC) that is generated from the random number R and the initialization vector IV. In one aspect the session key SK is a random number that forms an independent key; the encrypted session key ESK is generated from at least a first device key in the respective IoT device 110, 120 key set 1202 and the session key; the wrapped session key WESK is generated from at least a second device key in the respective IoT device 110, 120 key set 1202 and the encrypted session key ESK. The cryptographic derivative ER may be a cypher feedback mode encryption generated from at least a third device key set in the respective IoT device 110, 120 key set 1202. In one aspect, the symmetrical key set (s) 1202S is used to generate one or more of the encrypted session key ESK, the wrapped session key WESK, the random number R, and the cryptographic derivative of the random number ER and a cyclic redundancy code (CRC) for each respective IoT device 110, 120. As may be realized, the hierarchical encryption key set layer arrangement 1250 and/or the session key SK key set (e.g., SK, ESK, WESK, R, ER, IV, and/or CRC) provide for detection of any hacking into the IoT platform system 100. In one aspect, additional random number R and cryptographic derivative ER pairs for other epochs (IVs) may be stored as well which may provide for a longer "key valid" duration (e.g., a longer validity operator 1257, 1257A).

At least the session key SK, the encrypted session key ESK, the wrapped session key WESK, the random number R, the cryptographic derivative of the random number ER and a cyclic redundancy code (CRC) are stored in any suitable database/memory of one or more platform engine (s) 101, such as in the network link card 180 and/or in a distributed storage 188 (e.g., in the engine vault 101EV) which may provide for the secure transmission of the session key SK to the respective IoT device 110, 120.

Figure 14A:
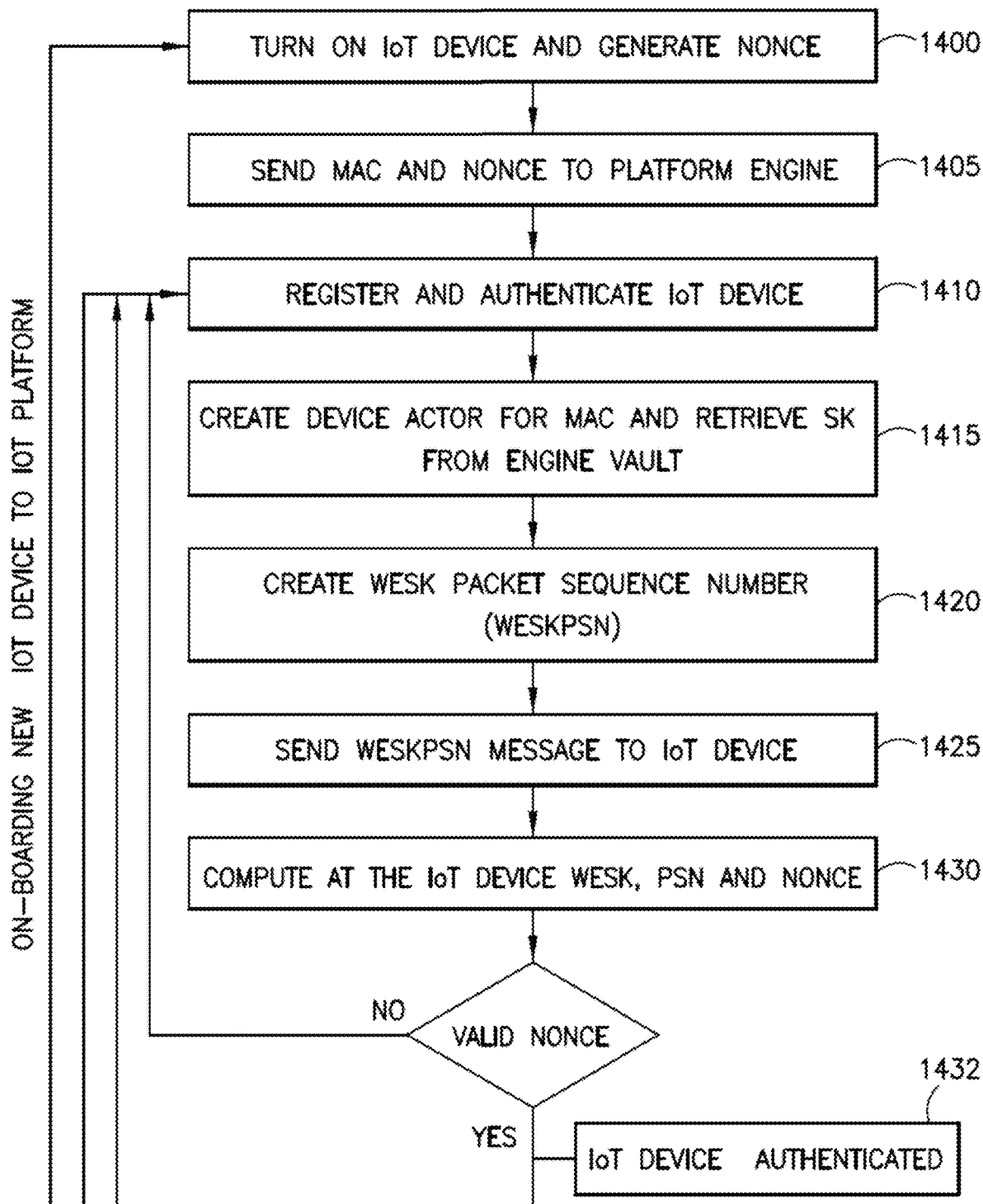
FIGS. 14A and 14B (referred to herein as FIG. 14) is a flow diagram in accordance with aspects of the present disclosure.
Figure 14B:
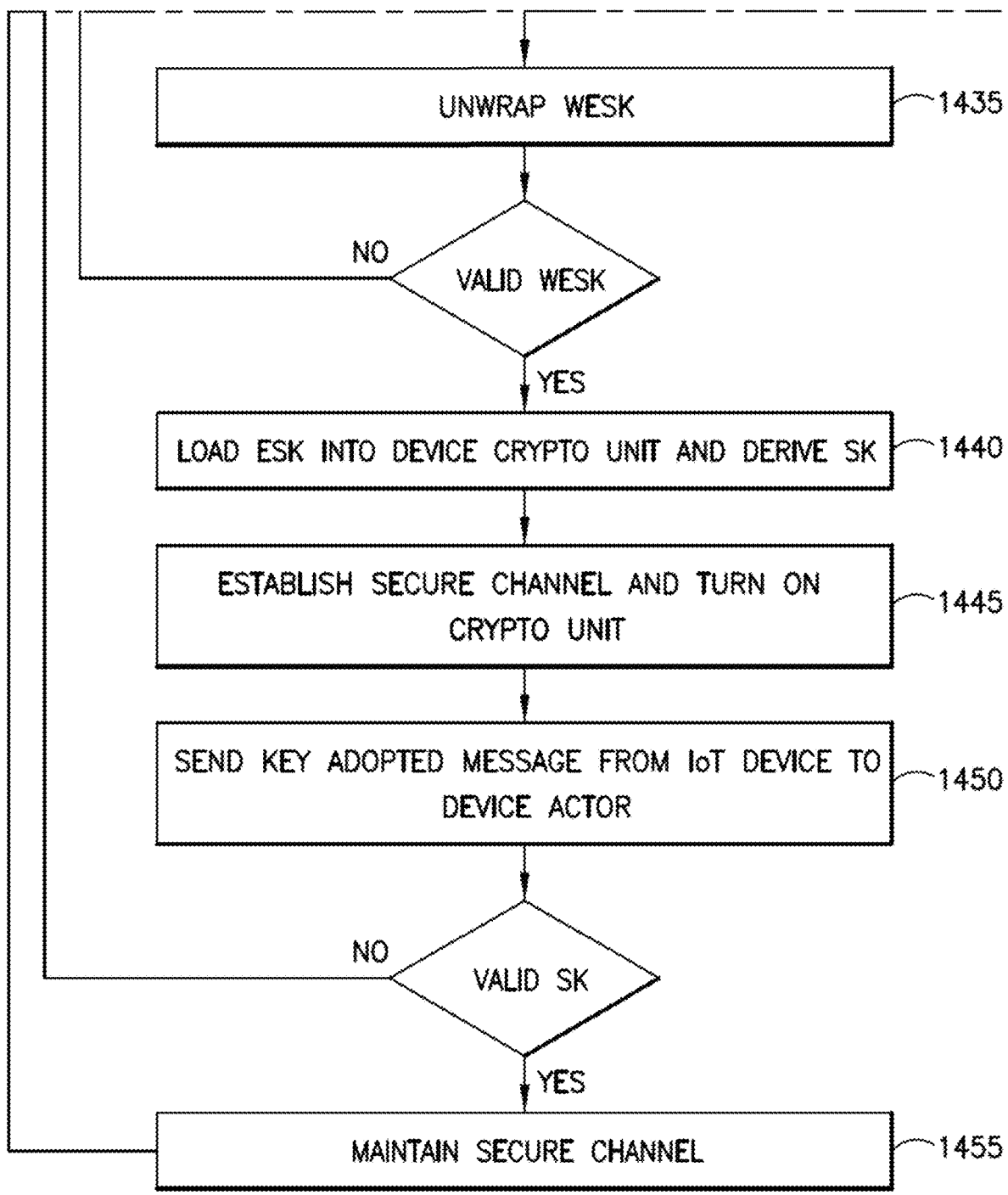

Referring to FIGS. 2A, 2B, 12A, 12B, and 14, on-boarding of new IoT devices 110, 120 into the IoT platform system 100 will be described. After manufacture, the IoT device 110, 120 is installed in the field. Once installed the IoT device 110, 120 is registered and authenticated on the IoT platform system 100. To register the IoT device 110, 120 the IoT device 110, 120 is turned on (FIG. 14, Block 1400). Where the IoT device is an IoT edge device 120, the IoT edge Device 120 scans for available IoT network node device(s) 110. Where the IoT device is an IoT network node device 110, the IoT network node device 110 scans for available platform engine(s) 101. The IoT device 110, 120 generates a random number (e.g., a nonce) and sends its MAC address and the nonce to the platform engine 101 (FIG. 14, Block 1405). The MAC address and the nonce may be sent to a selected portion of one or more platform engine(s) 101 that operate/effect registration of the IoT device 110, 120 initialization on the IoT platform system 100 and authentication of the IoT device 110, 120.

The platform engine 101 looks up the IoT device 110, 120 by the MAC address of the IoT device 110, 120 to register and authenticate the IoT device 110, 120 (FIG. 14, Block 1410). The platform engine 101 creates a device actor for the MAC address and retrieves the session key SK from the engine vault 101EV (FIG. 14, Block 1415). In one aspect, the device actor can retrieve the current session key SK for the IoT edge device 120 it represents from the engine vault 101EV. The platform engine 101 (e.g., through the device actor) creates a wrapped encrypted session key packet sequence number WESKPSN (which is created from at least the cyclic redundancy code CRC, the wrapped encrypted session key WESK, a packet sequence number PSN and the nonce, where the PSN is the IoT device's 110, 120 last used packet sequence number) (FIG. 14, Block 1420). In one aspect, at least one key of the device communication key 1218 for the IoT edge device 120 is used to generate the wrapped encrypted session key packet sequence number WESKPSN. In one aspect, the generation of the wrapped encrypted session key packet sequence number WESKPSN is performed with an XOR mask inside of a vault instance.

The platform engine 101 sends the wrapped encrypted session key packet sequence number WESKPSN to the IoT device 110, 120 (FIG. 14, Block 1425). Where the IoT device is the IoT edge device 120, the IoT edge device retrieves the current IoT platform system 100 time stamp from an IoT network node device 110 and derives one or more of the initialization vector IV, the wrapped encrypted session key WESK, the packet sequence number PSN and the nonce (FIG. 14, Block 1430). Where the IoT device is the IoT network node 110, the IoT network node 110 retrieves the current IoT platform system 100 time stamp from the platform engine 101 and derives one or more of the initialization vector IV (e.g., a validity operator), the wrapped encrypted session key WESK, the packet, sequence number PSN and the nonce (FIG. 14, Block 1430). The IoT device 110, 120 can compute the XOR mask generated by the platform engine 101 using at least one key of the device key set 1202 to unwrap the wrapped encrypted session key packet sequence number WESKPSN. For example, the IoT device 110, 120 unwraps the wrapped encrypted session key packet sequence number WESKPSN and computes the cryptographic derivative ER, noting that the cryptographic derivative ER will only be correct if the initialization vector IV falls within a predetermined time epoch allowed by the platform engine 101. If at least the nonce determined by the IoT device 110, 120 matches the nonce generated by the IoT device 110, 120, then the IoT device 110, 120 is authenticated 1432 and the wrapped encrypted session key packet sequence number WESKPSN becomes the wrapped encrypted session key WESK, the packet sequence number PSN, and the nonce. If there is no authentication the authentication process returns to block 1410 of FIG. 14.

Once the IoT device 110, 120 is authenticated the IoT device 110, 120 unwraps the wrapped encrypted session key WESK (FIG. 14, Block 1435). If the unwrapping of the wrapped encrypted session key WESK fails then the failure may be indicative of a hacking event or the session key SK if for the wrong epoch and registration is retried (e.g., returning to FIG. 14, Block 1410). If unwrapping the wrapped encrypted session key WESK is successful the IoT device 110, 120 compares the nonce with the nonce generated by the IoT device and if the nonces do not match, this may be indicative of a hacking attempt and registration is retried (e.g., returning to FIG. 14, Block 1410). If the nonces do match, the IoT device attempts to determine the encrypted session key ESK by unwrapping the wrapped encrypted session key WESK (FIG. 14, Block 1435). If unwrapping the wrapped encrypted session key WESK fails, registration is retried (e.g., returning to FIG. 14, Block 1410). If unwrapping of the wrapped encrypted session key WESK is successful, the IoT device 110, 120 adopts the packet sequence number PSN as its packet sequence number and loads the encrypted session key ESK into the cryptologic unit 1103CM, 162CM of the IoT device 110, 120 and the session key SK is derived from the encrypted session key ESK using at least one key of the key set 1202 of the IoT device 110, 120 (FIG. 14, Block 1440). The session key SK is stored in the cryptologic unit 1103CM, 162CM and cannot be read by the controller 151C, 152C, 162 of the IoT device 110, 120.

A secure channel is established between the IoT edge device 120 and the IoT network node device 110 (or from the an IoT network node device 110 to the platform engine 101) and the cryptologic unit 1103CM, 162CM is turned on (FIG. 14, Block 1450). The IoT device 110, 120 sends a key adopted message (which includes the session key) from the IoT device 110, 120 to the device actor of the IoT network node device 110 (where the IoT device is the IoT edge device 120) or asset actor of the platform engine 101 (where the IoT device is the IoT network node device 110) (FIG. 14, Block 1450). The session key is validated by the IoT network node device 110 (where the IoT device is the IoT edge device 120) or the platform engine 101 (where the IoT device is the IoT network node device 110) and the secure channel is maintained (FIG. 14, Block 1455). Where the session key is not validated the authentication process returns to FIG. 14, Block 1410.

In one aspect, the authenticating device for authenticating an IoT edge device 120 may be an IoT network node device 110, where the IoT network node device 110 knows a default communications module 173 to connect to on initialization. If the authenticating device is the IoT network node device 110, the network link card 166 and the cryptologic unit 162CM of the IoT network node device 110 is used to generate the nonce and authenticate the IoT edge device 120 in a manner similar to that described above.

In one aspect, the IoT platform system 100 uses any suitable encryption mode, as noted above, to encrypt communications between the devices of the IoT platform system 100. In one aspect a message integrity code (MIC) is also used for message integrity and authentication. For exemplary purposes only, in one aspect, the encryption mode may be a counter encryption mode that uses a 128-bit counter and a pay load. Part of the payload may be a filed for the message integrity code to reside. In one aspect, the encryption of the IoT platform system 101 includes at least a protocol identification (ID), the IoT device's 110, 120 MAC address, the packet sequence number PSN, and a cyclic redundancy code (CRC). Once the encryption mode is formed, the encryption mode can be used to encrypt the rest of the packet (except for the message integrity code). In one aspect, the cryptologic unit 1103CM, 162CM is configured to use the encryption mode and the session key SK to encrypt the packet data a predetermined number of bytes at a time, such as for example, about 16 bytes at a time (in other aspects the predetermined number of bytes may be more or less than about 16 bytes). After encrypting each predetermined number of bytes, the counter filed in the packet is incremented and another predetermined number of bytes is encrypted. Once the entire packet length of data is encrypted, the message integrity code (MIC) is computed in any suitable manner, such as using Chasekey (ESK, encrypted data) and inserted into the message integrity code field of the payload.

The entire counter, message integrity code, and payload is transmitted from, for example, the IoT edge device 120 to the IoT network node device 110 using any suitable communication protocol and any suitable communication method (e.g. such as radio frequency or any other suitable transmission method/type).

The incoming packet is received by the platform engine 101 and is inspected. The platform engine 101 computes the counter cyclic redundancy code to verify the integrity of the counter block of the data packet. If a cyclic redundancy code mismatch occurs, the data packet may be disregarded. The platform engine 101 extracts the MAC address of the IoT edge device 120 and looks up the IoT edge device's 120 session key record using the MAC address. The encrypted session key is retrieved from the engine vault 101EV and Chasekey (ESK, encrypted data) is determined and compared to the message integrity code received by the platform engine 101. If the message integrity code does not match, the packet may be discarded. If both the cyclic redundancy code and the message integrity code both match, the platform engine 101 uses the session key SK of the IoT edge device 120 to encrypt the counter field of the data packet, which is used to derive the payload area in a standard counter mode encryption procedure. The platform engine now holds the decrypted IoT edge device 120 message and data. The platform engine 101 may respond to the IoT edge device 120 message in any suitable manner, such as by generating its own message and uses the IoT edge device's session key SK to encrypt the message using, for example, counter mode encryption.

Figure 15:
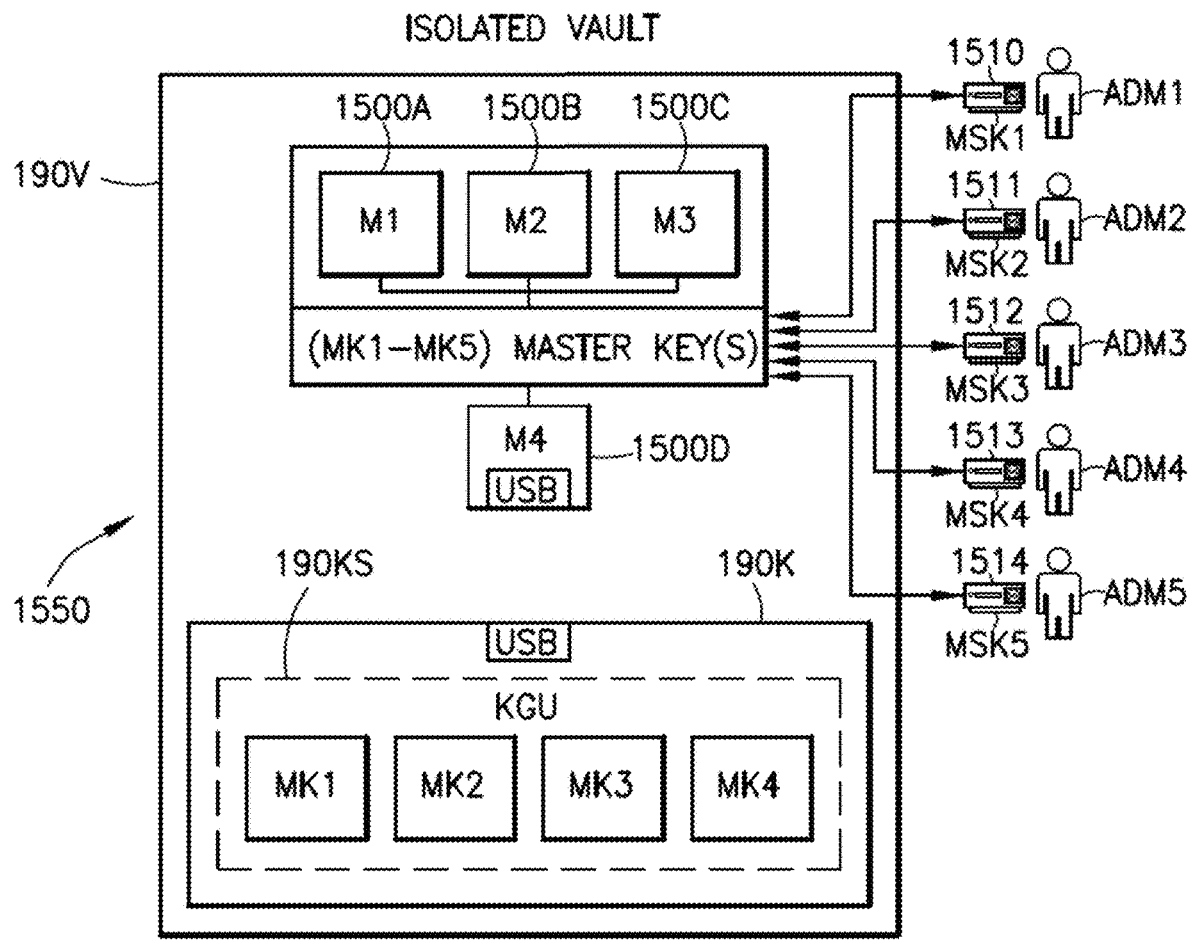
FIG. 15 is a schematic illustration of an isolated vault in accordance with aspects of the present disclosure.
Figure 16:
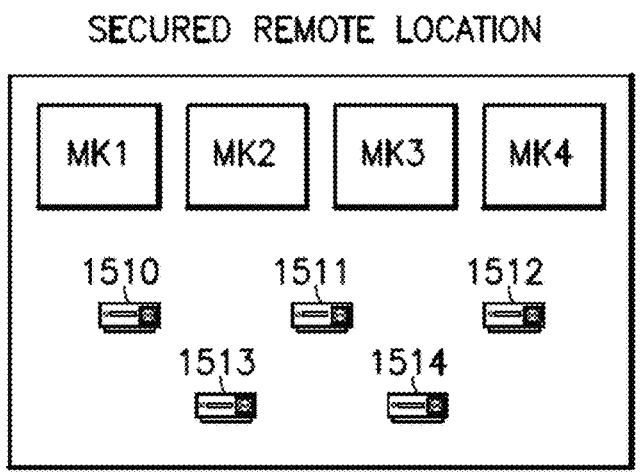
FIG. 16 is a schematic illustration of a remote secure location in accordance with aspects of the present disclosure.
Figure 21:
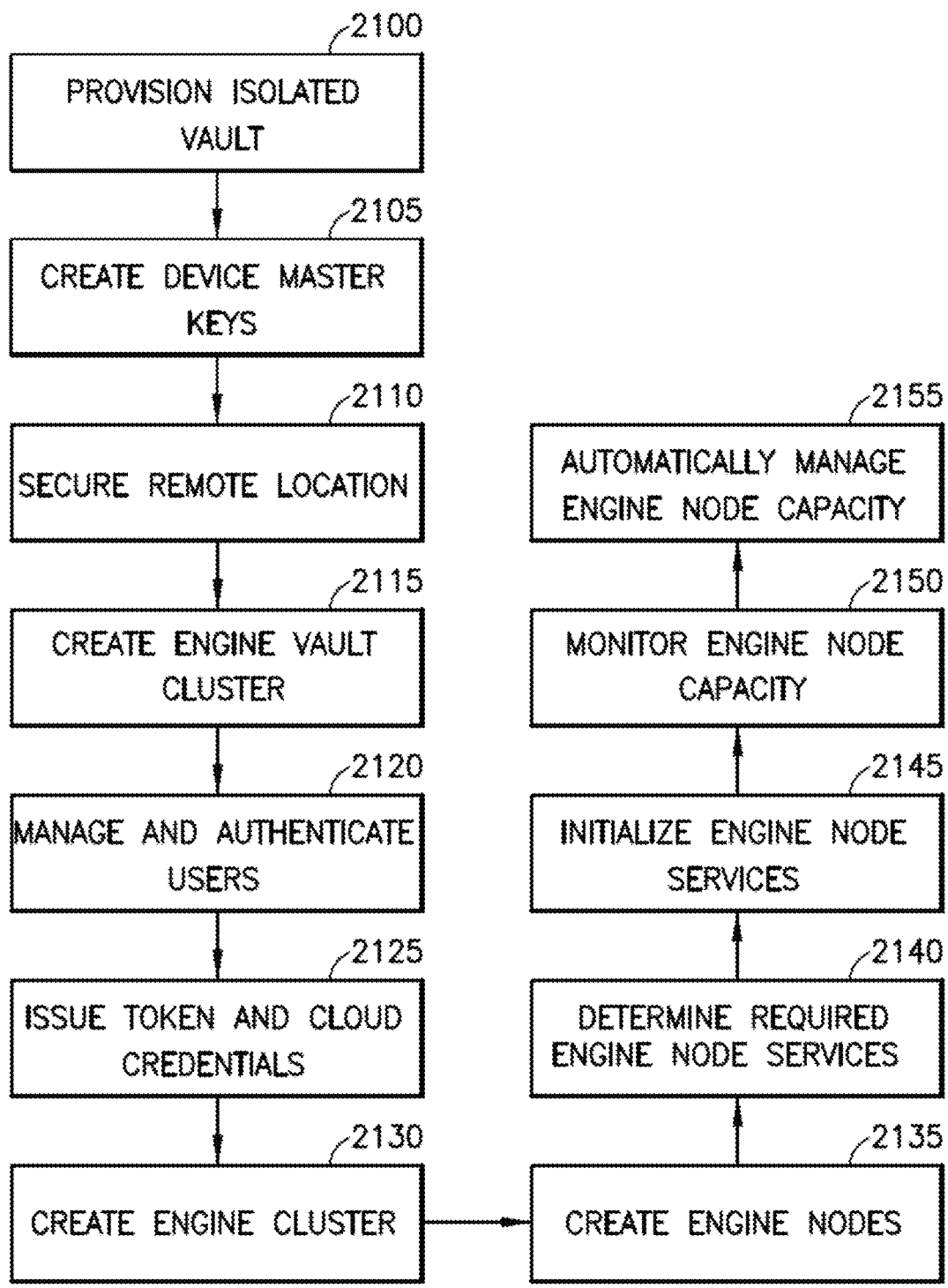
FIG. 21 is a flow diagram in accordance with aspects of the present disclosure.

Referring to FIGS. 2A, 2B, 15, 16 and 21, prior to initialization of the IoT platform system 100, an isolated vault 190V cluster is provisioned (FIG. 21, Block 2100) on a predetermined number of servers 1500A-1500C (here there are three servers but in other aspects there may be more or less than three servers). These servers 1500A-1500C are completely isolated from the Internet to protect against any remote hacking attacks on the isolated vault 190V cluster from the Internet. A predetermined number of administrators ADM1-ADM5 are also selected. Five administrators ADM1-ADM5 are illustrated in FIG. 15 but in other aspects there may be more or less than five administrators. A set of one or more master keys MSK1-MSK5 is created (FIG. 21, Block 2105) and secured in a remote location 1600 (FIG. 21, Block 2110). For example, the one or more master keys MSK1-MSK5 are each stored on a respective secure universal serial bus device 1510-1514 (or other suitable computer readable media) that are encrypted with any suitable password and hardware encryption. The set of one or more master keys MSK1-MSK5 seals the isolated vault 190V cluster. In one aspect, each of the administrators is assigned a respective master key MSK1-MSK5 where a majority of the administrators is desired to unseal the isolated vault 190V, while one or more administrators is desired to be present to seal the isolated vault 190V. In one aspect, the servers 1500A-1500C are configured to receive information through serial ports (or other suitable communicable connection). Here another server 1500D is coupled to the servers 1500A-1500C and provides an interface between the remote secured locations (e.g., the secure universal serial bus device 1510-1514) and the isolated vault 190V cluster. The server 1500D may prevent an infected secure universal serial bus (USB) device 1510-1514 from affecting the isolated vault 190V cluster due to, for example, a predetermined serial communication protocol between the server 1500D and the isolated vault 190V cluster.

The key generation unit 190K is created. The at least one principal or common (e.g., master) key MK1-MK is stored in a secure storage 190KS (e.g., a hardware based cryptologic memory) of the key generation unit 190K. In one aspect, a USB cable is coupled to the key generation unit 190K and when the key generation unit 190K is coupled to a server, the key generation unit 190K appears as a serial device. The common keys MK1-MK5 and the set of one or more master keys MSK1-MSK5 are stored in the secured remote location 1600.

Figure 20:
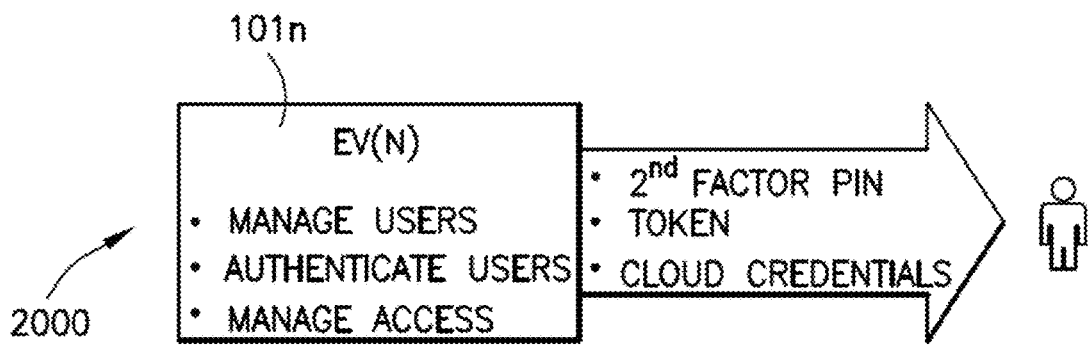
FIG. 20 is a schematic illustration of an authentication process in accordance with aspects of the present disclosure.

Referring to FIGS. 2A, 2B, 15, 19 and 21, in one aspect, the IoT platform system 100 can be initialized on a networked server 1550 or on a cloud infrastructure 1900. As described above, the IoT platform system 100 includes multiple IoT platform edge devices 120 communicably coupled for bidirectional communication with multiple IoT platform communication network nodes 110. The IoT platform engine 101 is communicably coupled for bidirectional communication with the IoT platform communication network nodes 110, and via therewith communicably coupled for bidirectional communication with the IoT platform edge devices 120. An engine vault 101EV1-101EVn cluster is provisioned and initialized (FIG. 21, Block 2115). The engine vault 101EV1-101EVn cluster is also sealed with the master keys MK1-MK5 and can be unsealed with a majority of the master keys MK1-MK5. The engine vault 101EV1-101EVn cluster is desired to be accessible within a virtual private network (VPN) or virtual private cloud (VPC) to isolate the engine vault 101EV1-101EVn cluster where each engine vault 101EV1-101EVn may be geographically separated from one another for fault tolerance. The engine vault 101EV1-101EVn cluster may be used to manage and authenticate users (which users may include administrators) (FIG. 21, Block 2120), For example, any one or more of the administrators ADM1-ADM5 can add new users with usernames, phone numbers, VPN credentials and assign access control policies to the users. The secure sealed storage section 101EV manages and enables access with multifactor user authentication 2000 (FIG. 20). For example, users can authenticate with the engine vault 101EV by providing a username and password and confirming a second factor pin that is sent to the user when the user requests authentication. Once the user is authenticated, the user is issued a token and/or cloud credentials (FIG. 21, Block 2125). The token may expire within a predetermined time period (e.g., about 15 minutes or more or less than about 15 minutes) as per policy. The token and credentials can be used to further interact with other data available in the engine vault 101EV for example to lease access keys to other parts of the IoT platform system 100. A user requesting cloud credentials is authenticated in a manner similar to that described above with respect to the token. Once authenticated the user can request a lease for short term cloud credentials. The engine vault 101 is configured to generate dynamic credentials and revokes them when the lease expires. This may prevent leaking of the server infrastructure when/if a developer machine is compromised. In one aspect, the cloud credentials are temporary and are invalid after a predetermined time period (e.g., about three minutes or more or less than about three minutes). The temporary cloud credentials also facilitates revocation of a developers access to the IoT platform system 101 when the developer leaves an IoT platform system development group. In one aspect, with the leased cloud credentials the developer or system operator can create new cloud servers on demand with various cloud infrastructure providers and in corporate datacenter private cloud environments. This may be facilitated with a collection of scripts and pre-determined machine images.

Each IoT platform engine 101 may have multiple function modules as illustrated in FIGS. 2B1 and 2B2 (referred to herein as FIG. 2B). In one aspect, an engine cluster 101CL may be created (FIG. 21, Block 2130), where the IoT platform engine 101 may be disposed on a variably selectable number of server/engine nodes SN1-SNn (FIG. 21, Block 2135) of a server node cloud 1900SN. At least one function module of the multiple function modules being a provisioning engine module 1960 configured as to selectably populate the server nodes SN1-SNn with the platform engine 101, and another of the multiple function modules being a secure sealed storage section 101EV that stores, sealed from each other of the multiple function modules of the platform engine outside the sealed storage section, IoT user credentials and rights as to access and affect functions of function modules of the platform engine 101 including the provisioning engine module 1960. In one aspect, the server node cloud 1900SN is disposed as infrastructure as a service (IAAS) platform, or as a private server cloud.

The secured sealed storage 101EV section being configured to manage and enable access to user rights including authorization to initialize the provisioning engine module 1960 so as to effect secure elastic provisioning selection of the number of server nodes SN1-SNn on which the platform engine 101 is disposed. The secure sealed storage section 101EV is arranged so that provision of secure seal integrity is decoupled and maintained from an exterior of the IoT platform engine 101. In one aspect, the platform engine 101 is configured with a distributed storage layer 1970, and the secure sealed storage section 101EV is disposed within the distributed storage layer 1970. In one aspect, the secure sealed storage section 190EV is spread across multiple of the server nodes SN1-SNn to include at least a minimum deterministic number within the multiple server nodes SN1-SNn so as to effect functions of the secure sealed storage section 101EV.

In one aspect, at least one of the multiple function modules of the IoT platform engine 101 defines a centralized service discovery and monitoring function 1975. The centralized service discovery and monitoring function module 1975 may be spread across multiple of the server nodes SN1-SNn to include at least a minimum deterministic number within the multiple server nodes SN1-Snn so as to effect the centralized service discovery and monitoring function of the centralized service discovery and monitoring function module 1975. In one aspect, the first set of server nodes SN1-SNn created in an engine cluster 101CL may be the centralized service discovery and monitoring function module 1975 which may be located at a geographically remote location from other server nodes SN1-SNn for fault tolerance.

As described above, the secured sealed storage 101EV section being configured to manage and enable access to user rights including authorization to initialize the provisioning engine module 1960 so as to effect secure elastic provisioning selection of the number of server nodes SN1-SNn on which the platform engine 101 is disposed. In one aspect, the IoT platform system 100 may determine required server node SN1-SNn services (FIG. 21, Block 2140) in any suitable manner. Installation scripts foe the various services that can be installed on the server nodes SN1-SNn may be written on developer machines and committed to any suitable code repository. In one aspect, there are scripts corresponding to each service in the IoT platform system 100 where services are delivered to the server nodes SN1-Snn based on which services are determined/allocated to that server node NS1-SNn. Server node SN1-SNn services may be initialized (FIG. 21, Block 2145) as needed depending on, e.g., the required server node SN1-SNn services. The centralized service discovery and monitoring function 1975 is configured so as to register run initiation of each platform engine services on newly provisioned server nodes SN1-SNn as populated with the provisioning module 1960. For example, the services may report to the centralized service discovery and monitoring function 1975 that the services are running on a respective server node SN1-SNn. This may provide for tracking, with the centralized service discovery and monitoring function 1975, which services are running on which server nodes SN1-SNn and enable other parts of the IoT platform system 100 to discover the location of the services. The centralized service discovery and monitoring function 1975 may periodically check whether the services are running on their assigned server nodes SN1-SNn so that any change in status of the services is known by the centralized service discovery and monitoring function 1975.

In one aspect, the provisioning engine module 1960 is configured so as to effect, provisioning selection of the number of server nodes SN1-SNn being provisioned so as to become populated with the platform engine 101, selection of a network topology for the number of selected provisioned server nodes SN1-SNn, and selection of services from predetermined services of the platform engine 101 so as to start the selected services on each of the selected server nodes SN1-SNn being provisioned. In one aspect, the provisioning engine module 1960 is configured so that selection and set up of the selected services on each of the selected server nodes SN1-SNn being provisioned is specified with but one configuration file and selection input to but one provisioning script fed to the provisioning engine module 1960 effecting substantially automatic setup of each the selected server nodes SN1-SNn. For example, the number of server nodes SN1-SNn to be created, their topology, and which services to start on each server node SN1-SNn can be specified in the but one provisioning script. A configuration file may reside in any suitable code repository of the IoT platform system 100. Developers may pull the configuration file to their machines and feed the configuration file to the provisioning script, which also may reside in the code repository. This provisioning script uses the configuration file to decide which server nodes SN1-SNn to create and which services to install on the created server nodes SN1-SNn.

The platform engine 101 server node SN1-SNn capacity may be monitored in any suitable manner (FIG. 21, Block 2150) where the platform engine 101 server node SN1-SNn capacity is automatically managed (FIG. 21, Block 2155). This high degree of automation enables the IoT platform system 100 to grow or reduce platform engine 101 capacity within a short time period (e.g., within about three minutes or in other aspects, more or less than about three minutes) and also enables the assignment of subsections of the IoT platform system 100 network to subsections of the platform engine 101, which enables engine capacity planning in a linearly scalable manner. For example, the number of IoT edge devices 120 connecting to a subsection of the IoT platform system 100 network may be predictable at installation time. When a new network installation (e.g., an edge device) is added, a new set of server nodes SN1-SNn may be created to handle the device data from that new location. When a heavy data load is expected from users of, e.g., the IoT edge devices 120 due to an external event, new platform engine 101 capacity can be provisioned rapidly to cater to an unplanned demand.

In one aspect, one of the first services that are started on a new server node SN1-SNn are one or more services that expose a default portal 1999 of the platform engine 101. The default portal 1999 has a fixed address and one or more of the IoT platform communication network nodes 110 connect to this default portal 1999 at startup of the IoT platform communication network nodes 110. The default portal 1999 may keep track of which IoT platform communication network nodes 110 MAC addresses are assigned to which subset of the server nodes SN1-SNn and can redirect the IoT platform communication network nodes 110 to a new portal in that subset of server nodes SN1-SNn.

Figure 17:
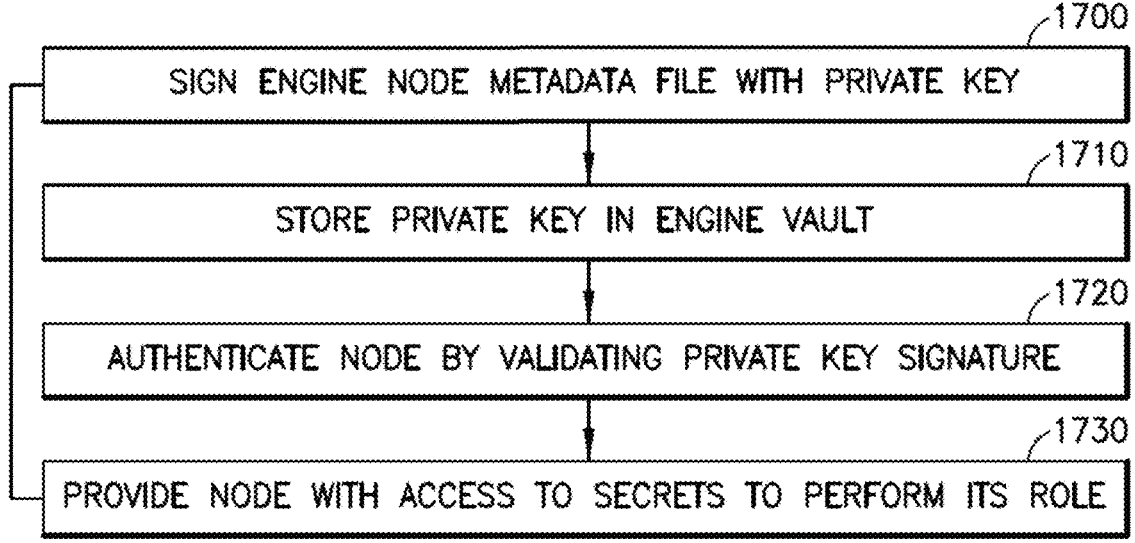
FIG. 17 is a flow diagram in accordance with aspects of the present disclosure.

In one aspect, at setup, each respective one of the selected server nodes SN1-SNn metadata file 101MD is signed with a private key PVK (FIG. 17, Block 1700) that uniquely corresponds to the respective one of the selected server nodes SN1-SNn. The private key PVK corresponds to the respective selected server node SN1-SNn and is sealed in the secure sealed storage section 101EV (FIG. 17, Block 1710). The private key PVK is authenticated by the secure sealed storage section 101EV on receipt of the signature at set up of the respective selected server node SN1-SNn (FIG. 17, Block 1720). For example, new and/or additional platform engine 101 server nodes SN1-SNn may be authenticated/ authorized using the metadata file 101MD of the platform engine 101 server node SN1-SNn. The platform engine 101 server node SN1-SNn may also be assigned privileges in engine vault 101EV access control lists. The platform engine 101 server node SN1-SNn may authenticate itself with the engine vault 101EV by validating the metadata file 101MD (e.g., the metadata in the metadata file 101MD is validated to check whether the metadata is the same as it was when the metadata file was signed by a provisioning script, the metadata is unique to each platform engine 101 server node SN1-SNn). Once authenticated, the platform engine 101 server node SN1-SNn is provided with any suitable keys for performing aspects of the present disclosure as described herein (FIG. 17, Block 1730).

Figure 18:
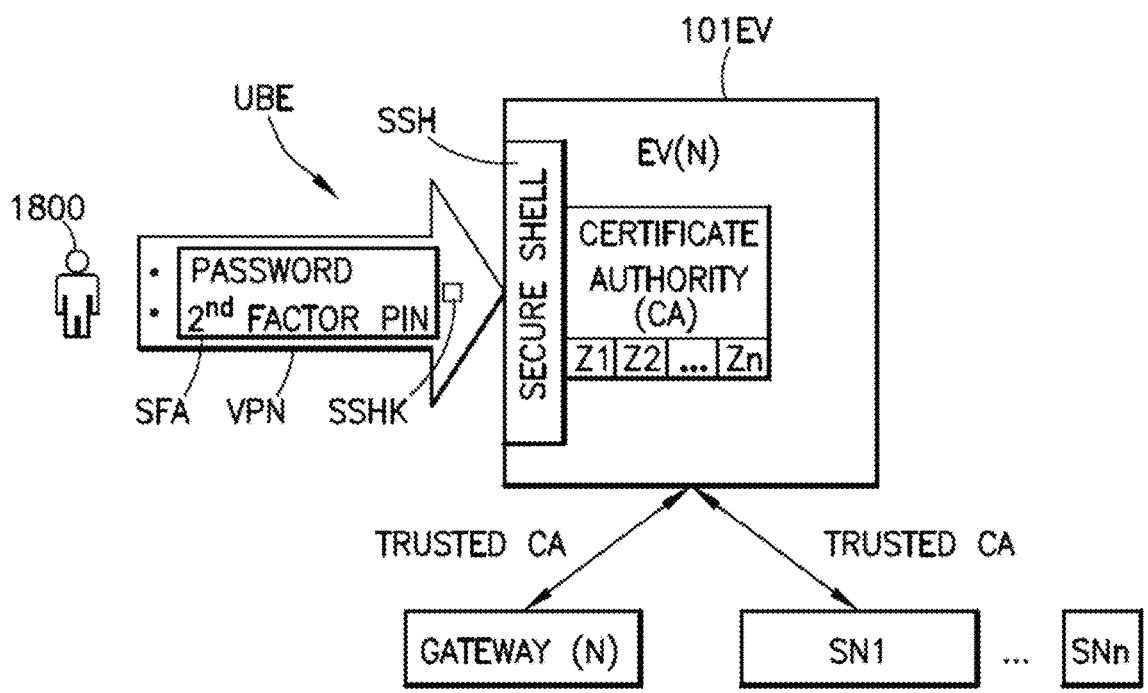
FIG. 18 is a schematic illustration of a portion of an IoT platform system in accordance with aspects of the present disclosure.
Figure 19:
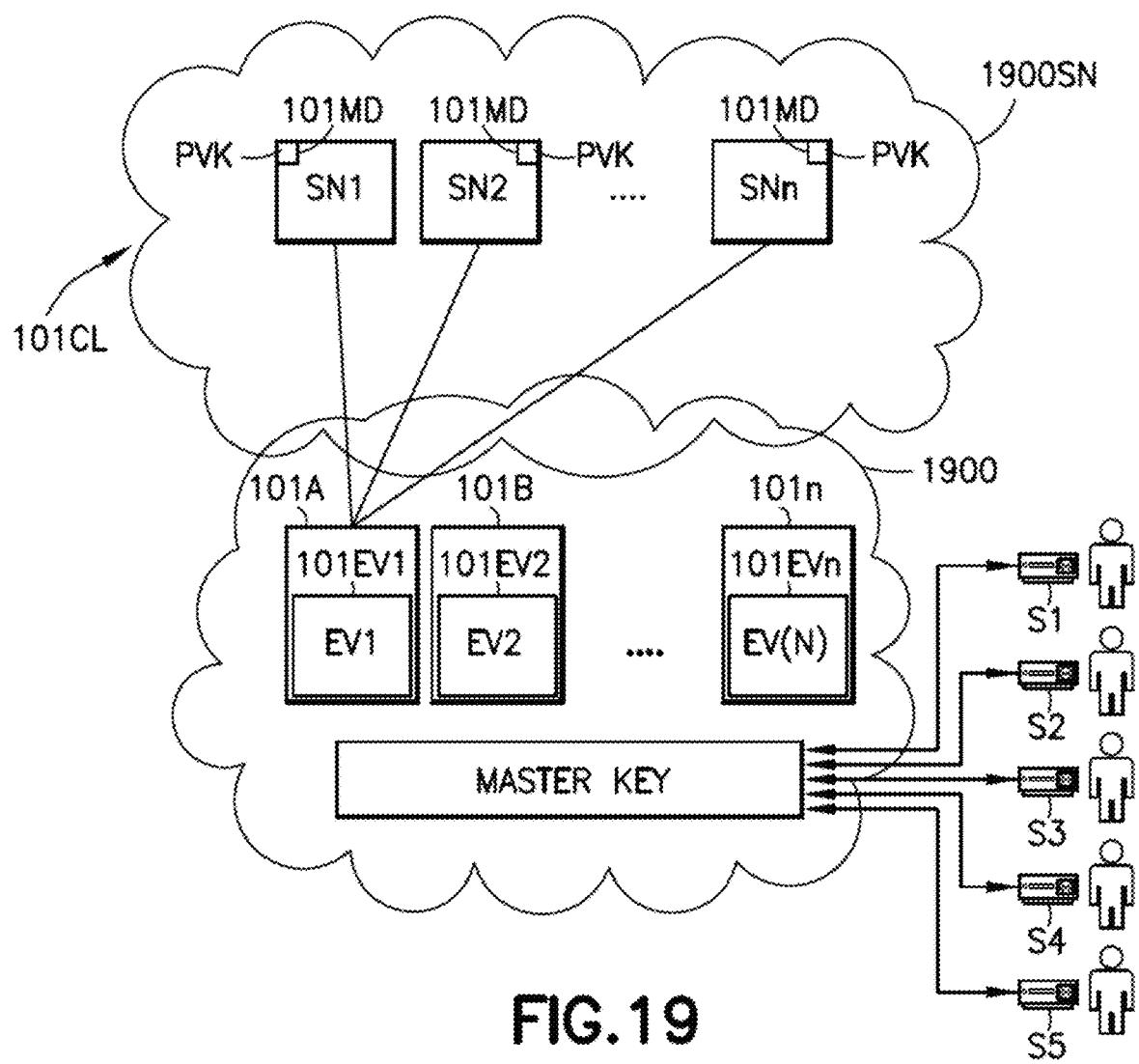
FIG. 19 is a schematic illustration of a portion of an IoT platform system in accordance with aspects of the present disclosure.

Referring also to FIG. 18, in one aspect, human access to the server nodes SN1-SNn is only provided to authorized personnel where every access to the server nodes SN1-SNn is logged for auditing. A user 1800 seeking access to the server nodes SN1-SNn over a secure shell (SSH) on a VPN, authenticates with the engine vault 101EV through a user/ pass backend UBE and a second factor authentication SFA. Here the engine vault 101EV operates as a certificate authority CA. The server nodes SN1-SNn are configured to trust the engine vault 101EV as a trusted certification authority CA at setup of the server nodes SN1-SNn. The user 1800 seeking access to the server nodes SN1-SNn can generate a new SSH key pair SSHK and request the engine vault 101EV to sign the SSH key pair SSHK. Any SSH key pair SSHK signed by the engine vault 101EV can access any server node SN1-SNn that trusts the engine vault 101EV. In one aspect, the engine vault 101EV may be configured with multiple certificate authority zones Z1-Zn to control which server nodes SN1-SNn are accessed by the user 1800. In one aspect the SSH access sessions are of short duration and script on each server node SN1-SNn terminates all SSH sessions longer than about 10 minutes (in other aspects the SSH sessions maybe longer or shorter in duration than about 10 minutes). SSH access as root may be limited to the administrators ADM1-ADM5. Regular users may log in to the server nodes SN1-SNn with SSH access for diagnostics but may not gain root access privileges.

Referring to FIGS. 2A and 2B, as described above, IoT platform system 100 is a comprehensive, modern, framework that spans from low-power wireless edge devices to cloud servers and enables rapid development, reliable operation and granular control of systems that serve a variety of industrial IoT use cases. The platform engine 101 is an elastic and cloud built device for distributed stream processing, device lifecycle management, efficient storage/querying of large-scale device data and real-time collaboration among devices. The platform engine 101 provides highly customizable, machine learning empowered, real-time device actors with streaming decision pipelines to help integrate physical devices into, for example, enterprise business processes. The platform engine 101 also provides modern RESTful and Streaming Application Programming Interfaces (APIs) along with pluggable enterprise integration modules to enable powerful integration between enterprise systems and connected devices.

As described above, referring to FIGS. 2A, 2B, and 19, the Platform engine 101 runs on a cluster (group) of multiple server machines SN1-SNn. These machines SN1-SNn can be provisioned in any cloud Infrastructure-As-A-Service platform such as, for example, Amazon EC2®, Google® Compute Engine, Microsoft Azure® etc. or in a private datacenter with private clouds based on, for example, Qpen-Stack®, VMWare vSphere® etc. The platform engine 101 (which includes one or more of the server machines SN1-SNn) may also be provisioned directly on server machines in a data center if an Infrastructure-As-A-Service is not available. The platform engine 101 includes a platform engine infrastructure layer that provides a consistent programming interface, across the various supported underlying infrastructure, to provision new server machines SN1-SNn, configure network connectivity between these server machines SN1-SNn, configure storage and query the state of existing available/provisioned infrastructure. The platform engine infrastructure layer also provides centralized role assignment, logging, health, checks and monitoring of all the server machines SN1-SNn in platform engine 101 cluster. In one aspect, the platform engine infrastructure layer uses the distributed storage 1970 layer to store the above-described information.

As an example, the platform engine 101 stores and enables timely access of multiple types of data that is generated during the operation of a complex network of IoT devices and servers that are supporting the functions of these IoT devices. The platform engine 101 provisions a distributed storage 1970 layer that is highly optimized for reliability of storage and speed of common access patterns. The distributed storage 1970 layer may be spread across multiple machines for redundant reliable storage, high availability of data, parallel processing and horizontal scalability of the applications running on the IoT platform system 100. In one aspect, the distributed storage 1970 layer includes a distributed file system 1971, a graph storage 1972, the metadata (key-value) storage 101MD, the engine vault 101EV, and an engine monitoring database 1975. An exemplary graphical representation of the distributed storage 1970 layer is illustrated in FIG. 22.

The distributed file system 1971 is configured to store multiple geographically redundant copies of large files, such as system logs. The distributed file system 1971 is also configured as a backing store for the data stored in other parts of the storage layer, such as the graph storage 1972 and the metadata (key-value) storage 101MD.

The Devices in an IoT system report about the state of various business assets. For example a parking sensor may report of the state of a parking space. The relationship between devices and the assets that they report about is modeled as an asset knowledge graph. The graph storage 1972 layer is configured to store this graph reliably and efficiently and enables rapid querying and traversal of this graph.

The metadata (key-value) storage 101MD is configured to store system state and metadata and comprises a large scale, highly fault tolerant, key-value database that is backed by a distributed file system. This database favors highly consistent storage in failure scenarios to ensure that write operations are reliable and permanent. A write is rejected if it is not confirmed by at least a majority of storage servers. Once a write is confirmed, it is permanent and the index of the write is fixed and unique forever. Read operations can be done in parallel on any of the replicas.

The engine vault 101EV is configured to store several encryption keys and certificates (as described herein) (referred to herein as secrets) that to ensure security of the system. The engine vault 101EV is configured to keep these secrets encrypted and decrypts them only when needed and only in memory. The secrets are never written in unencrypted form to disk. The engine vault 101EV enables safe multifactor user authentication and a granular permissions based authorization system that ensures that users and machines only get access to data that they have the permission for. As described herein, the engine vault 101EV is configured to dynamically generate temporary secrets and implement a leasing mechanism that associates a lease with every secret that it issues to a user/machine. This dynamic secret generation and leasing ensures that secrets, if compromised, are not compromised forever and improves overall security. As also described herein, the engine vault 101EV is also a certification authority (CA) and can generate certificates that are used for authenticating gateways and servers. The engine vault 101EV is configured to store device sessions keys that are used for authentication and encrypting/decrypting data to/from, for example, the IoT edge devices 120.

The engine monitor database 1975 is configured to store the roles and services assigned to each server machine SN1-SNn. The engine monitor database 1975 is also configured to store health data about each server machine SN1-SNn and helps the Engine Infrastructure layer monitor the health of all server machines SN1-SNn s in the platform engine 101 cluster.

The engine core 101EC is configured to implement the core set of services needed for platform engine's 101 operation. These services include user management, authentication and authorization. These services may rely on data stored in the engine vault 101EV to authenticate and check if they have permissions to access a resource. The engine core 101EC is also configured to provide a programming interface for other parts of the IoT platform system 100 to communicate with the various storage systems. In addition, the engine core 101EC is configured to provide a way to create, run and destroy lightweight parallel actor processes that are used to represent each physical asset in the engine. This enables various asset actors to communicate and send messages to each other in real time. The engine core 101EC is configured to restart actors if they fail and can redistribute them over to a different server if a particular server is experiencing too much load. The live state of the actors is stored in the asset knowledge graph backed by the distributed graph storage 1972 and metadata storage 101MD.

Figure 23:
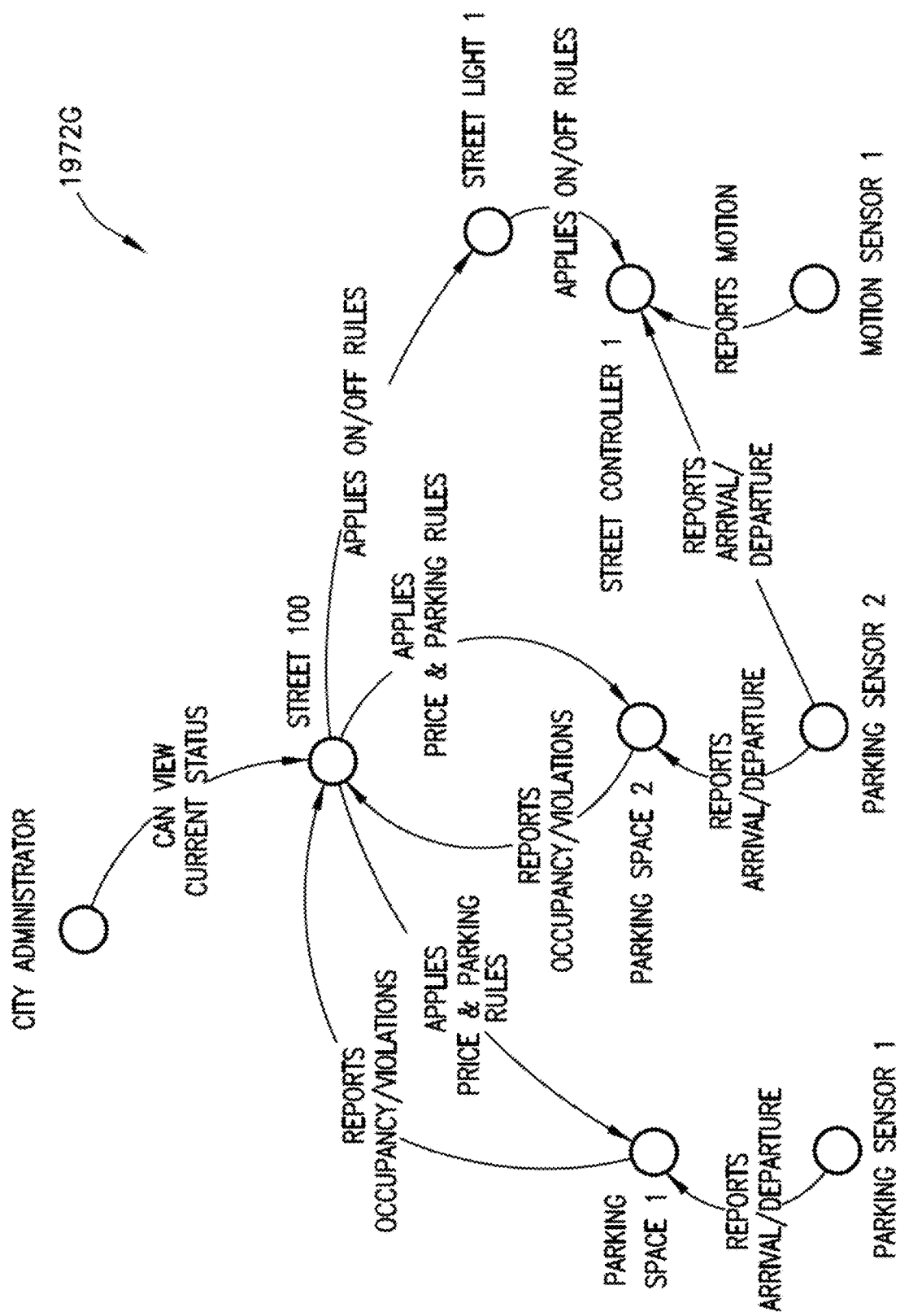
FIG. 23 is an exemplary illustration of an asset graph in accordance with aspects of the present disclosure.
Figure 24:
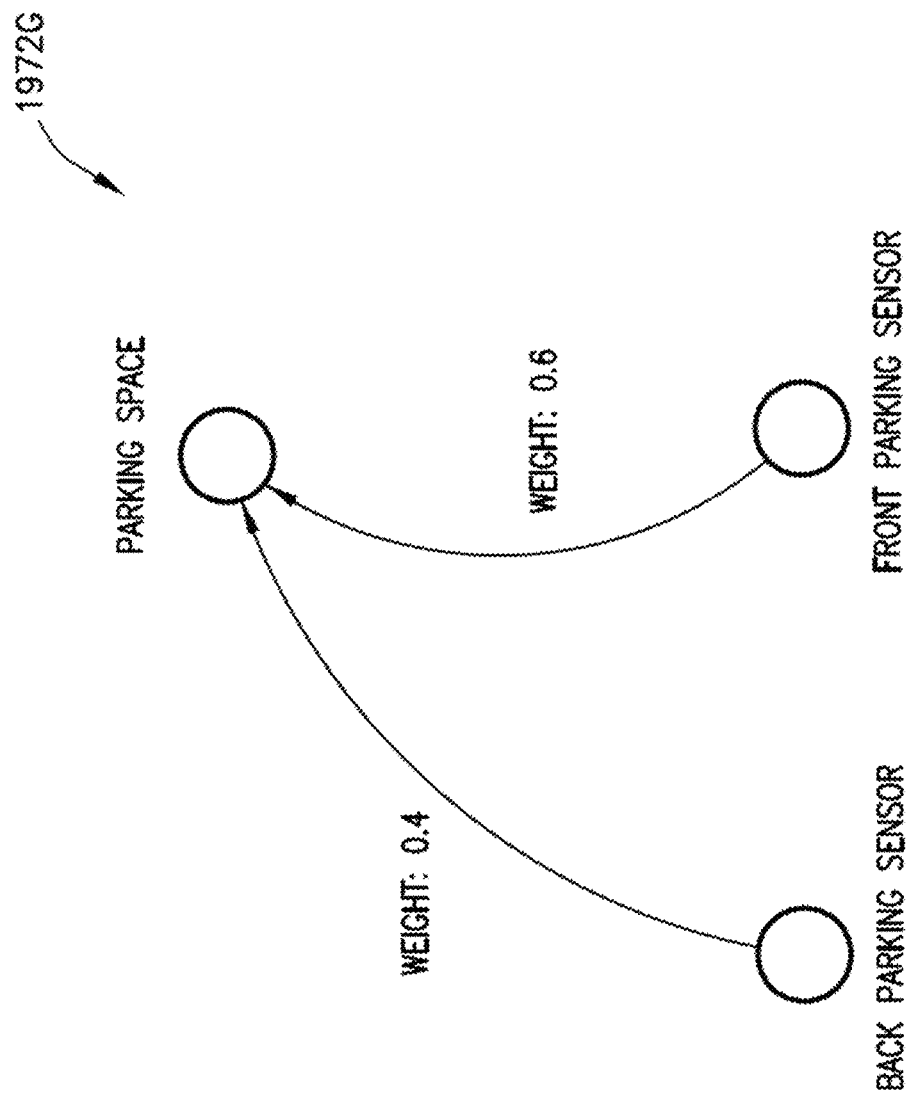
FIG. 24 is an exemplary illustration of an asset graph in accordance with aspects of the present disclosure.

The asset, knowledge graph 1972G is a data structure of the platform engine 101 which is stored in the distributed graph storage 1972 which can store hundreds of billions of vertices and edges distributed across a cluster of machines. Inside the platform engine 101, IoT edge devices 120, network nodes 110, Server Machines SN1-SNn, Users, Businesses Business Assets, etc. are all modeled as "Assets", All of these entities are considered Assets, in general. All Assets are stored as vertices in a data structure called the asset knowledge graph 1972G. Exemplary asset knowledge graphs are illustrated in FIGS. 23 and 24. Relationships between assets are stored as edges that connect the corresponding asset vertices. Both vertices and edges can store properties. Vertices store one or more properties/attributes of the asset whereas edges store one or more properties/attributes of the relationship between two assets. An edge between two assets can be unidirectional or bidirectional depending on the relationship between the assets. New edges can be established as the Engine learns more information about various assets in the graph. This new information can come from user input or from machine learning algorithms that may learn about relationships between assets by looking at historical data from the assets. For example, as illustrated in FIG. 24, in a truck parking space that may need two parking sensors since trucks tend to vary in length, it may be learned overtime, a weight for the contribution of each sensor towards deciding the final occupancy of that parking space. This weight can be stored as a property of the edge between each sensor and the parking space.

In one aspect, assets can be animated into extremely lightweight running processes inside the platform engine 101. These processes can send each other messages and collaborate with each other to make decisions. For example, actors representing IoT Parking Sensors (e.g., IoT edge devices) on a particular street may send messages to other IoT parking sensor actors on that street every time they see a significant magnetic event. This allows IoT parking sensors to improve their accuracy by negating events that seem like a parking event from one IoT parking sensor's perspective but are actually something else like a subway train passing from underneath the street.

The asset knowledge graph 1972G layer of the platform engine 101 manages the lifecycle of these actor processes and enables messaging between the actors using a layer 173L of the communications module 173, The asset knowledge graph 1972G layer is also configured to recover and restart actors in case of failures. The Asset Graph 1972G also provides a querying interface to query and traverse the graph 1972G to find vertices based on give parameters.

The layer 173L enables and manages the flow of data throughout the IoT platform system 100. The layer 173L is configured to implement a "stream". Streams enable data producers to reliably publish data and get a guarantee of at least once delivery of the message to consumers of that stream. When data is published to a stream it is written to a distributed append-only log using a consensus algorithm, this decides the index of that message in the stream and provides permanent ordering of messages. Streams also enable a subscriptions mechanism allowing online consumers that are immediately notified when a new message arrives in a stream. Offline batch consumers are also supported, streams reliably store the last consumed index of each registered consumer allowing that consumer to return at any time and continue from where it left off. Streams are used in the platform engine 101 and the rest of IoT platform system 100 to create a reliable ordering, decouple producers from consumers, reliable routing of messages and to provide message delivery guarantees. The layer 173L also provides portals that allow messages to flow between server machines SN1-SNn, network nodes 110 and external systems.

Network nodes 110 connect with the platform engine 101 through the Portal 1999 over a TCP connection. The portal 1999 is configured to provide a TCP/TLS server and a device registration service that enables any IoT edge device 120 or any network node 110 to authenticate using a specially crafted challenge/response algorithm and register with the platform engine 101. Once an IoT device 110, 120 is successfully registered, a shared session key has been successfully established between the IoT device 110, 120 and the platform engine 101. The platform engine 101 may start an asset actor to represent the IoT device 110, 120 inside the platform engine 101. The asset actor ensures that all known attributes and relationships of the IoT device 110, 120 are represented in the underlying asset knowledge graph 1972G. As data starts flowing from the TCP server endpoint that network nodes 110 are connected to, the data is routed to a stream, network input, that may permanently (or in other aspects, temporarily) store all incoming messages from network nodes 110 and establishes the permanent order of messages from the platform engine's 101 perspective. Once the message is stored to this stream, a MAC (Media Access Controller) based message router looks at every incoming message and sends the message to the corresponding actor responsible for the device that has that MAC address. MAC addresses are unique within the IoT platform system 100. Once the message is delivered to the device asset actor, the message can be decrypted using the pre-established shared session keys. Device asset actors can also encrypt and deliver messages back to their corresponding physical devices by writing to the network output, stream. This stream may establish an order of all outgoing messages to the IoT platform system 100 from the platform engine 101. The device asset actors manage a lifecycle of the respective IoT device 110, 120, implement detection algorithm, enable configuration, enable delivery of firmware updates and continuously track the state of the respective IoT device 110, 120 in the physical world based on the messages the IoT device 110, 120 is sending. The device asset actors become a proxy for the physical IoT device 110, 120 and can report the last known state of IoT device 110, 120 even when the IoT device 110, 120 may not be actively communicating.

The platform engine 101 may also provide support for communication with other IoT device networks, apart from the IoT platform system 100, via open protocols like MQTT. The platform engine 101 may also support real time integration with external enterprise services. This real time integration with external enterprise services may be enabled with reusable portals (which may or may not be the same as portals 1999) generated by the layer 173L for communication protocols such as MQTT and CoAP along with custom integration portals that are implemented specifically for a certain enterprise system. This layer of the platform engine 101 supports representing external business assets and their attributes inside the asset knowledge graph 1972G and also creation of asset actors for these external business assets. For example, a city management system may provide the platform engine with data about city assets like a parking space (e.g., the location of the space, the hourly price for that space, parking rules for that space, etc.). This parking space information is stored as attributes on that parking space asset in the asset know-ledge graph 1792G. The city management system may also provide data about relationship between assets for example, this parking space is on this street. These relationships are also stored inside the asset knowledge graph 1972G. External systems may also chose to subscribe to the state of a specific asset, for example if the state of parking space or the state of street light. If the actor representing a streetlight predicts that a streetlight is about to fail it will immediately notify the external city system which can then trigger a maintenance process.

The insight module/engine 174 layer of the platform engine 101 provides batch and stream analytics on device and other asset data. The insight module/engine 174 layer enables parallel and horizontally scalable processing of the asset data for predictable latency even as the data keeps growing. The insight module/engine 174 layer uses various analytical and machine learning algorithms to derive summary statistics, detect interesting or anomalous events, predict failures, learn decision models and more. Some examples of algorithms that are implemented inside the platform engine 101 include predicting how long a parking space will stay occupied/unoccupied, recommend ideal parking space based on user preferences and historical availability data, predict street light failure, classifying suspicious security event based on device logs, and classifying magnetic shadow from neighboring truck parking space or a real truck parking event.

The virtual machine 181 layer of the platform engine 101 (see also the virtual machines 154, 160) and the overall IoT platform system 100 provides a way to on-the-fly customize and iterate the business logic operating on top of a network of connected devices. The virtual machine 181 layer provides a Domain Specific Programming Language (DSL) and a user interface to input new business rules, business logic and data flow logic that can decide the state of an asset based on information coming from other assets like IoT devices. The virtual machine 181 layer is configured to intelligently decide which parts of the provided business logic can be pushed to the physical IoT device to conserve battery and improve decision latency. Once the virtual machine 181 layer has decided which parts will run on the device and which parts will be run in the platform engine 101 by the device asset actor, the virtual machine 181 layer can dynamically compile new firmware and virtual machine bytecode to be delivered to IoT devices using a firmware compilation pipeline of the virtual machine 181 layer. This updated firmware and bytecode can then be delivered to the corresponding Assets Actors in the portal 1999 which then triggers an over the air upgrade of the IoT devices.

The platform Engine 101 provides a streaming application programming interface (API) and an HTTP API for external system and IoT platform system 100 applications to interact with the platform engine 101. Applications can create assets, modify assets, find assets based on the graph 1972G queries, subscribe to the state of one or more assets and more. The Iot platform system 100 application framework is a set of wrapper libraries that make it easy to interact with the IoT platform system 100 API and build applications.

The insights module engine 174 may provide a graphical tool to rapidly build data visualization dashboards based on sensor and other asset data. The graphical tool may enable easy visualization of both real time data and also enables complex querying of historical asset data. The IoT platform system 100 may also include a developer kit which includes a set of graphical user interface and hardware tools that allow easily prototyping of at least new IoT edge devices 120.

Referring to FIGS. 2A and 2B, an exemplary dataflow in the IoT platform system 100 will be described. Layer 173L enables the flow of data throughout the IoT platform system

100. Layer 173L is a distributed layer in the IoT platform system 100 that works across IoT edge devices 120, network nodes 110, platform engine 101 and user interface applications built using the IoT platform system 100. Layer 173L is made of Actors running on Nodes (e.g., server machines SN1-SNn). Each Mode is uniquely identified by: node_id, node_id is 8-byte long binary number, unique per node. 6-byte addresses of hardware are represented as 8-bytes with two leading zero bytes, ex: 0x0000AAAAAAAAAAAA. Each Actor is uniquely identified by: {node_id, actor_id}. The actor_id can be anything the node (which has that actor) can locally route to and globally identify. Layer 173L is implemented, inside the Virtual Machine in IoT devices, using, for example, the C programming language and assembly language (CHASM). Layer 173L is also implemented, inside network nodes 110, using for example, the C programming language and Erlang/Elixir. Layer 173L may also be implemented, inside platform engine 101, using for example, the C programming language, Erlang/Elixir and Ruby. Layer 173L may further be implemented, inside IoT platform system 100 user interface applications using, for example. Javascript. Layer 173L is designed so that it can be implemented in any other suitable runtime environments. Each node of the IoT platform system gets one layer_manager actor.

A layer 173L manager may be started inside Erlang/Elixir Runtime on network nodes 110 and the platform engine 101. For example, when the Layer 173L erlang/elixir application is started on a server machine SN1-SNn in the platform engine 101, a layer_manager erlang process is started on that server machine SN1-SNn. This process keeps track of all streams and portals that will be started on this server machine SN1-SNn.

The layer 173L manager may also be started inside Java Runtime in the platform engine 101 and on Android™ devices. For example, when the Layer 173L JRuby application is started inside the Java runtime, a Celluloid layer_manager process is started on that machine. This process keeps track of all streams and portals that will be started on this machine.

The layer 173L manager may also be started inside a virtual machine (VM) 154, 160, 181. When Layer 173L is enabled for an IoT device 110, 120 (and also for the platform engine 101) that is running a virtual machine 154, 160, 181, a layer_manager routine is inserted in the VM byte code program and delivered as part of a byte code update patch to this IoT device 101, 110, 120. This routine tracks all streams and portals that are active on this IoT device 110, 120 (and/or platform engine 101).

The layer 173L manager may also be started inside JavaScript Runtimes in Web Browsers, Web based mobile applications, NodeJS or Rhino. For example, when Layer 173L is started inside a javascript runtime, a layer_manager webworker process is started on the IoT machine/device. This process keeps track of all streams and portals that will be started on this machine, IoT devices/machines running Layer 173L can connect with other machines running Layer 173L via Layer 173L portals. Layer 173L portals may be a specific type of actor. Layer 173L portals include, but are not limited to TCP/TLS Portals, WebSocket Portals, HTTP Portals, Radio Portals, Java node Portals, SSH Portals, and Radio Portals. The layer 173L portals may be set to be bi-directional (if they support both in-bound and out-bound data) or uni-directional in the flow of data they support.

Data in Layer 173L move around as messages and are managed by Layer 173L Streams. A stream can store messages and metadata. A stream can be created on a local machine by calling Layer . create (stream_id, options). A stream can be created on a remote machine by calling Layer . create ({node_id, stream_id}, options). A producer of messages can publish messages to a local stream by calling Layer . publish (stream_id, message) or on a remote machine by calling Layer . publish ({node_id, stream_id}, message) when a message is written to a stream it is assigned an index on the stream. The stream maintains last_written_index as a key in the stream metadata, this is the index of the last written messages to the stream.

A consumer of messages can register to a local stream by calling Layer .register_consumer(stream_id, consumer_id, options) or a remote stream by calling Layer .register_consumer({node_id, stream_id}, consumer_id, options). It is desired for consumers to register to a stream with an id unique within the group of consumers registered to a particular stream. Typically {node_id, consumer_id} where consumer_id is the id of an actor on the node. The location may be unimportant and a consumer with a specific name can crash on a specific machine and come up somewhere else. Consumers can be either ONLINE or OFFLINE. This can be specified in options with mode option. An online consumer gets immediately sent all the messages that arrive in the stream. Offline consumers are sent messages only when they mark a message as consumed. If an offline consumer marks message with index 10 as consumed, and the last_written_index of the stream is greater than 10, then message with index 11 is sent to the consumer. It is desired for consumers to mark messages as consumed when they are done consuming them. A message is marked consumed on a local stream with Layer .set_consumed(stream_id, consumer_id, index) and on a remote stream as Layer set_consumed ({node_id, stream_id}, consumer_id, index). The stream maintains a last_consumed_index for each consumer that is registered with the stream. The stream maintains a truncated tail list for each consumer to track which messages have already been consumed. Since ONLINE consumers may consume pushed messages at different speeds and are free to parallelize the consumption of messages the truncated tail list helps in tracking what has been consumed while still keeping memory use low. Any contiguous regions at the tail of the list are truncated.

In one aspect, messages are pushed to consumers by the streams. Online consumers must consume messages at a rate comparable to rate of arrival. Consumers which take more time must be made offline. Messages are pushed to offline consumers only when an acknowledgment is received for the previous message. This helps with rate limiting and throttling. Batch processing consumers can process messages by directly talking off-band to the underlying storage of the stream and updating their last_consumed_index in the stream when done. A consumer can process all messages b/w last_consumed_index and last_written_index Metadata can be stored on the stream as pairs of keys and values. A metadata key value pair can be written to a stream by calling Layer . set(stream_id, {key, value}) or on a remote stream as Layer . set({node_id, stream_id}, {key, value}). A metadata value can be read from stream by calling Layer .get (stream_id, key) or on a remote stream as Layer . set({node_id, stream_id}, key). This metadata enables transient consumers that may not wish to maintain their own storage and rely on the stream for their storage needs.

Streams are fully identified by the pair {node_id, stream_id} this is the address of the stream. These identified streams are mapped to process identities or routine identifiers based on the runtime on which Layer 173L is running.

Layer 173L Portals create connections between Layer 173L managers. The exact route to a stream or consumer can be discovered by asking the local Layer 173L manager, which may respond with a function to invoke to route messages to the stream or consumer. For example, is node_id provided? if not, route locally to destination actor_id Is node, with node_id internal? if so, route locally to destination actor_id If node_id is external route to portal to this external node when message reaches external node, route locally to destination actor_id Data (messages and metadata) written to a stream can be stored to various storage backends, including but not limited to, HBase storage backend (stores data in Apache HBase), In-Memory storage backend (stores data in memory), and Coracle storage backend (this is an implementation of the RAFT consensus protocol). Using Coracle from Layer 173L streams allows for multiple processes representing on stream that are running on multiple different machines. A message is considered written to a stream only when it has been confirmed written to a majority of stream processes. This allows for streams that are able to scale by parallelization and can still be resilient to failures because only a majority number of processes have to available for operation to continue even during failure conditions.

Authentication, may be enabled on a stream using multiple authentication mechanisms. If authentication is enabled, a client (producer or consumer) process must provide an authentication token with every request to the stream or to the manager, if the token is valid the operation succeeds, if the token is not valid the stream responds with an authentication error. The process that created the stream can also authorize specific processes (or routines) for specific operations. If a process is not authorized for a specific operation, the operation fails. In one aspect, by default, the process that created the stream or the manager is allowed to authorize other processes. A consumer is only allowed to set its own last_consumed_index. process that created the stream can approve or deny new consumers and producers. In one aspect, a list of allowed datatypes can be associated with a stream. For example, Layer . create(stream_id, types: [Float]). Complex types are specified as a combination of the basic types supported by a runtime, for example: Layer . create(stream_id, types: [MagReading])

"'elixir defmodule MagReading do use Layer.Type
attribute : x, Float
attribute : y, Float
end"'

A stream may reject any messages that are not valid for the types associated with the stream. HTTP or WebSocket or TCP API may be enabled for any stream. This creates a uniform interface for streams across various communication channels. The APIs are implemented as Layer 173L Portals.

In accordance with one or more aspects of the disclosed embodiment, an Internet of things (IoT) system including a distributed system of virtual machines, the IoT system comprises:

at least one IoT platform system control engine, each of the at least one IoT platform system control engine includes a IoT platform system control engine secure system space and a IoT platform system control engine user defined space;

at least one IoT network node device communicable with the at least one IoT platform system control engine through a network, each of the at least one IoT network node device includes a IoT network node device secure system space and an IoT network node device user defined space;

at least one IoT edge device communicable with the at least one IoT network node device and the ta least one IoT platform system control engine through the network, each of the at least one IoT edge device includes an edge device secure system space and an edge device user defined space;

wherein the IoT platform system control engine secure system space, the IoT network node device secure system space, and the edge device secure system space are each configured to be secured to prevent unauthorized access; and wherein, the IoT platform system control engine user defined space, the IoT network node device user defined space and the edge device user defined space each define a respective virtual machine configured to receive and execute user defined instructions to form the distributed system of virtual machines.

In accordance with one or more aspects of the disclosed embodiment, the IoT platform system control engine secure system space, and the edge device secure system space are each, respectively, configured to control communication over the network between the at least one IoT platform system control engine, the at least one IoT network node device, and the at least one IoT edge device.

In accordance with one or more aspects of the disclosed embodiment, the IoT platform system control engine secure system space, IoT network node device secure system space, and the edge device secure system space each include an integrated communication control module to control communication over the network.

In accordance with one or more aspects of the disclosed embodiment, the edge device secure system space is configured to define an interface between an application layer of the IoT edge device and a drive layer of the at least one IoT edge device.

In accordance with one or more aspects of the disclosed embodiment, the virtual machine of the at least one edge device is configured to configure the application layer of the at least one IoT edge device to interface with a predetermined sensor type.

In accordance with one or more aspects of the disclosed embodiment, the virtual machine of the at least one IoT platform system control engine is configured to receive user defined instructions.

In accordance with one or more aspects of the disclosed embodiment, the virtual machine of the at least one IoT platform system control engine is configured to propagate user defined instructions to the respective virtual machines of the IoT network node device and the IoT edge device.

In accordance with one or more aspects of the disclosed embodiment, the IoT edge device is configured to interface with diverse sensor inputs and diverse outputs through the virtual machine of the IoT edge device.

In accordance with one or more aspects of the disclosed embodiment, the virtual machine of the IoT edge device is configured to customize the functionality of the diverse sensor inputs and diverse outputs.

In accordance with one or more aspects of the disclosed embodiment, the respective virtual machine of the at least one IoT platform system control engine, the at least one IoT network node device, and the at least one IoT edge device is configurable with a scripting language interface.

In accordance with one or more aspects of the disclosed embodiment, the respective virtual machine of the at least one IoT platform system control engine, the at least one IoT network node device, and the at least one IoT edge device is configurable with a visual configuration interface.

In accordance with one or more aspects of the disclosed embodiment, the virtual machine of the at least one edge device is configured to configure an application layer of the at least one edge device for a predetermined sensor type.

In accordance with one or more aspects of the disclosed embodiment, the IoT platform system control engine includes an integrated communications control module.

In accordance with one or more aspects of the disclosed embodiment, the respective virtual machine of the at least one IoT platform system control engine, the at least one network node device, and the at least one IoT edge device are configured to execute a specific IoT task.

In accordance with one or more aspects of the disclosed embodiment, the respective virtual machine of the at least one IoT platform system control engine, the at least one IoT network node device, or the at least one IoT edge device are configured to execute portions of the specific IoT task, wherein the portions of the specific IoT task are distributed based on capacity and efficiency characteristics of the respective virtual machine of the at least one IoT platform system control engine, the at least one IoT network node device, or the at least one IoT edge device.

In accordance with one or more aspects of the disclosed embodiment, a method of operating an Internet of things (IoT) system including a distributed system of virtual machines, the method comprises:

providing at least one IoT platform system control engine having a IoT platform system control engine secure system space and a IoT platform system control engine user defined space;

providing at least one IoT network node device communicable with the at least one IoT platform system control engine through a network, the at least one IoT network node device having an IoT network node device secure system space and an IoT network node device user defined space;

providing at least one IoT edge device communicable with the at least one IoT network node device and the at least one IoT platform system control engine through the network, each of the at least one IoT edge device includes an edge device secure system space and an edge device user defined space;

configuring each of the IoT platform system control engine secure system space, the IoT network node device secure system space and the edge device secure system space to be secured to prevent unauthorized access;

defining a respective virtual machine in each of the IoT platform system control engine user defined space, the IoT network node device user defined space, and the edge device user de fined space; and forming with the a distributed system of virtual machines with each respective virtual machine receiving and executing user defined instructions.

In accordance with one or more aspects of the disclosed embodiment, an Internet of things (IoT) device link comprises:

a memory storage for storing program code;

a microcontroller for executing the program code, wherein the program code includes secure program code configured to be secured and prevent unauthorized access and user defined program code configured to execute user defined instructions;

a communication module and antenna configured to transmit and receive data to and from the IoT device link;

a cryptologic unit configured to encrypt and decrypt the data;

a power supply and management module and power storage unit configured to provide power to the IoT device link;

a real time clock configured to clock the microcontroller operations;

a MAC address module configured to provide a unique network address for the IoT device link; and wherein the microcontroller having an interface module configured to connect and control at least one input and output of an IoT device link sensor.

In accordance with one or more aspects of the disclosed embodiment, the interface module is common for the IoT device link sensor comprising weather, public safety, waste management, gas leak, sewer monitoring, water leak, parking access, smart parking, water quality, structural integrity, soil moisture, electronic emission, smart lighting, street safety, air quality, item location, water level or public health sensors.

In accordance with one or more aspects of the disclosed embodiment, the user defined program code configured to control the operation of the at least one input and output of the IoT device link sensor.

In accordance with one or more aspects of the disclosed embodiment, the IoT device link sensor senses a sensing characteristic and cryptologic unit encrypts the sensing characteristic before the communication module and antenna transmits the sensing characteristic.

In accordance with one or more aspects of the disclosed embodiment, an internet of things (IoT) network system comprises:

at least one network link card each of which is configured to respectively interface with a corresponding at least one of an IoT edge device and an IoT network node device, of an IoT platform system, so as to communicably link, via a wide area network each respective at least one IoT edge device and IoT network node device of the IoT platform system to an IoT platform system control engine;

an in-fabrication keying fixture configured so as to couple with and key onto each at least one network link card respectively at fabrication so as to form an encryption key set on, and uniquely corresponding to, each respective network link card at fabrication of each respective network link card; and an IoT edge device and IoT network node device registration and authentication manager controller coupled to the IoT platform system control engine, the registration and authentication manager controller being configured to respectively register and authenticate each at least one of the IoT edge device and the IoT network node device upon respective initialization and registration thereof, by the IoT platform system control engine, of each at least one of the IoT edge device and the IoT network node device within the IoT platform system based on a secure symmetric encryption key set to the at fabrication formed encryption key set of the corresponding link card of each at least one of the IoT edge device and IoT network node device so as to effect authenticated onboarding respectively of each at least one of the IoT edge device and IOT network node device to the IoT platform system.

In accordance with one or more aspects of the disclosed embodiment, authentication is effected upon and substantially coincident with registration by the IoT Edge device 120 and IoT network node device registration and authentication manager controller of device initialization within the IoT network system.

In accordance with one or more aspects of the disclosed embodiment, the encryption key set is disposed at least in a cryptologic unit of each at least one network link card at fabrication of each at least one network link card.

In accordance with one or more aspects of the disclosed embodiment, an Internet of things (IoT) platform system encryption key security system, the IoT platform system having IoT edge devices, IoT communication node devices and an IOT controller with an IoT platform engine, the encryption key security system securing encryption security between the IOT edge devices, IoT communication node devices and the IOT platform engine on the IoT controller, the IoT platform system encryption key security system comprises:

an encryption key generation processor disposed so as to key encryption key sets onto IoT edge devices and IoT communication node devices (at fabrication), the encryption key generation processor defining an IoT device encryption key generation end of the encryption key security system;

another encryption key generation processor disposed so, or communicably coupled so, as to provide encryption key generation input providing encryption key sets to the IoT platform engine, the other encryption key generation processor defining an IoT platform engine encryption key generation end of the encryption key security system so that the IoT device encryption key generation end and the IoT platform engine encryption key generation end form substantially symmetrical key generation ends of the encryption key security system; and a secured encryption communication link coupling the IoT device encryption key generation end and the IoT platform engine encryption key generation end.

In accordance with one or more aspects of the disclosed embodiment, the secured encryption communication link defines a hierarchical encryption key set layer arrangement with encryption key sets of a superior layer generated at the IoT device encryption key generation end and the encryption key sets of the superior layer generated at the IoT platform engine encryption key generation end being based on a common encryption key set forming a principal layer of the hierarchical encryption key set layer arrangement from which the superior layer depends.

In accordance with one or more aspects of the disclosed embodiment, the common encryption key set of the principal layer is separate and sealed from the IoT platform system.

In accordance with one or more aspects of the disclosed embodiment, the encryption key sets of the superior layer generated at the IoT device encryption key generation end and the encryption key sets of the superior layer generated at the IOT platform engine end comprise a combination of at least one symmetric encryption key and at least one asymmetric encryption key.

In accordance with one or more aspects of the disclosed embodiment, the encryption key sets generated at the IoT device encryption key generation end are based on the common encryption key set and information from an encrypted input to the IOT device encryption key generation end, the encrypted input is based on the common encryption key set and includes at least a predetermined IoT device fabrication identification characteristic and a validity operator effecting a tamper indicator of the encrypted input.

In accordance with one or more aspects of the disclosed embodiment, the predetermined IoT device fabrication identification characteristic forms a basis in generation of the encryption key sets at the IoT device encryption key generation end, each of which encryption key sets is keyed onto and uniquely corresponds to a respective link card of each given IoT edge device and each given IoT communication node device at fabrication of the respective link card.

In accordance with one or more aspects of the disclosed embodiment, the validity operator defines a validity window of the encrypted input, and for generation of the encryption key sets generated, based on the encrypted input at the IoT device encryption key generation end, and for keying each of the encryption sets, based on the encrypted input, onto the respective link card at fabrication thereof.

In accordance with one or more aspects of the disclosed embodiment, the encrypted input is disposed on a computer readable storage media that is ported from an input generation location, where the encrypted input is disposed on the computer readable storage media, and which location is separate and remote from the IoT device encryption key generation end, to the IOT device encryption key generation end.

In accordance with one or more aspects of the disclosed embodiment, each of the encryption key sets generated at the IoT platform engine encryption key generation end is based, at least in part, on a symmetric set of encryption keys to each corresponding encryption key set of the encryption key sets generated at the IoT device encryption key generation end.

In accordance with one or more aspects of the disclosed embodiment, each of the encryption key sets generated at the IoT platform engine encryption key generation end includes an independently generated independent key uniquely corresponding to each respective IoT device, and at least one other key that is based, at least in part, on a symmetric set of encryption keys to each corresponding encryption key set of the encryption key sets generated at the IOT device encryption key generation end.

In accordance with one or more aspects of the disclosed embodiment, the independent key defines a session key for the respective IoT device and is input to the IoT device by session key encrypted communication from the IoT platform engine, via a wide area network of the IoT platform system, the session key encrypted communication being based on the at least one other key and includes at least one validity operator providing a communication tamper indicator of the session key encrypted communication.

In accordance with one or more aspects of the disclosed embodiment, the session key encrypted communication embodying the session key input to the respective IoT device is effected upon and in initial response to IoT platform engine registration of initialization of the respective IoT device within the IoT platform system.

In accordance with one or more aspects of the disclosed embodiment, the initial response of the session key encrypted communication from IoT platform engine to respective IoT device and decryption of the session key from the session key encrypted communication and input in the respective IoT device effect authentication of the respective IoT device and onboarding of the respective IoT device to the IoT platform system.

In accordance with one or more aspects of the disclosed embodiment, the independent key and the at least one other key based at least in part on the symmetric set of encryption keys define other superior key set layers of the hierarchical encryption key set layer arrangement securing end to end encryption security of communication link connecting an IoT device end and an IoT platform engine end of the IoT platform system.

In accordance with one or more aspects of the disclosed embodiment, an Internet of things (IoT) platform system of multiple IoT platform edge devices communicably coupled for bidirectional communication with multiple IoT platform communication network nodes, system comprises:

an IoT platform engine communicably coupled for bidirectional communication with the IoT platform communication network nodes, and via therewith communicably coupled for bidirectional communication with the IoT platform edge devices;

the IoT platform engine having multiple function modules, the IoT platform engine being disposed on a variably selectable number of server nodes of a server node cloud, at least one function module of the multiple function modules being a provisioning engine module configured as to selectably populate server nodes with the platform engine, and another of the multiple function modules being a secure sealed storage section that stores, sealed from each other of the multiple function modules of the platform engine outside the sealed storage section, IoT user credentials and rights as to access and affect functions of function modules of the platform engine including the provisioning engine module, the secured sealed storage section being configured to manage and enable access to user rights including authorization to initialize the provisioning engine module so as to effect secure elastic provisioning selection of the number of server nodes on which the platform engine is disposed.

In accordance with one or more aspects of the disclosed embodiment, the secure sealed storage section is arranged so that provision of secure seal integrity is decoupled and maintained from an exterior of the IoT platform engine.

In accordance with one or more aspects of the disclosed embodiment, the secure sealed storage section manages and enables access with multifactor user authentication.

In accordance with one or more aspects of the disclosed embodiment, the server node cloud is disposed as infrastructure as a service (IAAS) platform, or as a private server cloud.

In accordance with one or more aspects of the disclosed embodiment, the platform engine is configured with a distributed storage layer, and the secure sealed storage section is disposed within the distributed storage layer.

In accordance with one or more aspects of the disclosed embodiment, the secure sealed storage section is spread across multiple of the server nodes to include at least a minimum deterministic number within the multiple server nodes so as to effect functions of the secure sealed storage section.

In accordance with one or more aspects of the disclosed embodiment, at least one of the multiple function modules defines a centralized service discovery and monitoring function, the centralized service discovery and monitoring function module being spread across multiple of the server nodes to include at least a minimum deterministic number within the multiple server nodes so as to effect the centralized service discovery and monitoring function.

In accordance with one or more aspects of the disclosed embodiment, the centralized service discovery and monitoring function is configured so as to register run initiation of each platform engine services on newly provisioned server nodes as populated with the provisioning module.

In accordance with one or more aspects of the disclosed embodiment, the provisioning engine module is configured so as to effect, provisioning selection of the number of server nodes being provisioned so as to become populated with the platform engine, selection of a network topology for the number of selected provisioned server nodes, and selection of services from predetermined services of the platform engine so as to start the selected services on each of the selected server nodes being provisioned.

In accordance with one or more aspects of the disclosed embodiment, the provisioning engine module is configured so that selection and set up of the selected services on each of the selected server nodes being provisioned is specified with but one configuration file and selection input to but one provisioning script fed to the provisioning engine module effecting substantially automatic setup of each the selected server nodes.

In accordance with one or more aspects of the disclosed embodiment, at setup, each respective one of the selected server nodes metadata file is signed with a private key that uniquely corresponds to the respective one of the selected server nodes, the private key corresponding to the respective selected server node being sealed in the secure sealed storage section and authenticated by the secure sealed storage section on receipt of the signature at set up of the respective selected server node.

In accordance with one or more aspects of the disclosed embodiment, an Internet of things (IoT) system including a distributed system of virtual machines is provided. The IoT system includes at least one IoT platform system control engine; at least one IoT network node device communicable with the at least one IoT platform system control engine through a network; and at least, one IoT edge device communicable with the at least one IoT network node device and the at least one IoT platform system control engine through the network, each of the at least one IoT edge device includes an edge device secure system space and an edge device user defined space; wherein the IoT edge device secure system space is configured to be secured to prevent unauthorized access and the IoT edge device user defined space is configured to receive and execute user defined instructions to form the distributed system of virtual machines.

In accordance with one or more aspects of the disclosed embodiment, an Internet of things (IoT) system including a distributed system of virtual machines is provided. The IoT system comprising: at least one IoT platform system control engine; at least one IoT network node device communicable with the at least one IoT platform system control engine through a network, each of the at least one IoT network node device includes an IoT network node device secure system space and an IoT network node device user defined space; and at least one IoT edge device communicable with the at least one IoT network node device and the at least one IoT platform system control engine through the network, each of the at least one IoT edge device includes an IoT edge device secure system space and an IoT edge device user defined space; wherein the IoT edge device secure system space is configured to be secured to prevent unauthorized access and the IoT edge device user defined space is configured to receive and execute user defined instructions to form the distributed system of virtual machines; and wherein the IoT network node device secure system space is configured to be secured to prevent unauthorized access and the IoT network node device user defined space is configured to receive and execute user defined instructions to form the distributed system of virtual machines.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An Internet of things (IoT) system including a distributed system of virtual machines, the IoT system comprising:
at least one IoT platform system control engine, each of the at least one IoT platform system control engine includes a IoT platform system control engine secure system space and a IoT platform system control engine user defined space;
at least one IoT network node device communicable with the at least one IoT platform system control engine through a network, each of the at least one IoT network node device includes a IoT network node device secure system space and an IoT network node device user defined space;
at least one IoT edge device communicable with the at least one IoT network node device and the to least one IoT platform system control engine through the network, each of the at least one IoT edge device includes an edge device secure system space and an edge device user defined space;
wherein the IoT platform system control engine secure system space, the IoT network node device secure system space, and the edge device secure system space are each configured to be secured to prevent unauthorized access; and
wherein, the IoT platform system control engine user defined space, the IoT network node device user defined space and the edge device user defined space each define a respective virtual machine configured to receive and execute user defined instructions to form the distributed system of virtual machines.

2. The IoT system of claim 1, wherein the IoT platform system control engine secure system space, and the edge device secure system space are each, respectively, configured to control communication over the network between the at least one IoT platform system control engine, the at least one IoT network node device, and the at least one IoT edge device.

3. The IoT system of claim 1, wherein the IoT platform system control engine secure system space, IoT network node device secure system space, and the edge device secure system space each include an integrated communication control module to control communication over the network.

4. The IoT system of claim 1, wherein the edge device secure system space is configured to define an interface between an application layer of the IoT edge device and a drive layer of the at least one IoT edge device.

5. The IoT system of claim 1, wherein the virtual machine of the at least one edge device is configured to configure the application layer of the at least one IoT edge device to interface with a predetermined sensor type.

6. The IoT system of claim 1, wherein the virtual machine of the at least one IoT platform system control engine is configured to receive user defined instructions.

7. The IoT system of claim 1, wherein the virtual machine of the at least one IoT platform system control engine is configured to propagate user defined instructions to the respective virtual machines of the IoT network node device and the IoT edge device.

8. The IoT system of claim 1, wherein the IoT edge device is configured to interface with diverse sensor inputs and diverse outputs through the virtual machine of the IoT edge device.

9. The IoT system of claim 8, wherein the virtual machine of the IoT edge device is configured to customize the functionality of the diverse sensor inputs and diverse outputs.

10. The IoT system of claim 1, wherein the respective virtual machine of the at least one IoT platform system control engine, the at least one IoT network node device, and the at least one IoT edge device is configurable with a scripting language interface.

11. The IoT system of claim 1, wherein the respective virtual machine of the at least one IoT platform system control engine, the at least one IoT network node device, and the at least one IoT edge device is configurable with a visual configuration interface.

12. The IoT system of claim 1, wherein the virtual machine of the at least one edge device is configured to configure an application layer of the at least one edge device for a predetermined sensor type.

13. The IoT system of claim 1, wherein the IoT platform system control engine includes an integrated communications control module.

14. The IoT system of claim 1, wherein the respective virtual machine of the at least one IoT platform system control engine, the at least one network node device, and the at least one IoT edge device are configured to execute a specific IoT task.

15. The IoT system of claim 14, wherein the respective virtual machine of the at least one IoT platform system control engine, the at least one IoT network node device, or the at least one IoT edge device are configured to execute portions of the specific IoT task, wherein the portions of the specific IoT task are distributed based on capacity and efficiency characteristics of the respective virtual machine of the at least one IoT platform system control engine, the at least one IoT network node device, or the at least one IoT edge device.

16. A method of operating an Internet of things (IoT) system including a distributed system of virtual machines, the method comprising:
providing at least one IoT platform system control engine having a IoT platform system control engine secure system space and a IoT platform system control engine user defined space;
providing at least one IoT network node device communicable with the at least one IoT platform system control engine through a network, the at least one IoT network node device having an IoT network node device secure system space and an IoT network node device user defined space;
providing at least one IoT edge device communicable with the at least one IoT network node device and the at least one IoT platform system control engine through the network, each of the at least one IoT edge device includes an edge device secure system space and an edge device user defined space;
configuring each of the IoT platform system control engine secure system space, the IoT network node device secure system space and the edge device secure system space to be secured to prevent unauthorized access;
defining a respective virtual machine in each of the IoT platform system control engine user defined space, the IoT network node device user defined space, and the edge device user defined space; and
forming with the a distributed system of virtual machines with each respective virtual machine receiving and executing user defined instructions.

17. An Internet of things (IoT) device link comprising:
a memory storage for storing program code;
a microcontroller for executing the program code, wherein the program code includes secure program code configured to be secured and prevent unauthorized access and user defined program code configured to execute user defined instructions;

a communication module and antenna configured to transmit and receive data to and from the IoT device link;

a cryptologic unit configured to encrypt and decrypt the data;

a power supply and management module and power storage unit configured to provide power to the IoT device link;

a real time clock configured to clock the microcontroller operations;

a MAC address module configured to provide a unique network address for the IoT device link; and wherein the microcontroller having an interface module configured to connect and control at least one input and output of an IoT device link sensor.

18. The IoT device link of claim 17, wherein the interface module is common for the IoT device link sensor comprising weather, public safety, waste management, gas leak, sewer monitoring, water leak, parking access, smart parking, water quality, structural integrity, soil moisture, electronic emission, smart lighting, street safety, air quality, item location, water level or public health sensors.

19. The IoT device link of claim 17, wherein the user defined program code configured to control the operation of the at least one input and output of the IoT device link sensor.

20. The IoT device link of claim 17, wherein the IoT device link sensor senses a sensing characteristic and cryptologic unit encrypts the sensing characteristic before the communication module and antenna transmits the sensing characteristic.

21. An internet of things (IoT) network system comprising:

at least one network link card each of which is configured to respectively interface with a corresponding at least one of an IoT edge device and an IoT network node device, of an IoT platform system, so as to communicably link, via a wide area network each respective at least one IoT edge device and IoT network node device of the IoT platform system to an IoT platform system control engine;

an in-fabrication keying fixture configured so as to couple with and key onto each at least one network link card respectively at fabrication so as to form an encryption key set on, and uniquely corresponding to, each respective network link card at fabrication of each respective network link card; and an IoT edge device and IoT network node device registration and authentication manager controller coupled to the IoT platform system control engine, the registration and authentication manager controller being configured to respectively register and authenticate each at least one of the IoT edge device and the IoT network node device upon respective initialization and registration thereof, by the IoT platform system control engine, of each at least one of the IoT edge device and the IoT network node device within the IoT platform system based on a secure symmetric encryption key set to the at fabrication formed encryption key set of the corresponding link card of each at least one of the IoT edge device and IoT network node device so as to effect authenticated onboarding respectively of each at least one of the IoT edge device and IOT network node device to the IoT platform system.

22. The IoT network system of claim 21, wherein authentication is effected upon and substantially coincident with registration by the IoT Edge device 120 and IoT network node device registration and authentication manager controller of device initialization within the IoT network system.

23. The IoT network system of claim 21, wherein the encryption key set is disposed at least in a cryptologic unit of each at least one network link card at fabrication of each at least one network link card.

24. An Internet of things (IoT) system including a distributed system of virtual machines, the IoT system comprising:

at least one IoT platform system control engine;

at least one IoT network node device communicable with the at least one IoT platform system control engine through a network; and at least one IoT edge device communicable with the at least one IoT network node device and the at least one IoT platform system control engine through the network, each of the at least one IoT edge device includes an IoT edge device secure system space and an IoT edge device user defined space;

wherein the IoT edge device secure system space is configured to be secured to prevent unauthorized access and the IoT edge device user defined space is configured to receive and execute user defined instructions to form the distributed system of virtual machines.

25. An Internet of things (IoT) system including a distributed system of virtual machines, the IoT system comprising:

at least one IoT platform system control engine;

at least one IoT network node device communicable with the at least one IoT platform system control engine through a network, each of the at least one IoT network node device includes an IoT network node device secure system space and an IoT network node device user defined space; and at least one IoT edge device communicable with the at least one IoT network node device and the at least one IoT platform system control engine through the network, each of the at least one IoT edge device includes an IoT edge device secure system space and an IoT edge device user defined space;

wherein the IoT edge device secure system space is configured to be secured to prevent unauthorized access and the IoT edge device user defined space is configured to receive and execute user defined instructions to form the distributed system of virtual machines; and wherein the IoT network node device secure system space is configured to be secured to prevent unauthorized access and the IoT network node device user defined space is configured to receive and execute user defined instructions to form the distributed system of virtual machines.

* * * * *